United States Patent
Matsumura et al.

(10) Patent No.: US 8,433,010 B2
(45) Date of Patent: Apr. 30, 2013

(54) RECEPTION DEVICE, INTEGRATED CIRCUIT, DIGITAL TELEVISION RECEIVER, RECEPTION METHOD, AND RECEPTION PROGRAM

(75) Inventors: Yoshinobu Matsumura, Osaka (JP); Tomohiro Kimura, Osaka (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 12/670,934

(22) PCT Filed: Jun. 11, 2009

(86) PCT No.: PCT/JP2009/002650
§ 371 (c)(1),
(2), (4) Date: Jul. 2, 2010

(87) PCT Pub. No.: WO2009/153946
PCT Pub. Date: Dec. 23, 2009

(65) Prior Publication Data
US 2010/0309383 A1   Dec. 9, 2010

(30) Foreign Application Priority Data
Jun. 16, 2008 (JP) ................................ 2008-156187

(51) Int. Cl.
*H04L 27/00* (2006.01)
(52) U.S. Cl.
USPC ........... 375/343; 375/260; 375/259; 375/316; 375/285; 375/346; 375/340
(58) Field of Classification Search .................. 375/260, 375/259, 316, 285, 346, 340, 343
See application file for complete search history.

(56) References Cited

U.S. PATENT DOCUMENTS
2005/0147025 A1* 7/2005 Auer .............................. 370/203
2006/0269016 A1  11/2006 Long et al.
(Continued)

FOREIGN PATENT DOCUMENTS
EP    1 533 961       5/2005
JP    2005-151447     6/2005
(Continued)

OTHER PUBLICATIONS
International Search Report issued Sep. 15, 2009 in International (PCT) Application No. PCT/JP2009/002650.
(Continued)

*Primary Examiner* — Siu Lee
(74) *Attorney, Agent, or Firm* — Wenderoth, Lind & Ponack, L.L.P.

(57) ABSTRACT

An orthogonal transform subunit 14 separates a reception signal into carriers on a per-symbol basis. In a channel characteristics estimation subunit 15, (i) an SP channel characteristics estimation part 20 calculates channel characteristics at carriers to which SPs are allocated, by using signals output from the orthogonal transform subunit 14, (ii) a symbol direction interpolation part 30 interpolates, in the symbol (time) direction, signals output from the SP channel characteristics estimation part 20, (iii) a TMCC channel characteristics estimation part 40 calculates channel characteristics at carriers to which TMCCs are allocated, by using signals output from the orthogonal transfer subunit 14, and (iv) an adaptive interpolation part 50 calculates filter coefficients by using signals output from the symbol direction interpolation part 30 and the TMCC channel characteristics estimation part 40, and adaptively interpolates signals output from the symbol direction interpolation part 30 by using values of the calculated filter coefficients.

18 Claims, 46 Drawing Sheets

U.S. PATENT DOCUMENTS

2007/0153922 A1* 7/2007 Dong et al. .................. 375/260
2008/0240265 A1* 10/2008 Fechtel ........................ 375/260
2010/0177251 A1* 7/2010 Kimura et al. ............... 348/726

FOREIGN PATENT DOCUMENTS

| JP | 2008-28861 | 2/2008 |
|---|---|---|
| WO | 2006/128188 | 11/2006 |

OTHER PUBLICATIONS

Hoeher, P. et al., *Two-Dimensional Pilot-Symbol-Aided Channel Estimation by Wiener Filtering, IEEE* (1997), pp. 1845-1848.

* cited by examiner

FIG. 7

Carrier numbers assigned to carriers
to which TMCCs are allocated
(Mode 3 of ISDB-T standard, synchronous modulation)

| | | | |
|---|---|---|---|
| 70 | 1474 | 2878 | 4282 |
| 133 | 1537 | 2941 | 4345 |
| 233 | 1637 | 3041 | 4445 |
| 410 | 1814 | 3218 | 4622 |
| 476 | 1880 | 3284 | 4688 |
| 587 | 1991 | 3395 | 4799 |
| 697 | 2101 | 3505 | 4909 |
| 787 | 2191 | 3595 | 4999 |
| 947 | 2351 | 3755 | 5159 |
| 1033 | 2437 | 3841 | 5245 |
| 1165 | 2569 | 3973 | 5377 |
| 1289 | 2693 | 4097 | 5501 |
| 1319 | 2723 | 4127 | 5531 |

FIG. 11

Of all the carrier numbers $3n + 1$,
carrier numbers assigned to TMCC carriers
to which TMCC signals are allocated.

| 70   | 1165 | 2437 | 3595 | 4909 |
|------|------|------|------|------|
| 133  | 1474 | 2569 | 3841 | 4999 |
| 697  | 1537 | 2878 | 3973 | 5245 |
| 787  | 2101 | 2941 | 4282 | 5377 |
| 1033 | 2191 | 3505 | 4345 |      |

FIG. 12

Of all the carrier numbers $3n + 2$,
carrier numbers assigned to TMCC carriers
to which TMCC signals are allocated.

| 233  | 1319 | 2693 | 3755 | 4799 |
|------|------|------|------|------|
| 410  | 1637 | 2723 | 4097 | 5159 |
| 476  | 1814 | 3041 | 4127 | 5501 |
| 587  | 1880 | 3218 | 4445 | 5531 |
| 947  | 1991 | 3284 | 4622 |      |
| 1289 | 2351 | 3395 | 4688 |      |

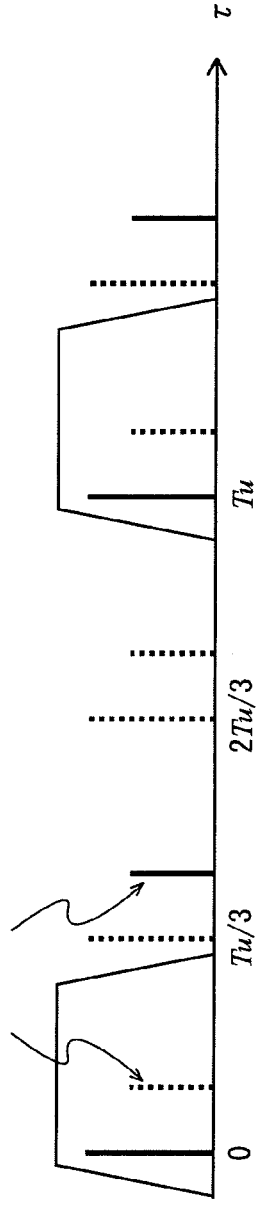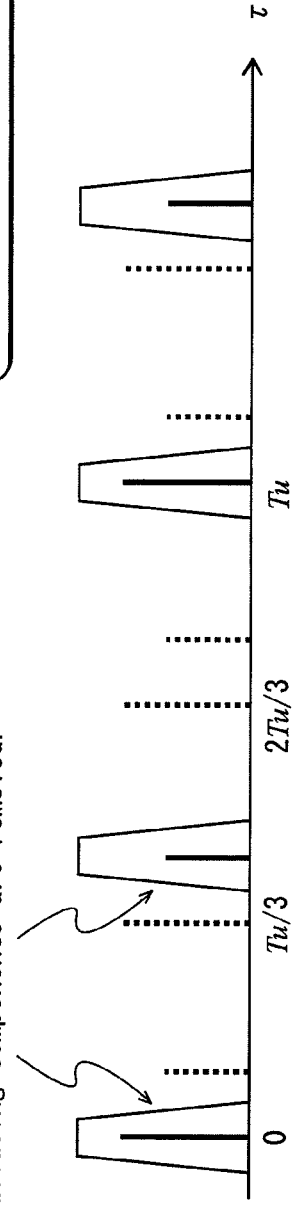
FIG. 14A  Conventional interpolation (four symbol estimation)
FIG. 14B  Adaptive interpolation pertaining to First Embodiment FIG. 15A  Conventional interpolation (four symbol estimation)
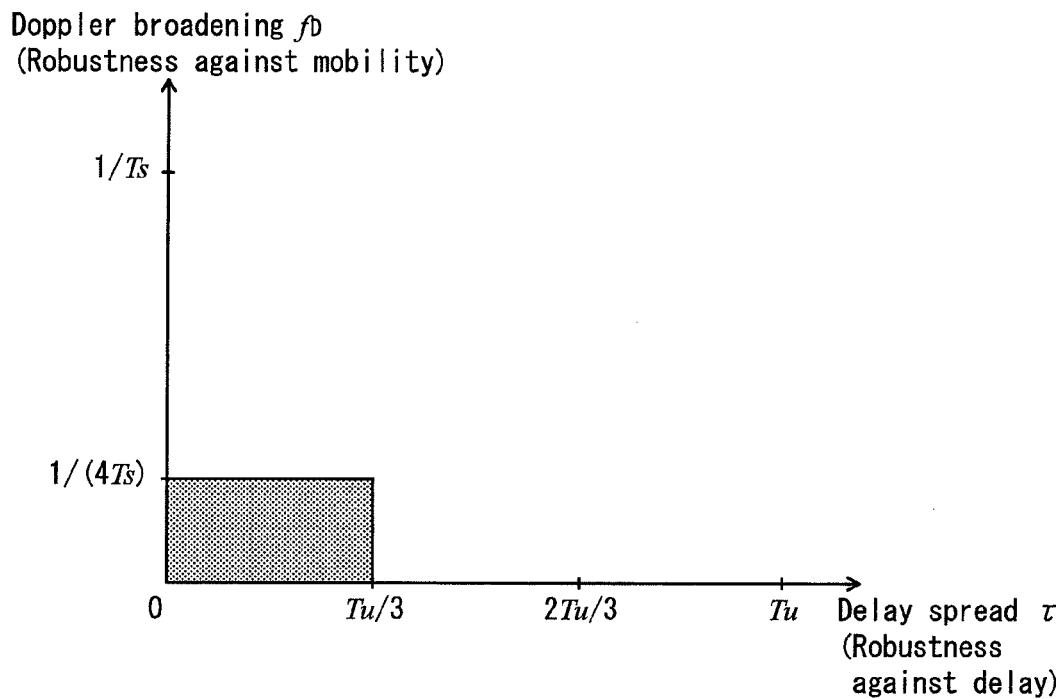
FIG. 15B  Adaptive interpolation pertaining to First Embodiment
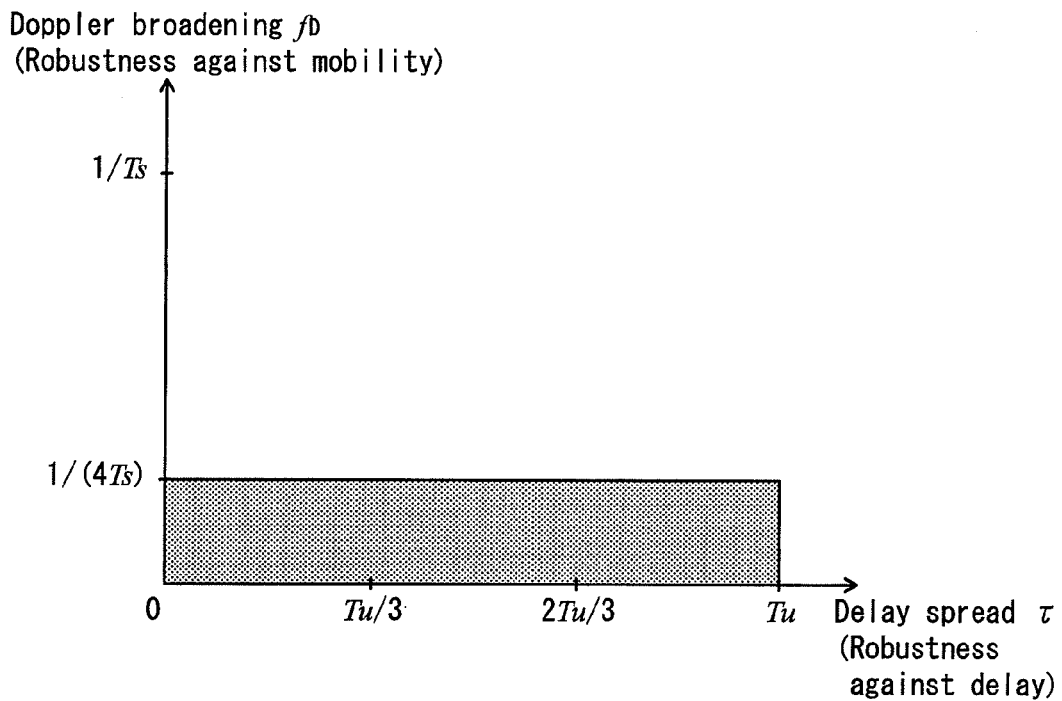

FIG. 18

Carrier numbers assigned to carriers to which ACs are allocated
(Mode 3 of ISDB-T standard, synchronous modulation)

| 10 | 452 | 868 | 1394 | 1739 | 2236 | 2599 | 3085 | 3491 | 3896 | 4373 | 4826 | 5224 |
|---|---|---|---|---|---|---|---|---|---|---|---|---|
| 28 | 472 | 953 | 1397 | 1829 | 2257 | 2681 | 3124 | 3535 | 3952 | 4403 | 4852 | 5273 |
| 161 | 614 | 1012 | 1414 | 1856 | 2272 | 2798 | 3143 | 3640 | 4003 | 4489 | 4895 | 5300 |
| 191 | 640 | 1061 | 1432 | 1876 | 2357 | 2801 | 3233 | 3661 | 4085 | 4528 | 4939 | 5356 |
| 277 | 683 | 1088 | 1565 | 2018 | 2416 | 2818 | 3260 | 3676 | 4202 | 4547 | 5044 | 5407 |
| 316 | 727 | 1144 | 1595 | 2044 | 2465 | 2836 | 3280 | 3761 | 4205 | 4637 | 5065 | 5489 |
| 335 | 832 | 1195 | 1681 | 2087 | 2492 | 2969 | 3422 | 3820 | 4222 | 4664 | 5080 | 5606 |
| 425 | 853 | 1277 | 1720 | 2131 | 2548 | 2999 | 3448 | 3869 | 4240 | 4684 | 5165 | 5609 |

FIG. 22

TPS carrier positions (8k Mode of DVB-T standard)

| | | | | |
|---|---|---|---|---|
| 34 | 1469 | 2923 | 4198 | 5681 |
| 50 | 1594 | 2966 | 4309 | 5707 |
| 209 | 1687 | 2990 | 4481 | 5800 |
| 346 | 1738 | 3173 | 4627 | 5902 |
| 413 | 1754 | 3298 | 4670 | 6013 |
| 569 | 1913 | 3391 | 4694 | 6185 |
| 595 | 2050 | 3442 | 4877 | 6331 |
| 688 | 2117 | 3458 | 5002 | 6374 |
| 790 | 2273 | 3617 | 5095 | 6398 |
| 901 | 2299 | 3754 | 5146 | 6581 |
| 1073 | 2392 | 3821 | 5162 | 6706 |
| 1219 | 2494 | 3977 | 5321 | 6799 |
| 1262 | 2605 | 4003 | 5458 | |
| 1286 | 2777 | 4096 | 5525 | |

FIG. 25

CP carrier positions (8k Mode of DVB-T standard)

| 0 | 636 | 1140 | 1986 | 2646 | 3462 | 4167 | 5544 | 6096 |
|---|---|---|---|---|---|---|---|---|
| 48 | 714 | 1146 | 2037 | 2673 | 3495 | 4173 | 5562 | 6162 |
| 54 | 759 | 1206 | 2136 | 2688 | 3549 | 4188 | 5595 | 6213 |
| 87 | 765 | 1269 | 2154 | 2754 | 3564 | 4212 | 5637 | 6219 |
| 141 | 780 | 1323 | 2187 | 2805 | 3600 | 4281 | 5643 | 6222 |
| 156 | 804 | 1377 | 2229 | 2811 | 3609 | 4296 | 5730 | 6249 |
| 192 | 873 | 1491 | 2235 | 2814 | 3663 | 4326 | 5748 | 6252 |
| 201 | 888 | 1683 | 2322 | 2841 | 3687 | 4347 | 5826 | 6258 |
| 255 | 918 | 1704 | 2340 | 2844 | 3690 | 4350 | 5871 | 6318 |
| 279 | 939 | 1752 | 2418 | 2850 | 3741 | 4377 | 5877 | 6381 |
| 282 | 942 | 1758 | 2463 | 2910 | 3840 | 4392 | 5892 | 6435 |
| 333 | 969 | 1791 | 2469 | 2973 | 3858 | 4458 | 5916 | 6489 |
| 432 | 984 | 1845 | 2484 | 3027 | 3891 | 4509 | 5985 | 6603 |
| 450 | 1050 | 1860 | 2508 | 3081 | 3933 | 4515 | 6000 | 6795 |
| 483 | 1101 | 1896 | 2577 | 3195 | 3939 | 4518 | 6030 | 6816 |
| 525 | 1107 | 1905 | 2592 | 3387 | 4026 | 4545 | 6051 | |
| 531 | 1110 | 1959 | 2622 | 3408 | 4044 | 4548 | 6054 | |
| 618 | 1137 | 1983 | 2643 | 3456 | 4122 | 4554 | 6081 | |

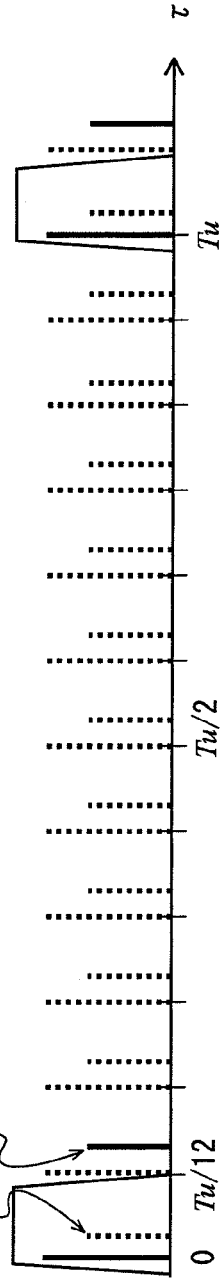

FIG. 29A Conventional interpolation (one symbol estimation)

Parts of components of delayed waves fall outside the passband of the filter, and parts of aliasing components fall within the passband of the filter.

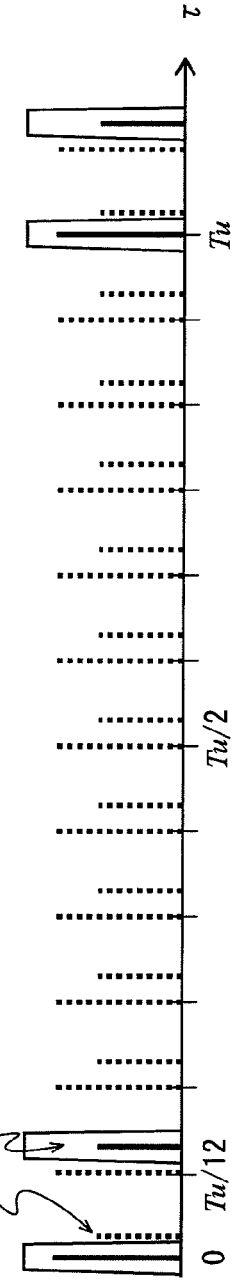

FIG. 29B Adaptive interpolation pertaining to Fifth Embodiment

Only components of desired dominant/delayed waves pass through the filter, and aliasing components are removed.

FIG. 30A  Conventional interpolation (one symbol estimation)
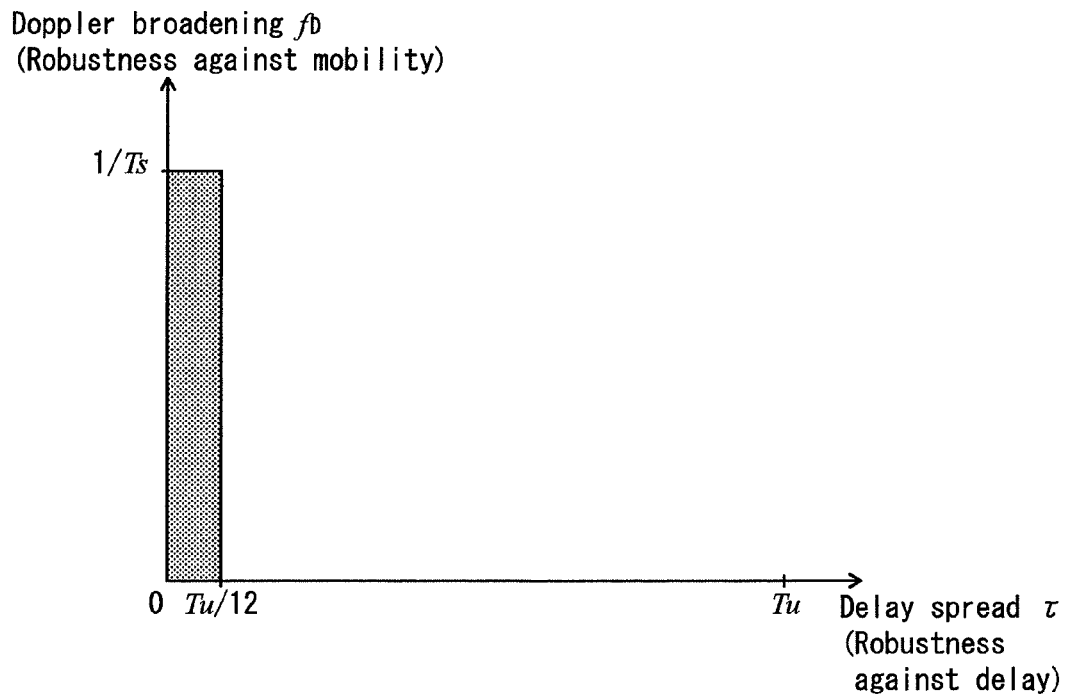
FIG. 30B  Interpolation pertaining to Fifth Embodiment
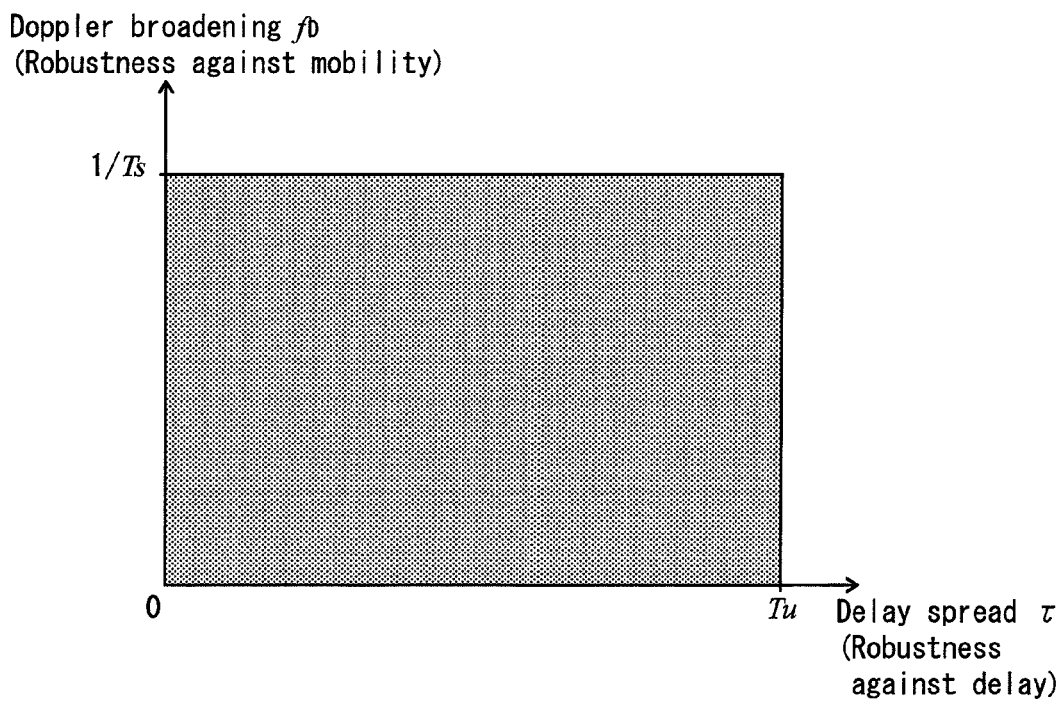

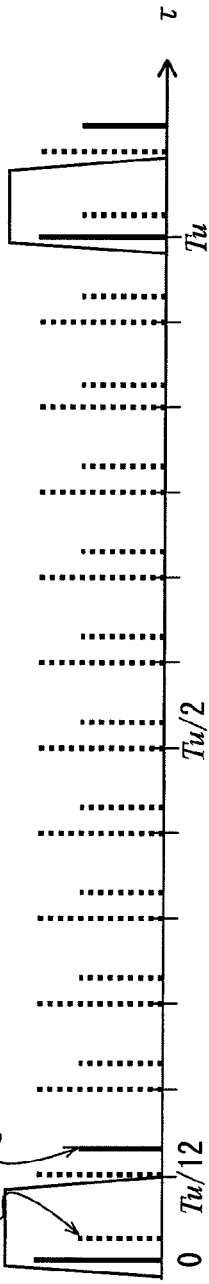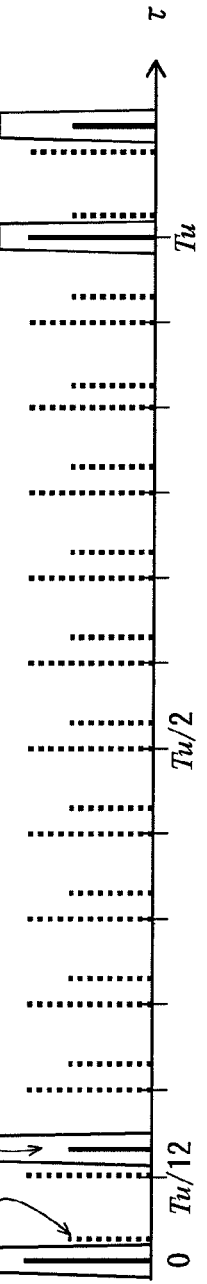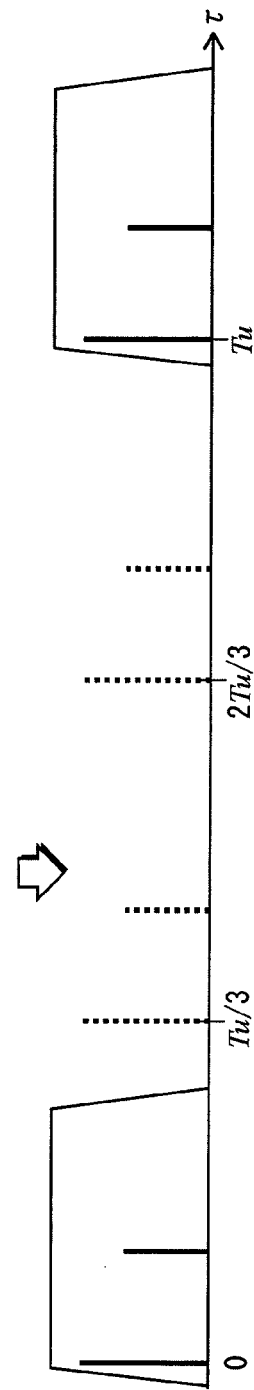
FIG. 34A Conventional interpolation (one symbol estimation)
FIG. 34B Adaptive interpolation pertaining to Sixth Embodiment

FIG. 40

Carrier numbers assigned to
carriers to which CPs are allocated
(DVB-T2 standard)

| | | | |
|---|---|---|---|
| 1022 | 2583 | 5710 | 12946 |
| 1224 | 2649 | 5881 | 13954 |
| 1302 | 2833 | 8164 | 16745 |
| 1371 | 2925 | 10568 | 21494 |
| 1495 | 3192 | 11069 | |
| 2261 | 4266 | 11560 | |
| 2551 | 5395 | 12631 | |

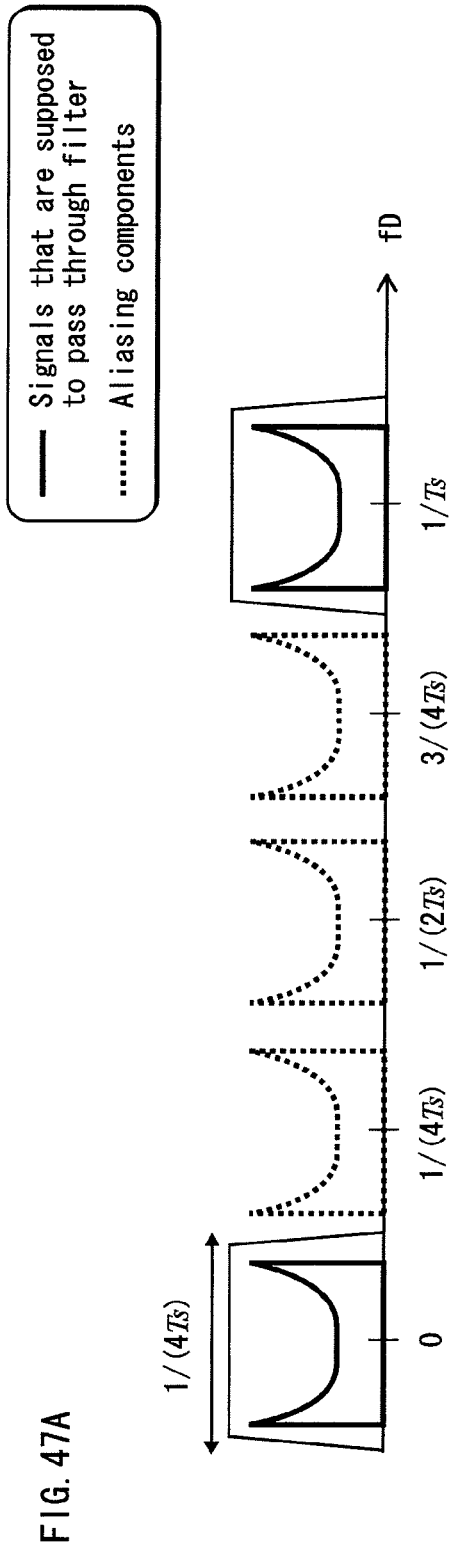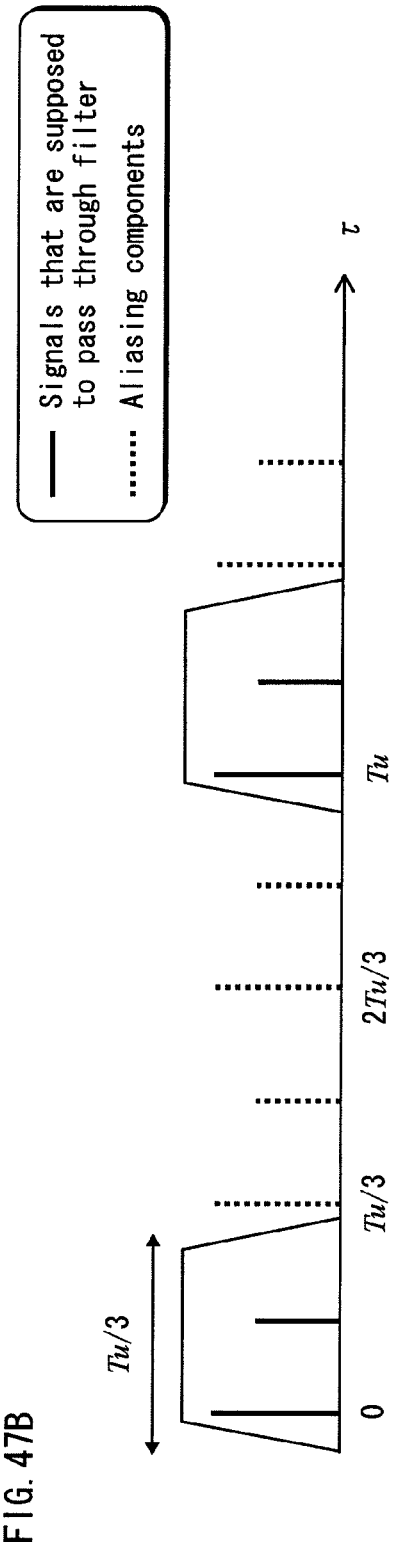
FIG. 47A
FIG. 47B

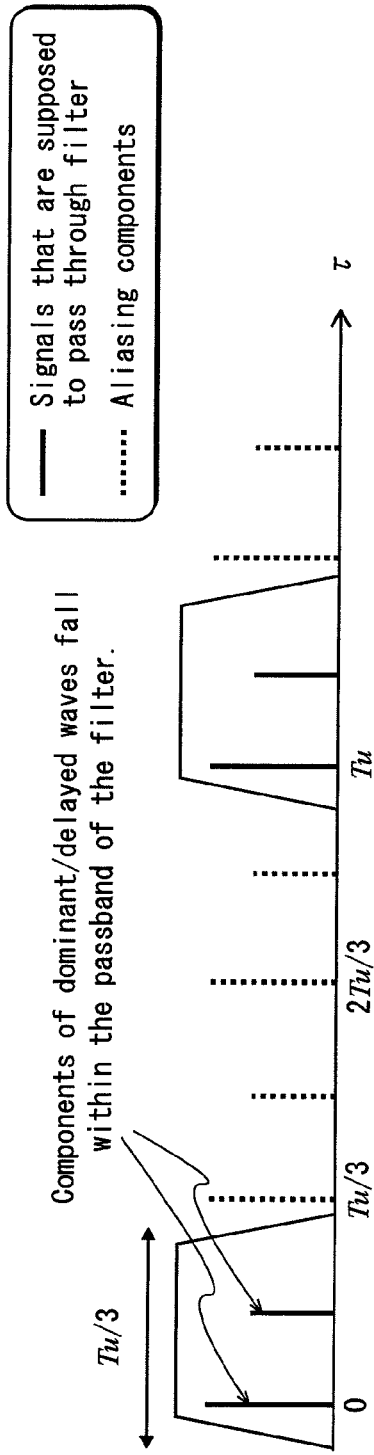
FIG. 49A  A case where delay spread of all delayed waves is equal to or smaller than $Tu/3$
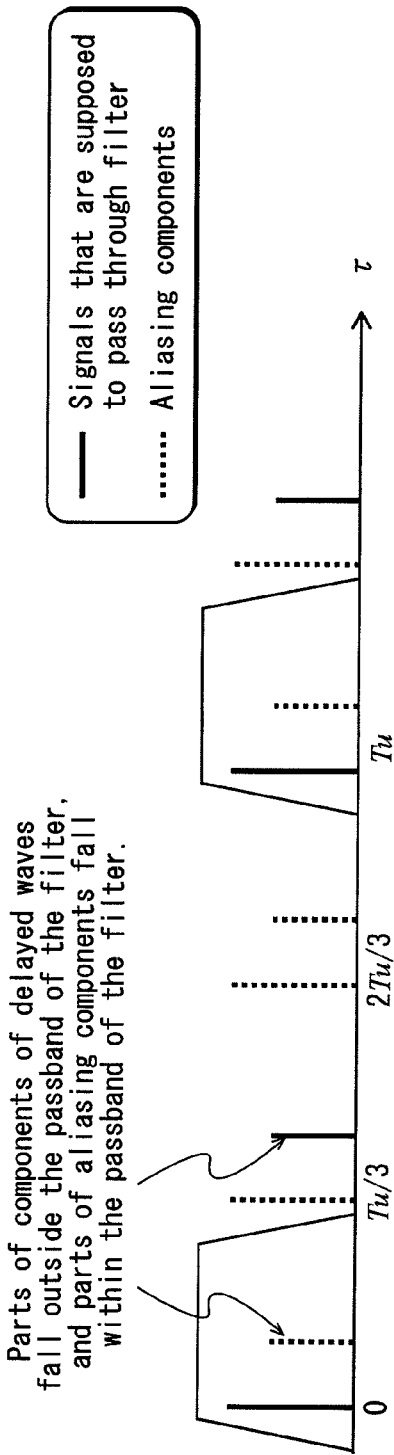
FIG. 49B  A case where there are delayed waves whose delay spread exceeds $Tu/3$

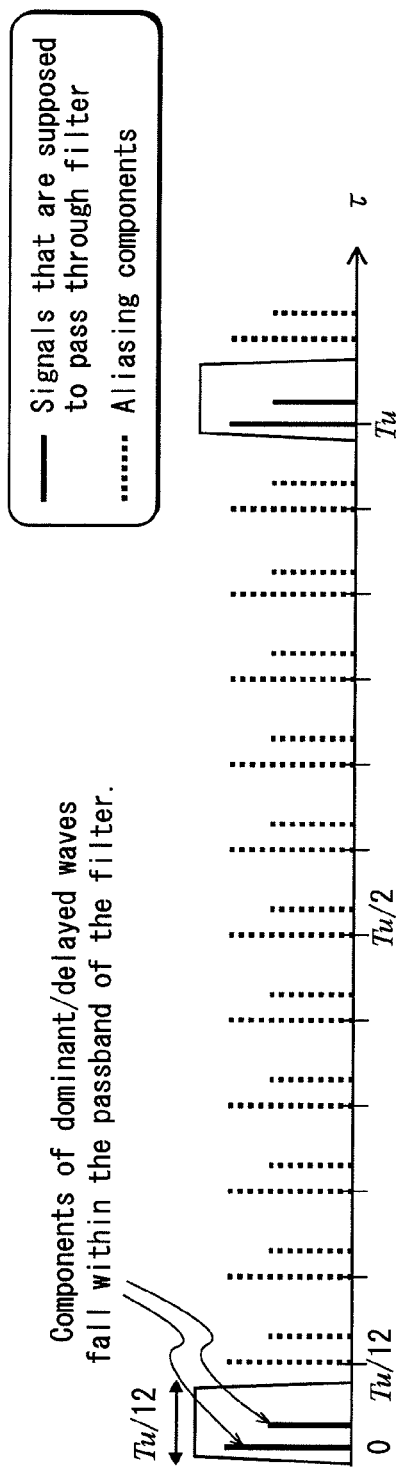
FIG. 50A A case where delay spread of all delayed waves is equal to or smaller than $Tu/12$
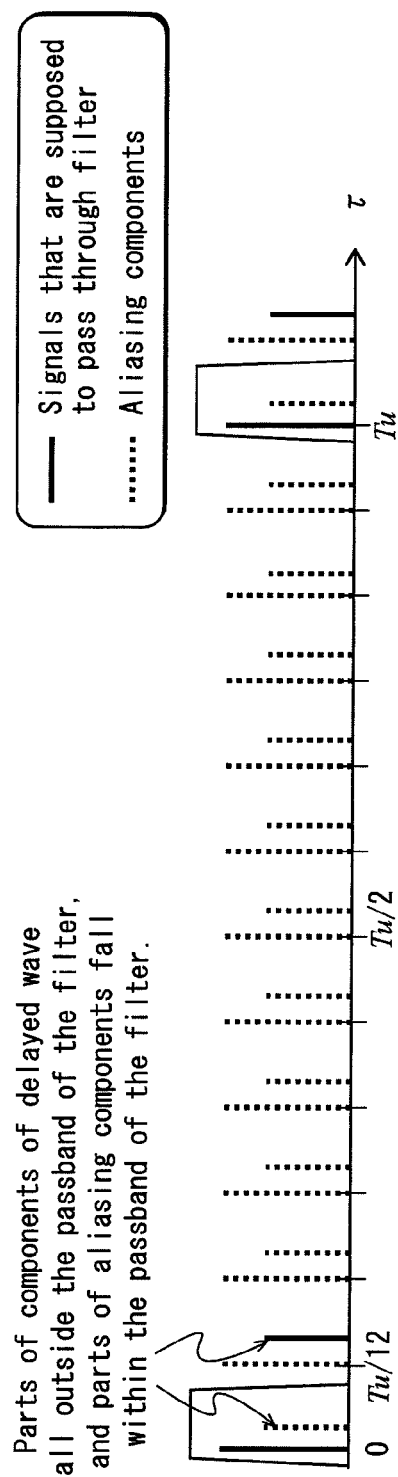
FIG. 50B A case where there are delayed waves whose delay spread exceeds $Tu/12$

RECEPTION DEVICE, INTEGRATED CIRCUIT, DIGITAL TELEVISION RECEIVER, RECEPTION METHOD, AND RECEPTION PROGRAM

TECHNICAL FIELD

The present invention relates to a channel estimation technique that is used to perform demodulation processing on a transmission signal generated by multiplexing a plurality of modulated carriers.

BACKGROUND ART

An Orthogonal Frequency-Division Multiplexing (OFDM) method is one of digital multi-carrier transmission methods adopted in various digital communications compliant with a Japanese digital terrestrial broadcasting standard (Integrated Services Digital Broadcasting-Terrestrial, or ISDB-T), a European digital terrestrial broadcasting standard (Digital Video Broadcasting-Terrestrial, or DVB-T), the IEEE 802.11a standard, etc. With the OFDM method, a plurality of carriers are closely arrayed while remaining orthogonal to each other. Therefore, the OFDM method enables efficient use of frequency. Furthermore, as the OFDM method allows setting long symbol lengths, the OFDM method is robust against InterSymbol Interference (ISI) caused by a plurality of incoming waves.

A guard interval technique is commonly used in the OFDM method. The guard interval technique makes it possible to perform the Fast Fourier Transform (FFT) while avoiding interfering components associated with the ISI caused by multipath interference, by extracting a portion of the end of a useful symbol and inserting the extracted portion to the front of the useful symbol as a guard interval, so as to maintain periodicity in the useful symbol. Adopting the guard interval technique in the OFDM method renders the OFDM method significantly robust against multipath interference.

According to the aforementioned ISDB-T and DVB-T standards, a transmission signal is configured in a transmission format that is schematically shown in FIG. 41. Referring to FIG. 41, the horizontal axis and the vertical axis indicate the carrier (frequency) direction and the symbol (time) direction of an OFDM signal, respectively. According to the ISDB-T and DVB-T standards, a pilot signal, which is called a Scattered Pilot (SP) and referenced when performing equalization, is allocated to every $12^{th}$ carrier in each symbol. Hereafter, such a pilot signal is referred to as a "scattered pilot signal" or an "SP signal". In the carrier direction, each SP signal in one symbol is two carriers apart from the corresponding SP signal in another adjacent symbol. This way, in every $4^{th}$ symbol, each SP signal is assigned the same carrier number as the corresponding SP signals in other symbols. With the SP signals allocated in the above-described manner, the transmission signal shown in FIG. 41 is transmitted. The amplitudes and phases of the SP signals are known to a receiver. Below, a carrier to which an SP signal is allocated is referred to as an "SP carrier". Note, an SP signal allocation pattern (a pattern in which SP signals are allocated) pertaining to the Digital Video Broadcasting-Handheld (DVB-H) is the same as the SP signal allocation pattern pertaining to the ISDB-T and DVB-T standards.

Once having been transmitted, a transmission signal X is affected by various amplitude distortions and phase distortions in a channel due to multipath interference, fading, and the like. The transmission signal X is then received by a receiver as a reception signal Y. The transmission signal reflects off various objects while being transmitted. As a result, the transmission signal is transmitted via multiple paths and arrives at the final destination at different times. That is to say, in such a multipath environment, channel characteristics show delay spread. On the other hand, in a mobile environment, a transmission signal is affected by the Doppler shift, and a plurality of waves travelling in different directions overlap one another. That is to say, in such a mobile environment, channel characteristics show Doppler broadening. Given that the characteristics of amplitudes and phases by which the transmission signal X has been affected in the channel (channel characteristics) are expressed as H, the transmission signal X and a reception signal Y satisfy the relationship shown in the following (Equation 1).

$$Y = HX \qquad \text{(Equation 1)}$$

In view of the above, the receiver estimates the transmission signal X by (i) estimating the channel characteristics H and (ii) correcting the amplitude distortions and phase distortions by which the reception signal Y has been affected in the channel, by multiplying the reception signal Y by the reverse characteristics of the channel characteristics H. In the ISDB-T and DVB-T standards, the channel characteristics H are estimated using the above-described SP signals. There are various receiving environments that the receiver could be in. Many of such receiving environments cause a long delay in signal reception. Examples of such receiving environments include a Single-Frequency Network (SFN) environment where a plurality of transmission stations transmit signals using the same frequency, and a receiving environment where when the receiver receives radio waves that have reflected off remotely-located reflectors. In addition, there has been an increasing demand for a wider variety of reception techniques that allow users to receive signals while travelling (e.g., in a running car). Accordingly, robustness against delay spread and Doppler broadening is desired in the field of channel characteristics estimation.

With reference to FIG. 42, the following describes general processing for correcting amplitude distortions and phase distortions in the ISDB-T and DVB-T standards. In a receiver 1000, an FFT unit 1001 separates a reception signal into a plurality of carriers by performing the Fast Fourier Transform (FFT) on the reception signal on a per-symbol basis. A channel characteristics estimation unit 1003 estimates channel characteristics using SP signals included in the signals output from the FFT unit 1001. An equalization unit 1002 corrects the amplitude distortions and phase distortions by which the signals output from the FFT unit 1001 have been affected, by multiplying the signals output from the FFT unit 1001 by the reverse characteristics of the estimated channel characteristics. In the above manner, the equalization unit 1002 estimates the transmission signal.

In general, there are following two basic methods of estimating channel characteristics using SP signals.

A description is now given of the first method of estimating channel characteristics with reference to FIGS. 43, 44A and 44B. FIG. 43 shows the structure of the channel characteristics estimation unit 1003. In the channel characteristics estimation unit 1003, an SP channel characteristics estimation subunit 1010 (i) extracts SP signals from the signals output from the FFT unit 1001, (ii) generates reference SP signals that are known to the receiver (i.e., SP signals whose amplitudes and phases are the same as those of the SP signals generated by the transmitter), (iii) divides each of the extracted SP signals by a corresponding one of the generated reference SP signals, and (iv) outputs, to a symbol direction interpolation subunit 1011, each result of the division as a value of channel characteristics at the SP carrier to which the corresponding SP signal is allocated. The symbol direction interpolation subunit 1011 calculates values of channel characteristics at carriers whose carrier numbers are "0" or a multiple of "3" (hereafter, "$3n^{th}$ carriers" with n being an integer equal to or larger than "0"), by interpolating, in the symbol (time) direction, the values of channel characteristics at the SP carriers, which have been output from the SP channel characteristics estimation subunit 1010 (see FIG. 44A). Thereafter, a carrier direction interpolation subunit 1012 calculates values of channel characteristics at all the carriers by interpolating, in the carrier (frequency) direction, the values of channel characteristics at $3n^{th}$ carriers, which have been output from the symbol direction interpolation subunit 1011 (see FIG. 44B). As the first method estimates channel characteristics using SP signals each of which is allocated to every $4^{th}$ symbol in the symbol direction, the first method is referred to as "four symbol estimation" below.

As opposed to the above first method, the second method does not interpolate the channel characteristics at the SP carriers in the symbol direction. Instead, the second method calculates channel characteristics at all the carriers by interpolating, only in the carrier direction, the channel characteristics at the SP carriers that are eleven carriers apart from one another in each symbol. As the second method estimates channel characteristics using SP signals included in every one of the symbols, the second method is referred to as "one symbol estimation" below.

A description is now given of the one symbol estimation with reference to FIGS. 45 and 46. FIG. 45 shows the structure of a channel characteristics estimation unit 1003a. In the channel characteristics estimation unit 1003a, an SP channel characteristics estimation subunit 1010 (i) calculates channel characteristics at the SP carriers in the above-described manner, and (ii) outputs, to a carrier direction interpolation subunit 1012a, values of the calculated channel characteristics at the SP carriers that are eleven carriers apart from one another in each symbol. The carrier direction interpolation subunit 1012a calculates values of channel characteristics at all the carriers by interpolating, in the carrier direction, the values of the channel characteristics at the SP carriers output from the SP channel characteristics estimation subunit 1010, the SP carriers being eleven carriers apart from one another in each symbol (see FIG. 46).

The aforementioned four symbol estimation and one symbol estimation have the following features. Note, given that an OFDM useful symbol length, an OFDM symbol length and a guard interval length are respectively expressed as Tu[s], Ts[s] and Tg[s], they satisfy the relationship shown in the following (Equation 2).

$$Ts = Tu + Tg \quad \text{(Equation 2)}$$

In the case of four symbol estimation, the symbol direction interpolation is performed by using only the channel characteristics at the SP carriers that are three symbols apart from one another in the symbol direction. Hence, according to the sampling theorem, the symbol direction interpolation is performed using a filter whose passband is equal to or smaller than 1/(4 Ts) [Hz] as shown in FIG. 47A. For this reason, in the case of four symbol estimation, the symbol direction interpolation can be performed without being affected by aliasing as long as the Doppler broadening is equal to or smaller than 1/(4 Ts) [Hz]. After performing the symbol direction interpolation, the carrier direction interpolation is performed by using only the channel characteristics at the $3n^{th}$ carriers. Hence, according to the sampling theorem, the carrier direction interpolation is performed using a filter whose passband is equal to or smaller than Tu/3 [s] as shown in FIG. 47B. For this reason, in the case of four symbol estimation, the carrier direction interpolation can be performed without being affected by aliasing as long as the delay spread is equal to or smaller than Tu/3 [s]. As set forth above, in the case of four symbol estimation, the channel characteristics can be estimated if the Doppler broadening is equal to or smaller than 1/(4 Ts) [Hz] and the delay spread is equal to or smaller than Tu/3 [s].

On the other hand, in the case of one symbol estimation, the interpolation is not performed in the symbol direction; hence, according to the sampling theorem, the first symbol estimation can be performed without being affected by aliasing as long as the Doppler broadening is equal to or smaller than 1/Ts [Hz]. Also, in the case of one symbol estimation, the carrier direction interpolation is performed by using only the channel characteristics at the SP carriers that are eleven carriers apart from one another in each symbol. Therefore, according to the sampling theorem, the carrier direction interpolation is performed using a filter whose passband is equal to or smaller than Tu/12 [s] as shown in FIG. 48. For this reason, in the case of one symbol estimation, the carrier direction interpolation can be performed without being affected by aliasing as long as the delay spread is equal to or smaller than Tu/12 [s]. As set forth above, in one symbol estimation, the channel characteristics can be estimated as long as the Doppler broadening is equal to or smaller than 1/Ts [Hz] and the delay spread is equal to or smaller than Tu/12 [s].

Non-Patent Literature 1 discloses technology for performing two-dimensional adaptive interpolation in the symbol and carrier directions. This technology involves adaptive interpolation using a Wiener filter, and allows (i) calculating optimum filter coefficients based on the maximum delay and the maximum Doppler frequency and (ii) performing the interpolation based on the calculated optimum filter coefficients by using values of channel characteristics at carriers to which the pilot signals are allocated, the channel characteristics being calculated based on the pilot signals.

More specifically, based on the maximum delay amount $\tau_{max}$ and the maximum Doppler frequency $f_{Dmax}$, the receiver calculates an autocorrelation matrix and cross-covariance vectors that are shown in the following (Equation 3) to (Equation 6). Thereafter, based on the calculated autocorrelation matrix and cross-covariance vectors, the receiver calculates filter coefficients using the following (Equation 7). Then, the receiver performs the interpolation based on the calculated filter coefficients by using the values of channel characteristics at the carries to which the pilot signals are allocated, the channel characteristics being calculated based on the pilot signals.

$$\theta_{\Delta t, \Delta f}(k - k'', l - l'') = \theta_{\Delta t}(k - k'') \theta_{\Delta f}(l - l'') \quad \text{(Equation 3)}$$

$$\theta_{\Delta t}(k' - k'') = si(2\pi f_{Dmax} T_s(k - k'')) \quad \text{(Equation 4)}$$

$$\theta_{\Delta f}(l' - l'') = si(2\pi \tau_{max} \Delta F(l - l'')) \quad \text{(Equation 5)}$$

$$\Phi(k' - k'', l' - l'') = \quad \text{(Equation 6)}$$
$$\frac{N_0}{E_s} \delta(k' - k'', l' - l'') + \theta_{\Delta t}(k' - k'') \theta_{\Delta f}(l' - l'')$$

$$\omega_0^T(k, l) = \underline{\theta}^T(k, l) \Phi^{-1} \quad \text{(Equation 7)}$$

In the above manner, an interpolation filter can be formed according to the receiving environment that the receiver is in, and the passband of the interpolation filter can be changed to alleviate the delay spread and Doppler broadening. Therefore, when the extents of the delay spread and Doppler broadening are small, the passband of the interpolation filter can be adaptively narrowed. This results in removal of noise components and improvements in accuracy of channel characteristics estimation.

CITATION LIST

Non-Patent Literature

[Non-Patent Literature 1]
P. Hoeher, S. Kaiser, P. Robertson. "Two-Dimensional Pilot-Symbol-Aided Channel Estimation by Wiener Filtering." Acoustics, Speech, and Signal Processing (ICASSP '97), the IEEE International Conference on Volume 3, Apr. 21-24, 1997. Pages 1845-1848. Vol. 3, Digital Object Identifier 10. 1109/ICASSP. 1997. 5988897.

SUMMARY OF INVENTION

Technical Problem

Assume a case where the aforementioned four symbol estimation is used. Here, if the receiver is in a receiving environment where, for example, there is no delayed wave whose delay spread exceeds Tu/3 [s], then the components of desired dominant waves and desired delayed waves pass through the filter used for the carrier direction interpolation, because they fall within the passband of the filter (see FIG. 49A). Accordingly, channel characteristics can be properly estimated. On the other hand, if the receiver is in a receiving environment where there is a delayed wave whose delay spread exceeds Tu/3 [s], then the components of such a desired delayed wave do not pass through the filter because they fall outside the passband of the filter; however, undesired aliasing components pass through the filter as they fall within the passband of the filter (see FIG. 49B). Accordingly, channel characteristics cannot be properly estimated. This makes it impossible for the receiver to properly correct the amplitude distortions and phase distortions by which the reception signal has been affected in the channel, and gives rise to the problem that the receiving performance of the receiver is deteriorated.

Assume a case where the aforementioned one symbol estimation is used. Here, if the receiver is in a receiving environment where, for example, there is no delayed wave whose delay spread exceeds Tu/12 [s], then the components of desired dominant waves and desired delayed waves pass through the filter used for the carrier direction interpolation, because they fall within the passband of the filter (see FIG. 50A). Accordingly, channel characteristics can be properly estimated. On the other hand, if the receiver is in a receiving environment where there is a delayed wave whose delay spread exceeds Tu/12 [s], then the components of such a desired delayed wave do not pass through the filter because they fall outside the passband of the filter; however, undesired aliasing components pass through the filter as they fall within the passband of the filter (see FIG. 50B). Accordingly, channel characteristics cannot be properly estimated. This makes it impossible for the receiver to properly correct the amplitude distortions and phase distortions by which the reception signal has been affected in the channel, and gives rise to the problem that the receiving performance of the receiver is deteriorated.

Currently, the ratio of a guard interval to a useful symbol that is most commonly used in the ISDB-T standard is ⅛.

Hence, with the one symbol estimation, interpolation cannot be performed for delayed waves included in the guard interval. That is to say, although the level of robustness against mobility is improved to 1/Ts [Hz], the receiver would have difficulty receiving a signal if it is in a receiving environment where there are delayed waves that are included in the guard interval.

In addition, the channel characteristics estimation method disclosed in Non-Patent Literature 1 merely allows adaptively changing the width of the passband of the filter according to the receiving environment that the receiver is in, but does not allow removing aliasing components which, according to the sampling theorem, appear between the dominant waves and the delayed waves. Hence, as is the cases with the aforementioned four symbol estimation and one symbol estimation, the method disclosed in Non-Patent Literature 1 also gives rise to the problem that the receiving performance of the receiver is deteriorated.

In view of the above problem, the present invention aims to provide a receiver, an integrated circuit, a digital television receiver, a reception method and a reception program that can improve accuracy of channel characteristics estimation by enhancing robustness against delay spread, even in a receiving environment where there is a long delay in signal reception.

Solution to Problem

In order to solve the above aim, the present invention provides a receiver that receives a reception signal in which a plurality of symbols are arranged in a time axis direction, each symbol including a plurality of carriers that are arranged in a frequency axis direction, the receiver comprising: a separation unit operable to, on a per-symbol basis, (i) separate the reception signal into the carriers and (ii) output the separated carriers; a first channel calculation unit operable to (i) calculate first channel characteristics at a plurality of first carriers included in the carriers output from the separation unit, the first carriers being disposed at a constant interval in the frequency axis direction and belonging to a first carrier group in each symbol, and (ii) output the calculated first channel characteristics; a second channel calculation unit operable to (i) calculate second channel characteristics at one or more second carriers included in the carriers output from the separation unit, the second carriers being different from the first carriers, and (ii) output the calculated second channel characteristics; and an adaptive interpolation unit operable to (i) calculate filter coefficients according to the first channel characteristics and the second channel characteristics, (ii) calculate channel characteristics at one or more other carriers than the first carriers, by filtering the first channel characteristics with use of values of the calculated filter coefficients, and (iii) output the calculated channel characteristics at the other carriers.

The present invention also provides an integrated circuit for a reception signal in which a plurality of symbols are arranged in a time axis direction, each symbol including a plurality of carriers that are arranged in a frequency axis direction, the integrated circuit comprising: a separation unit operable to, on a per-symbol basis, (i) separate the reception signal into the carriers and (ii) output the separated carriers; a first channel calculation unit operable to (i) calculate first channel characteristics at a plurality of first carriers included in the carriers output from the separation unit, the first carriers being disposed at a constant interval in the frequency axis direction and belonging to a first carrier group in each symbol, and (ii) output the calculated first channel characteristics;

a second channel calculation unit operable to (i) calculate second channel characteristics at one or more second carriers included in the carriers output from the separation unit, the second carriers being different from the first carriers, and (ii) output the calculated second channel characteristics; and an adaptive interpolation unit operable to (i) calculate filter coefficients according to the first channel characteristics and the second channel characteristics, (ii) calculate channel characteristics at one or more other carriers than the first carriers, by filtering the first channel characteristics with use of values of the calculated filter coefficients, and (iii) output the calculated channel characteristics at the other carriers.

The present invention also provides a digital television receiver that receives a reception signal in which a plurality of symbols are arranged in a time axis direction, each symbol including a plurality of carriers that are arranged in a frequency axis direction, the receiver comprising: a separation unit operable to, on a per-symbol basis, (i) separate the reception signal into the carriers and (ii) output the separated carriers; a first channel calculation unit operable to (i) calculate first channel characteristics at a plurality of first carriers included in the carriers output from the separation unit, the first carriers being disposed at a constant interval in the frequency axis direction and belonging to a first carrier group in each symbol, and (ii) output the calculated first channel characteristics; a second channel calculation unit operable to (i) calculate second channel characteristics at one or more second carriers included in the carriers output from the separation unit, the second carriers being different from the first carriers, and (ii) output the calculated second channel characteristics; and an adaptive interpolation unit operable to (i) calculate filter coefficients according to the first channel characteristics and the second channel characteristics, (ii) calculate channel characteristics at one or more other carriers than the first carriers, by filtering the first channel characteristics with use of values of the calculated filter coefficients, and (iii) output the calculated channel characteristics at the other carriers.

The present invention also provides a reception method used in a receiver that receives a reception signal in which a plurality of symbols are arranged in a time axis direction, each symbol including a plurality of carriers that are arranged in a frequency axis direction, the reception method comprising: a separation step of, on a per-symbol basis, (i) separating the reception signal into the carriers and (ii) outputting the separated carriers; a first channel calculation step of (i) calculating first channel characteristics at a plurality of first carriers included in the carriers output in the separation step, the first carriers being disposed at a constant interval in the frequency axis direction and belonging to a first carrier group in each symbol, and (ii) outputting the calculated first channel characteristics; a second channel calculation step of (i) calculating second channel characteristics at one or more second carriers included in the carriers output in the separation step, the second carriers being different from the first carriers, and (ii) outputting the calculated second channel characteristics; and an adaptive interpolation step of (i) calculating filter coefficients according to the first channel characteristics and the second channel characteristics, (ii) calculating channel characteristics at one or more other carriers than the first carriers, by filtering the first channel characteristics with use of values of the calculated filter coefficients, and (iii) outputting the calculated channel characteristics at the other carriers.

The present invention also provides a reception program for a receiver that receives a reception signal in which a plurality of symbols are arranged in a time axis direction, each symbol including a plurality of carriers that are arranged in a frequency axis direction, the reception program causing the receiver to execute the following steps: a separation step of, on a per-symbol basis, (i) separating the reception signal into the carriers and (ii) outputting the separated carriers; a first channel calculation step of (i) calculating first channel characteristics at a plurality of first carriers included in the carriers output in the separation step, the first carriers being disposed at a constant interval in the frequency axis direction and belonging to a first carrier group in each symbol, and (ii) outputting the calculated first channel characteristics; a second channel calculation step of (i) calculating second channel characteristics at one or more second carriers included in the carriers output in the separation step, the second carriers being different from the first carriers, and (ii) outputting the calculated second channel characteristics; and an adaptive interpolation step of (i) calculating filter coefficients according to the first channel characteristics and the second channel characteristics, (ii) calculating channel characteristics at one or more other carriers than the first carriers, by filtering the first channel characteristics with use of values of the calculated filter coefficients, and (iii) outputting the calculated channel characteristics at the other carriers.

Advantageous Effects of Invention

According to each of the above receiver, integrated circuit, digital television receiver, reception method and reception program, filter coefficients are calculated (i) by using only signals allocated to some of the carriers that are included in each symbol and output from/in the separation unit/step, said some of the carriers being predetermined carriers in the frequency axis direction, and (ii) based on the first channel characteristics output from/in the first channel characteristics calculation unit/step and the second channel characteristics output from/in the second channel characteristics calculation unit/step. Then, the first channel characteristics output from/in the first channel characteristics calculation unit/step are filtered with use of the calculated filter coefficients. In this manner, the above structures calculate filter coefficients that are used by/in the adaptive interpolation unit/step when filtering the first channel characteristics output from/in the first channel characteristics calculation unit/step, by using values of channel characteristics at the second carriers which have been actually received. Accordingly, the above structures make it possible to calculate filter coefficients realizing a filter property that makes (i) a band including desired signal components a passband, and (ii) a band including aliasing components a cut-off band, the aliasing components appearing in a case where signal components are extracted at a constant interval. As a result, the above structures can not only enhance robustness against delay spread, but also improve accuracy of calculation of channel characteristics, even in a receiving environment where there is a long delay in signal reception.

BRIEF DESCRIPTION OF DRAWINGS

FIG. 7 shows carrier numbers assigned to carriers to which TMCC signals are allocated when Mode 3 of the ISDB-T standard and synchronous modulation are utilized;

FIG. 11 shows, of all the carrier numbers 3n+1, carrier numbers assigned to carriers to which TMCC signals are allocated;

FIG. 12 shows, of all the carrier numbers 3n+2, carrier numbers assigned to carriers to which TMCC signals are allocated;

FIG. 14A shows a concept of filter configuration used in conventional interpolation (four symbol estimation), and FIG. 14B shows a concept of filter configuration used in adaptive interpolation performed by the adaptive interpolation part of First Embodiment;

FIG. 15A shows a range within which interpolation can be performed with conventional technology (four symbol estimation), and FIG. 15B shows a range within which adaptive interpolation can be performed by the adaptive interpolation part of First Embodiment;

FIG. 18 shows carrier numbers assigned to carriers to which AC signals are allocated when Mode 3 of the ISDB-T standard and synchronous modulation are utilized;

FIG. 22 shows carrier numbers assigned to carriers to which TPS signals are allocated when 8 k Mode of the DVB-T standard is utilized;

FIG. 25 shows carrier numbers assigned to carriers to which continual pilot signals (CP signals) are allocated when 8 k Mode of the DVB-T standard is utilized;

FIG. 29A shows a concept of filter configuration used in conventional interpolation (one symbol estimation), and FIG. 29B shows a concept of filter configuration used in adaptive interpolation performed by the adaptive interpolation part of Fifth Embodiment;

FIG. 30A shows a range within which interpolation can be performed with conventional technology (one symbol estimation), and FIG. 30B shows a range within which adaptive interpolation can be performed by the adaptive interpolation part of Fifth Embodiment;

FIG. 34A shows a concept of filter configuration used in conventional interpolation (one symbol estimation), and FIG. 34B shows a concept of filter configuration used in adaptive interpolation pertaining to Sixth Embodiment;

FIG. 40 exemplarily shows carrier numbers assigned to carriers to which continual pilot signals are allocated according to the DVB-T2 standard;

FIG. 47A shows a concept of symbol direction interpolation that is performed with four symbol estimation, and FIG. 47B shows a concept of carrier direction interpolation that is performed with four symbol estimation;

FIG. 49A shows a concept of carrier direction interpolation that is performed with four symbol estimation when there are no delayed waves whose delay spread exceeds Tu/3, and FIG. 49B shows a concept of carrier direction interpolation that is performed with four symbol estimation when there are delayed waves whose delay spread exceeds Tu/3; and FIG. 50A shows a concept of carrier direction interpolation that is performed with one symbol estimation when there are no delayed waves whose delay spread exceeds Tu/12, and FIG. 50B shows a concept of carrier direction interpolation that is performed with one symbol estimation when there are delayed waves whose delay spread exceeds Tu/12.

DESCRIPTION OF EMBODIMENTS

Figure 1:
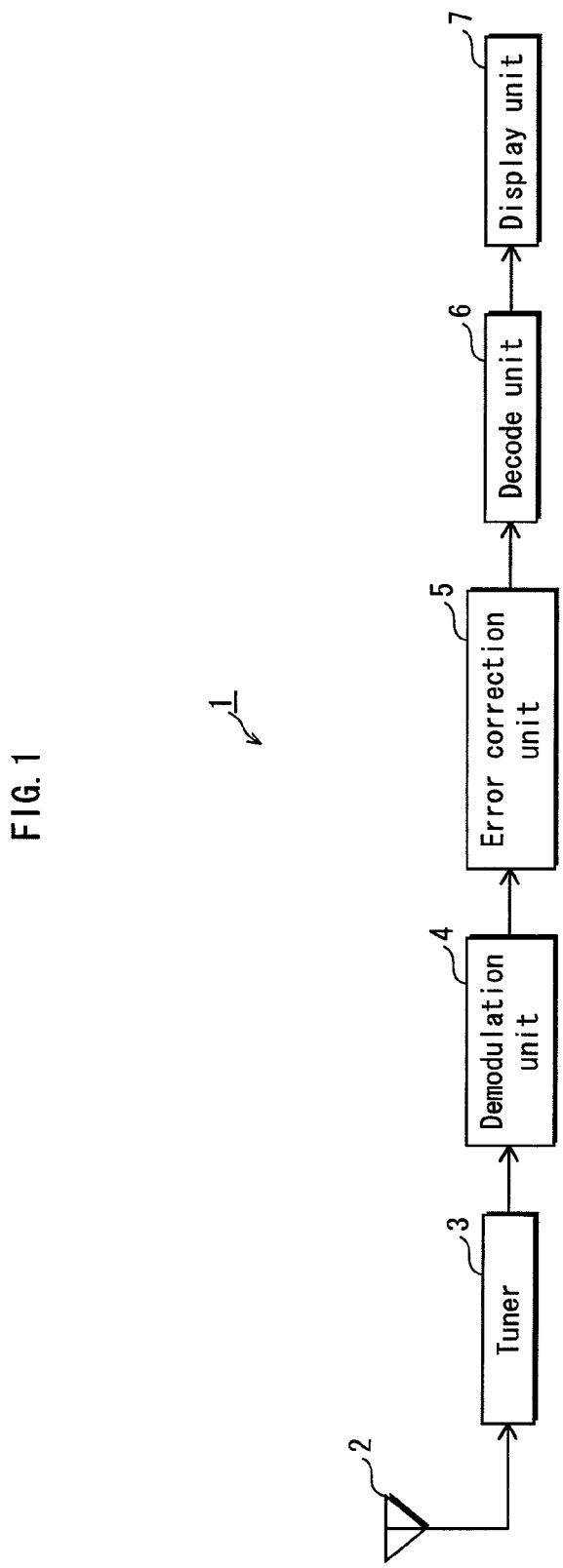
FIG. 1 is a structural diagram of a receiver pertaining to First Embodiment.

One aspect of the present invention is a first receiver that receives a reception signal in which a plurality of symbols are arranged in a time axis direction, each symbol including a plurality of carriers that are arranged in a frequency axis direction, the first receiver comprising: a separation unit operable to, on a per-symbol basis, (i) separate the reception signal into the carriers and (ii) output the separated carriers; a first channel calculation unit operable to (i) calculate first channel characteristics at a plurality of first carriers included in the carriers output from the separation unit, the first carriers being disposed at a constant interval in the frequency axis direction and belonging to a first carrier group in each symbol, and (ii) output the calculated first channel characteristics; a second channel calculation unit operable to (i) calculate second channel characteristics at one or more second carriers included in the carriers output from the separation unit, the second carriers being different from the first carriers, and (ii) output the calculated second channel characteristics; and an adaptive interpolation unit operable to (i) calculate filter coefficients according to the first channel characteristics and the second channel characteristics, (ii) calculate channel characteristics at one or more other carriers than the first carriers, by filtering the first channel characteristics with use of values of the calculated filter coefficients, and (iii) output the calculated channel characteristics at the other carriers.

Another aspect of the present invention is an integrated circuit for a reception signal in which a plurality of symbols are arranged in a time axis direction, each symbol including a plurality of carriers that are arranged in a frequency axis direction, the integrated circuit comprising: a separation unit operable to, on a per-symbol basis, (i) separate the reception signal into the carriers and (ii) output the separated carriers; a first channel calculation unit operable to (i) calculate first channel characteristics at a plurality of first carriers included in the carriers output from the separation unit, the first carriers being disposed at a constant interval in the frequency axis direction and belonging to a first carrier group in each symbol, and (ii) output the calculated first channel characteristics; a second channel calculation unit operable to (i) calculate second channel characteristics at one or more second carriers included in the carriers output from the separation unit, the second carriers being different from the first carriers, and (ii) output the calculated second channel characteristics; and an adaptive interpolation unit operable to (i) calculate filter coefficients according to the first channel characteristics and the second channel characteristics, (ii) calculate channel characteristics at one or more other carriers than the first carriers, by filtering the first channel characteristics with use of values of the calculated filter coefficients, and (iii) output the calculated channel characteristics at the other carriers.

Yet another aspect of the present invention is a digital television receiver that receives a reception signal in which a plurality of symbols are arranged in a time axis direction, each symbol including a plurality of carriers that are arranged in a frequency axis direction, the digital television receiver comprising: a separation unit operable to, on a per-symbol basis, (i) separate the reception signal into the carriers and (ii) output the separated carriers; a first channel calculation unit operable to (i) calculate first channel characteristics at a plurality of first carriers included in the carriers output from the separation unit, the first carriers being disposed at a constant interval in the frequency axis direction and belonging to a first carrier group in each symbol, and (ii) output the calculated first channel characteristics; a second channel calculation unit operable to (i) calculate second channel characteristics at one or more second carriers included in the carriers output from the separation unit, the second carriers being different from the first carriers, and (ii) output the calculated second channel characteristics; and an adaptive interpolation unit operable to (i) calculate filter coefficients according to the first channel characteristics and the second channel characteristics, (ii) calculate channel characteristics at one or more other carriers than the first carriers, by filtering the first channel characteristics with use of values of the calculated filter coefficients, and (iii) output the calculated channel characteristics at the other carriers.

Yet another aspect of the present invention is a reception method used in a receiver that receives a reception signal in which a plurality of symbols are arranged in a time axis direction, each symbol including a plurality of carriers that are arranged in a frequency axis direction, the reception method comprising: a separation step of, on a per-symbol basis, (i) separating the reception signal into the carriers and (ii) outputting the separated carriers; a first channel calculation step of (i) calculating first channel characteristics at a plurality of first carriers included in the carriers output in the separation step, the first carriers being disposed at a constant interval in the frequency axis direction and belonging to a first carrier group in each symbol, and (ii) outputting the calculated first channel characteristics; a second channel calculation step of (i) calculating second channel characteristics at one or more second carriers included in the carriers output in the separation step, the second carriers being different from the first carriers, and (ii) outputting the calculated second channel characteristics; and an adaptive interpolation step of (i) calculating filter coefficients according to the first channel characteristics and the second channel characteristics, (ii) calculating channel characteristics at one or more other carriers than the first carriers, by filtering the first channel characteristics with use of values of the calculated filter coefficients, and (iii) outputting the calculated channel characteristics at the other carriers.

Yet another aspect of the present invention is a reception program for a receiver that receives a reception signal in which a plurality of symbols are arranged in a time axis direction, each symbol including a plurality of carriers that are arranged in a frequency axis direction, the reception program causing the receiver to execute the following steps: a separation step of, on a per-symbol basis, (i) separating the reception signal into the carriers and (ii) outputting the separated carriers; a first channel calculation step of (i) calculating first channel characteristics at a plurality of first carriers included in the carriers output in the separation step, the first carriers being disposed at a constant interval in the frequency axis direction and belonging to a first carrier group in each symbol, and (ii) outputting the calculated first channel characteristics; a second channel calculation step of (i) calculating second channel characteristics at one or more second carriers included in the carriers output in the separation step, the second carriers being different from the first carriers, and (ii) outputting the calculated second channel characteristics; and an adaptive interpolation step of (i) calculating filter coefficients according to the first channel characteristics and the second channel characteristics, (ii) calculating channel characteristics at one or more other carriers than the first carriers, by filtering the first channel characteristics with use of values of the calculated filter coefficients, and (iii) outputting the calculated channel characteristics at the other carriers.

According to each of the above first receiver, integrated circuit, digital television receiver, reception method and reception program, filter coefficients are calculated (i) by using only signals allocated to some of the carriers that are included in each symbol and output from/in the separation unit/step, said some of the carriers being predetermined carriers in the frequency axis direction, and (ii) based on the first channel characteristics output from/in the first channel characteristics calculation unit/step and the second channel characteristics output from/in the second channel characteristics calculation unit/step. Then, the first channel characteristics output from/in the first channel characteristics calculation unit/step are filtered with use of the calculated filter coefficients. In this manner, the above structures calculate filter coefficients that are used by/in the adaptive interpolation unit/step when filtering the first channel characteristics output from/in the first channel characteristics calculation unit/step, by using values of channel characteristics at the second carriers which have been actually received. Accordingly, the above structures make it possible to calculate filter coefficients realizing a filter property that makes (i) a band including desired signal components a passband, and (ii) a band including aliasing components a cut-off band, the aliasing components appearing in a case where signal components are extracted at a constant interval. As a result, the above structures can not only enhance robustness against delay spread, but also improve accuracy of calculation of channel characteristics, even in a receiving environment where there is a long delay in signal reception.

Furthermore, the above structures make it possible to calculate filter coefficients that would not require undue broadening of the passband of the filter. Accordingly, the above structures can not only prevent the reception signal from being affected by noise components, such as Johnson-Nyquist noise and Intercarrier interference components associated with mobility of the receiver, but also improve robustness against noise.

Yet another aspect of the present invention is a second receiver, which is the aforementioned first receiver wherein the adaptive interpolation unit calculates the filter coefficients so that a mean squared error between the following (i) and (ii) becomes the smallest: (i) each of the values of the channel characteristics at the second carriers which are calculated by filtering the first channel characteristics with use of the values of the calculated filter coefficients; and (ii) a corresponding one of the values of the second channel characteristics which are output from the second channel calculation unit.

According to the above structure, the filter coefficients are calculated so that the following values become close to each other: (i) each of values of channel characteristics at the second carriers, which are obtained by filtering the first channel characteristics output from the first channel calculation unit; and (ii) a corresponding one of values of the second channel characteristics, which are calculated by the second channel calculation unit and have not been affected by aliasing components. Accordingly, the above structure makes it possible to calculate filter coefficients realizing a filter property that makes (i) a band including desired signal components a passband, and (ii) a band including aliasing components a cut-off band, the aliasing components appearing in a case where signal components are extracted at a constant interval. As a result, the above structure cannot only enhance robustness against delay spread, but also improve accuracy of calculation of channel characteristics, even in a receiving environment where there is a long delay in signal reception.

Yet another aspect of the present invention is a third receiver, which is the aforementioned first receiver wherein the adaptive interpolation unit includes: an autocorrelation calculation subunit operable to calculate an autocorrelation matrix (R) by performing autocorrelation calculations on the first channel characteristics; a cross-correlation calculation subunit operable to calculate a cross-correlation matrix (P) by performing cross-correlation calculations on the first channel characteristics and the second channel characteristics; a filter coefficient calculation subunit operable to calculate the filter coefficients by performing a multiplication $(R^{-1}) \times (P)$, where $(R^{-1})$ denotes an inverse matrix of the autocorrelation matrix (R); and a filter processing subunit operable to filter the first channel characteristics with use of the values of the calculated filter coefficients.

With the above structure, the filter coefficients can be easily calculated.

Yet another aspect of the present invention is a fourth receiver, which is the aforementioned first receiver wherein (i) the first carrier group includes a plurality of pilot carriers to which certain signals whose amplitudes and phases are known to the receiver are allocated, the pilot carriers being disposed at a constant interval in the frequency axis direction in each symbol, and (ii) the first channel calculation unit includes: a pilot channel estimation subunit operable to (a) estimate channel characteristics at each of the pilot carriers by using (1) a corresponding one of the carriers output from the separation unit and (2) a corresponding one of the certain signals, and (b) output the estimated channel characteristics at the pilot carriers; and a symbol direction interpolation subunit operable to (a) interpolate, in a symbol direction, the channel characteristics at the pilot carriers, and (b) output results of the interpolation.

The above structure can increase the number of second carriers used in calculating each filter coefficient. Accordingly, the above structure can reduce the effects of errors in calculation of channel characteristics at the second carriers, and improve accuracy of calculation of filter coefficients. As a result, when the fluctuations of channel characteristics in the time axis direction are small, or when the level of Doppler broadening is small, the above structure can further enable the adaptive interpolation unit to calculate channel characteristics with higher accuracy, and lower the rate of errors in demodulated data.

Yet another aspect of the present invention is a fifth receiver, which is the aforementioned fourth receiver wherein (i) the reception signal is a signal that has been specified by an ISDB-T standard, (ii) the pilot carriers are carriers to each of which a scattered pilot is allocated, and (iii) the second carriers are carriers to each of which one or both of a TMCC and an AC is/are allocated.

The above fifth receiver can be directly applied to the ISDB-T standard.

Yet another aspect of the present invention is a sixth receiver, which is the aforementioned fourth receiver wherein (i) the reception signal is a signal that has been specified by a DVB-T standard or a DVB-H standard, (ii) the pilot carriers are carriers to each of which a scattered pilot is allocated, and (iii) the second carriers are carriers to each of which a TPS is allocated.

The above sixth receiver can be directly applied to the DVB-T standard or the DVB-H standard.

Yet another aspect of the present invention is a seventh receiver, which is the aforementioned fourth receiver wherein (i) the reception signal is a signal that has been specified by a DVB-T2 standard, (ii) the pilot carriers are carriers to each of which a scattered pilot is allocated, and (iii) the second carriers are carriers to each of which a continual pilot is allocated.

The above seventh receiver can be directly applied to the DVB-T2 standard.

Yet another aspect of the present invention is an eighth receiver, which is the aforementioned first receiver wherein (i) the first carrier group includes a plurality of pilot carriers to which certain signals whose amplitudes and phases are known to the receiver are allocated, the pilot carriers being disposed at a constant interval in the frequency axis direction in each symbol, and (ii) the first channel calculation unit (a) estimates channel characteristics at each of the pilot carriers by using (1) a corresponding one of the carriers output from the separation unit and (2) a corresponding one of the certain signals, and (b) outputs the estimated channel characteristics at the pilot carriers.

The above eighth receiver does not perform symbol direction interpolation. With no symbol direction interpolation, the eighth receiver's robustness against mobility is not impaired. Thus, compared to a case where the symbol direction interpolation is performed, the above structure can improve the eighth receiver's robustness against mobility. Furthermore, even when the eighth receiver is in a receiving environment where a delay in signal reception is so long that interpolation cannot be properly performed with conventional one symbol estimation and four symbol estimation due to the effects of aliasing components, the eighth receiver can properly perform interpolation without being affected by the aliasing components, and improve its robustness against delay.

Yet another aspect of the present invention is a ninth receiver, which is the aforementioned eight receiver wherein (i) the reception signal is a signal that has been specified by a DVB-T standard or a DVB-H standard, (ii) the pilot carriers are carriers to each of which a scattered pilot is allocated, and (iii) the second carriers are carriers to each of which both of a TPS and a continual pilot are allocated.

The above ninth receiver can be directly applied to the DVB-T standard or the DVB-H standard.

Yet another aspect of the present invention is a tenth receiver, which is the aforementioned eight receiver wherein (i) the reception signal is a signal that has been specified by a DVB-T2 standard, (ii) the pilot carriers are carriers to each of which a scattered pilot is allocated, and (iii) the second carriers are carriers to each of which a continual pilot is allocated.

The above tenth receiver can be directly applied to the DVB-T2 standard.

Yet another aspect of the present invention is an eleventh receiver, which is the aforementioned first receiver wherein (i) the first carrier group includes a plurality of pilot carriers to which certain signals whose amplitudes and phases are known to the receiver are allocated, the pilot carriers being disposed at a constant interval in the frequency axis direction in each symbol, (ii) the first channel calculation unit (a) estimates channel characteristics at each of the pilot carriers by using (1) a corresponding one of the carriers output from the separation unit and (2) a corresponding one of the certain signals, and (b) outputs the estimated channel characteristics at the pilot carriers, and (iii) the receiver further comprises a carrier direction interpolation unit operable to interpolate, in a carrier direction, the channel characteristics at the other carriers.

The above eleventh receiver does not perform symbol direction interpolation. With no symbol direction interpolation, the eleventh receiver's robustness against mobility is not impaired. Thus, compared to a case where the symbol direction interpolation is performed, the above structure can improve the eleventh receiver's robustness against mobility. Furthermore, even when the eleventh receiver is in a receiving environment where a delay in signal reception is so long that interpolation cannot be properly performed with conventional one symbol estimation and four symbol estimation due to the effects of aliasing components, the eleventh receiver can properly perform interpolation without being affected by the aliasing components, and improve its robustness against delay.

Yet another aspect of the present invention is a twelfth receiver, which is the aforementioned eleventh receiver wherein (i) the reception signal is a signal that has been specified by an ISDB-T standard, (ii) the pilot carriers are carriers to each of which a scattered pilot is allocated, and (iii) the second carriers are carriers to each of which one or both of a TMCC and an AC is/are allocated to.

The above twelfth receiver can be directly applied to the ISDB-T standard.

Yet another aspect of the present invention is a thirteenth receiver, which is the aforementioned eleventh receiver wherein (i) the reception signal is a signal that has been specified by a DVB-T standard or a DVB-H standard, (ii) the pilot carriers are carriers to each of which a scattered pilot is allocated, and (iii) the second carriers are carriers to each of which a TPS or a continual pilot is allocated.

The above thirteenth receiver can be directly applied to the DVB-T standard or the DVB-H standard.

Yet another aspect of the present invention is a fourteenth receiver, which is the aforementioned eleventh receiver wherein (i) the reception signal is a signal that has been specified by a DVB-T2 standard, (ii) the pilot carriers are carriers to each of which a scattered pilot is allocated, and (iii) the second carriers are carriers to each of which a continual pilot is allocated.

The above fourteenth receiver can be directly applied to the DVB-T2 standard.

Yet another aspect of the present invention is a fifteenth receiver, which is the aforementioned first receiver wherein the adaptive interpolation unit calculates (i) the filter coefficients by using (a) the first channel characteristics and (b) parts of the second channel characteristics, which are obtained from some of the second carriers that (1) are disposed at the same interval in the frequency direction as the first carriers belonging to the first carrier group and (2) belong to a second carrier group, and (ii) channel characteristics at carriers belonging to the second carrier group with use of the values of the calculated filter coefficients.

When calculating the filter coefficients, the above structure makes it possible to perform averaging with use of the second carriers. Accordingly, the above structure can improve accuracy of calculation of the filter coefficients, improve accuracy of interpolation, and consequently lower the rate of errors in demodulated data.

Yet another aspect of the present invention is a sixteenth receiver, which is the aforementioned fifteenth receiver wherein (i) the adaptive interpolation unit calculates the filter coefficients by using (a) the first channel characteristics and (b) parts of the second channel characteristics, which are obtained from some of the second carriers that (1) are disposed at the same interval in the frequency direction as the first carriers belonging to the first carrier group and (2) belong to a third carrier group, and (ii) a smallest value of a frequency interval between (a) each of the some of the second carriers belonging to the third carrier group and (b) a corresponding one of carriers belonging to the first carrier group, is equal to a smallest value of a frequency interval between (a) each of the some of the second carriers belonging to the second carrier group and (b) a corresponding one of the carriers belonging to the first carrier group.

The above structure increases the number of second carriers that are used in calculating the filter coefficients. As a result, the number of parameters that are used in performing averaging is increased. Therefore, the above structure can improve accuracy of calculation of the filter coefficients, improve accuracy of interpolation, and consequently lower the rate of errors in demodulated data.

Below, the embodiments of the present invention are described with reference to the accompanying drawings. Note, the following embodiments are described by taking an example of a receiver for receiving broadcast waves that have been generated and wirelessly transmitted based on the OFDM method.

First Embodiment

First Embodiment of the present invention is described below with reference to the accompanying drawings. Note, the following description of First Embodiment is given by taking an example of a digital television broadcast receiver compliant with the ISDB-T standard.

<Structure and Operations of Receiver>

FIG. 1 is a structural diagram of a receiver pertaining to the present embodiment. A receiver 1 is composed of an antenna 2, a tuner 3, a demodulation unit 4, an error correction unit 5, a decode unit 6, and a display unit 7.

The antenna 2 receives broadcast waves transmitted by broadcast stations (not illustrated), and outputs the received broadcast waves to the tuner 3. The tuner 3 selects a reception signal of a desired reception channel from among the broadcast waves input from the antenna 2, and outputs the selected reception signal to the demodulation unit 4. The demodulation unit 4 demodulates the reception signal input from the tuner 3, and outputs the demodulated signal (hereafter, "equalized signal") to the error correction unit 5. Specifics of the demodulation unit 4 are described later.

The error correction unit 5 (i) performs error correction on the equalized signal input from the demodulation unit 4, (ii) converts the equalized signal into digital data compressed using Moving Picture Experts Group (MPEG)-2 or the like, and (iii) outputs the digital data to the decode unit 6. The decode unit 6 decodes the compressed digital data input from the error correction unit 5 into video and audio signals, and outputs the decoded video and audio signals to the display unit 7. The display unit 7 displays video based on the video signal input from the decode unit 6, and outputs audio based on the audio signal input from the decode unit 6.

<Structure and Operations of Demodulation Unit>

Figure 2:
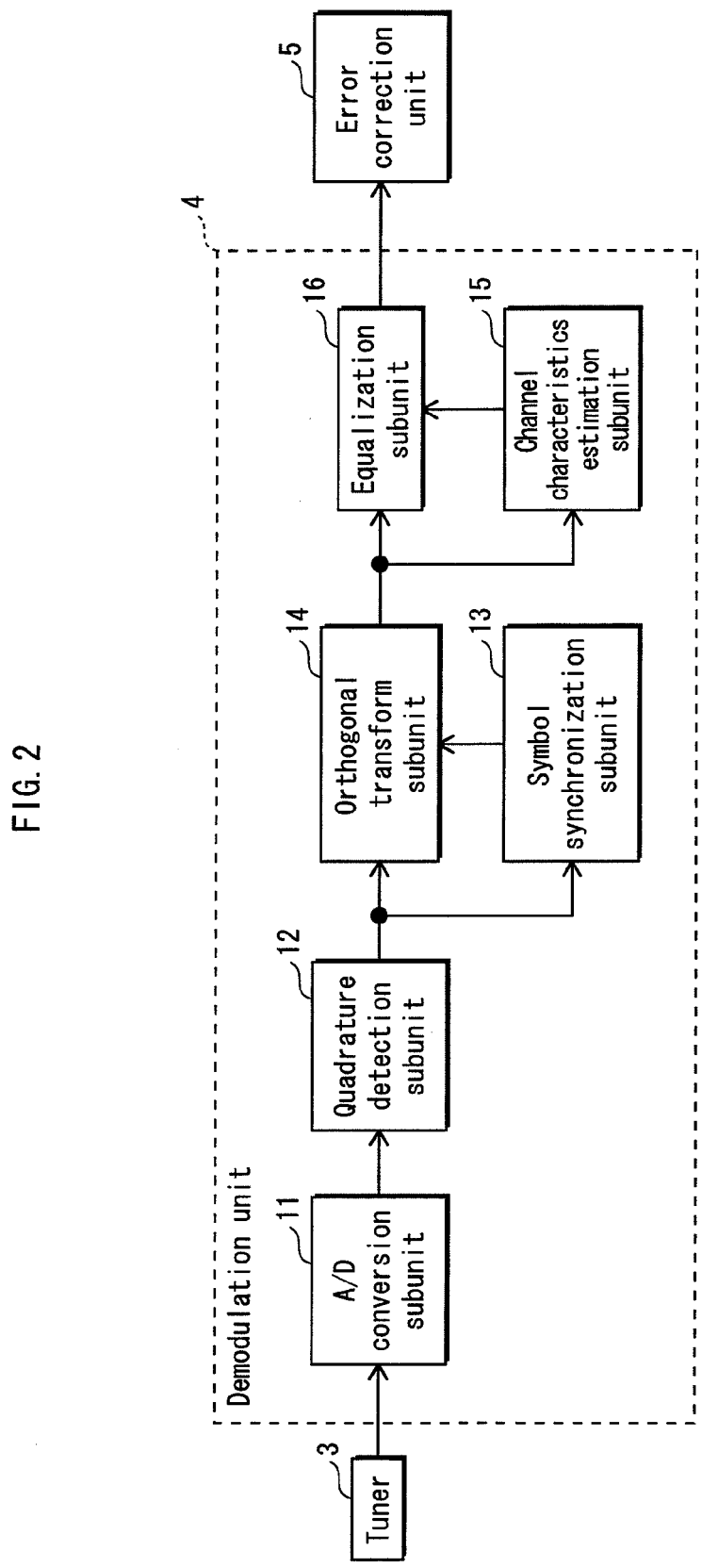
FIG. 2 is a structural diagram of a demodulation unit shown in FIG. 1.

FIG. 2 is a structural diagram of the demodulation unit 4 shown in FIG. 1. In FIG. 2, the tuner 3 and the error correction unit 5 are also illustrated to clearly convey how the internal elements of the demodulation unit 4 are connected thereto.

The demodulation unit 4 includes an A/D conversion subunit 11, a quadrature detection subunit 12, a symbol synchronization subunit 13, an orthogonal transform subunit 14, a channel characteristics estimation subunit 15, and an equalization subunit 16.

The A/D conversion subunit 11 converts the reception signal (an analog signal) input from the tuner 3 into a digital signal, and outputs the reception signal converted into the digital signal to the quadrature detection subunit 12. The quadrature detection subunit 12 performs quadrature detection on the reception signal input from the A/D conversion subunit 11, and outputs a complex baseband signal, which has been obtained as a result of the quadrature detection, to the symbol synchronization subunit 13 and the orthogonal transform subunit 14.

The symbol synchronization subunit 13 establishes synchronization relating to OFDM symbol durations by using the signal output from the quadrature detection subunit 12, and outputs a symbol position information signal (e.g., a signal indicating an FFT window position) to the orthogonal transform subunit 14. Based on the symbol position information signal, the orthogonal transform subunit 14 (i) performs orthogonal transform on the signal output from the quadrature detection subunit 12—i.e., separates the signal output from the quadrature detection subunit 12 into a plurality of carriers—on a per-symbol basis, and (ii) outputs signal that have been obtained as a result of the orthogonal transform to the channel characteristics estimation subunit 15 and the equalization subunit 16. Note, the orthogonal transform subunit 14 performs the orthogonal transform based on the Fourier transform, the cosine transform, the wavelet transform, the Hadamard transform, etc. The present description is given under the assumption that the orthogonal transform subunit 14 performs the orthogonal transform using the Fourier transform. More specifically, the orthogonal transform subunit 14 performs the Fourier transform on the signal output from the quadrature detection subunit 12, so as to transform the signal output from the quadrature detection subunit 12 into signals related to a frequency axis—i.e., separates the signal output from the quadrature detection subunit 12 into a plurality of carriers. Thereafter, the orthogonal transform subunit 14 outputs the signals related to the frequency axis to the channel characteristics estimation subunit 15 and the equalization subunit 16. Here, high-speed calculation can be realized by using the fast Fourier transform as the Fourier transform. Note, the orthogonal transform subunit 14 may use transformation methods other than the ones described above, as long as it can separate the signal output from the quadrature detection subunit 12 into a plurality of carriers.

The channel characteristics estimation subunit 15 estimates characteristics of amplitude distortions and phase distortions by which the reception signal has been affected in the channel (channel characteristics), and outputs values of the estimated channel characteristics to the equalization subunit 16. Specifics of the channel characteristics estimation subunit 15 are described later. With use of the values of the channel characteristics input from the channel characteristics estimation subunit 15, the equalization subunit 16 corrects the amplitude distortions and phase distortions in the signals output from the orthogonal transform subunit 14. The equalization subunit 16 then outputs the signals whose amplitude distortions and phase distortions have been corrected (equalized signals) to the error correction unit 5. Note, the equalization subunit 16 corrects the amplitude distortions and phase distortions by, for example, dividing (i) each signal output from the orthogonal transform subunit 14 by (ii) a corresponding one of the values of the channel characteristics that is assigned the same symbol number and the same carrier number as the signal, the values of the channel characteristics being input from the channel characteristics estimation subunit 15.

<Structure and Operations of Channel Characteristics Estimation Subunit>

Figure 3:
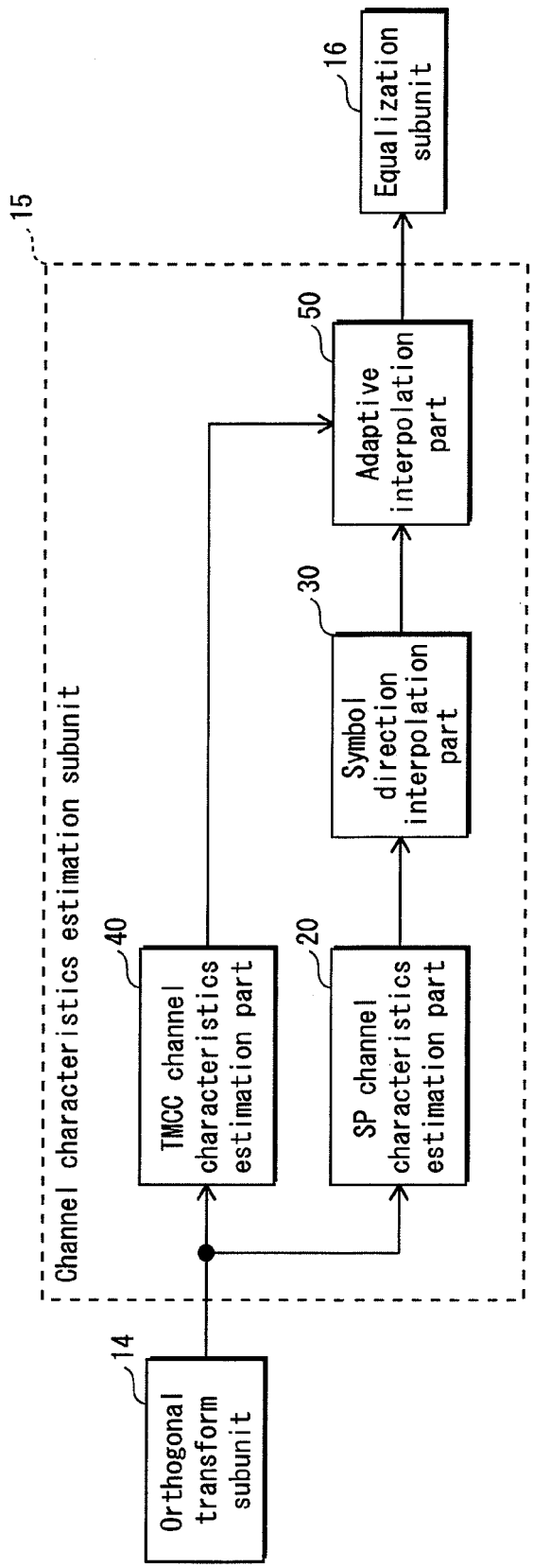
FIG. 3 is a structural diagram of a channel characteristics estimation subunit shown in FIG. 2.

FIG. 3 is a structural diagram of the channel characteristics estimation subunit 15 shown in FIG. 2. In FIG. 3, the orthogonal transform subunit 14 and the equalization subunit 16 are also illustrated to clearly convey how the internal elements of the channel characteristics estimation subunit 15 are connected thereto.

The channel characteristics estimation subunit 15 includes an SP channel characteristics estimation part 20, a symbol direction interpolation part 30, a TMCC channel characteristics estimation part 40, and an adaptive interpolation part 50.

The SP channel characteristics estimation part 20 (i) extracts scattered pilot signals (SP signals) from the signals output from the orthogonal transform subunit 14, (ii) based on the extracted SP signals, estimates SP channel characteristics, which are channel characteristics at the SP carriers to which the SP signals are allocated, and (iii) outputs values of the estimated SP channel characteristics to the symbol direction interpolation part 30.

Figure 4:
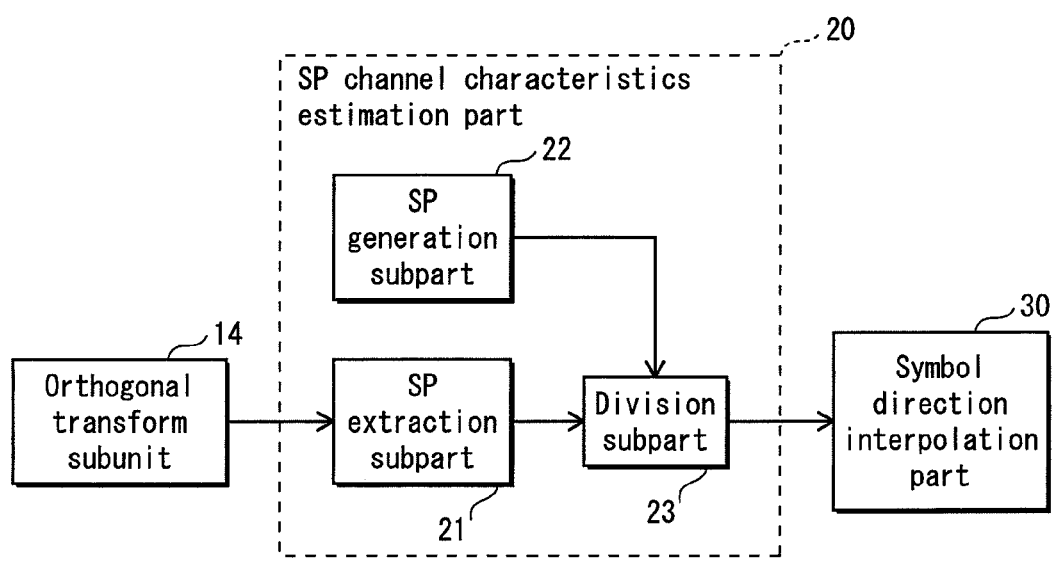
FIG. 4 is a structural diagram of an SP channel characteristics estimation part shown in FIG. 3.

The following describes the structure and operations of the SP channel characteristics estimation subunit 20 with reference to FIG. 4. FIG. 4 is a structural diagram of the SP channel characteristics estimation subunit 20 shown in FIG. 3. In FIG. 4, the orthogonal transform subunit 14 and the symbol direction interpolation part 30 are also illustrated to clearly convey how the internal elements of the SP channel characteristics estimation part 20 are connected thereto.

The SP channel characteristics estimation part 20 includes an SP extraction subpart 21, an SP generation subpart 22, and a division part 23. Note, these subparts can perform the following processing because the amplitudes, phases and positions of the SP signals generated by the transmitter are known to the receiver. It should be mentioned that in a case where the symbol number and the carrier number both start with "0", an SP signal is allocated to a position whose symbol number and carrier number are both "0". Also, the SP signal is allocated to every $12^{th}$ carrier in each symbol. In the carrier direction, each SP signal in one symbol is two carriers apart from the corresponding SP signal in another adjacent symbol. This way, in every $4^{th}$ symbol, each SP signal is assigned the same carrier number as the corresponding SP signals in other symbols. With the SP signals allocated in the above-described manner, the transmission signal is transmitted.

The SP extraction subpart 21 extracts the SP signals from the signals output from the orthogonal transform subunit 14, and outputs the extracted SP signals to the division subpart 23. The SP generation subpart 22 generates reference SP signals having the same amplitudes and phases as the SP signals generated by the transmitter, and outputs the generated reference SP signals to the division subpart 23. The division subpart 23 divides (i) each of the extracted SP signals input from the SP extraction subpart 21 by (ii) a corresponding one of the generated reference SP signals that is assigned the same symbol number and the same carrier number as the extracted SP signal, the generated reference SP signals being input from the SP generation subpart 22. The division subpart 23 then outputs, to the symbol direction interpolation part 30, each result of the division as a value of channel characteristics at the corresponding symbol number and carrier number (at the SP carrier to which the corresponding SP signal is allocated).

Figure 5:
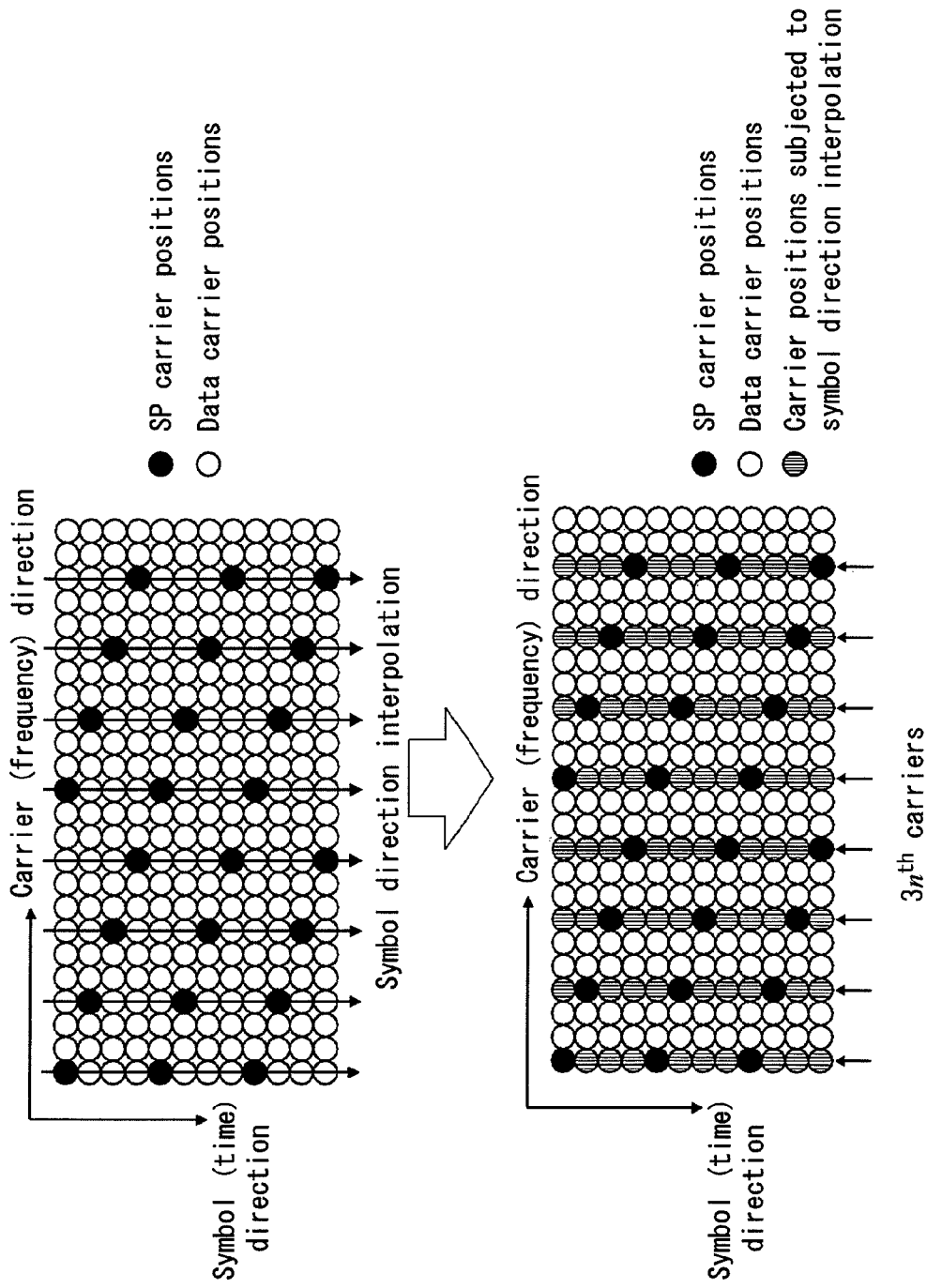
FIG. 5 shows a concept of symbol direction interpolation performed by a symbol direction interpolation part shown in FIG. 3.

As shown in FIG. 5, the symbol direction interpolation part 30 calculates values of channel characteristics at $3n^{th}$ carriers by interpolating, in the symbol (time) direction, the channel characteristics at these $3n^{th}$ carriers with use of the values of SP channel characteristics input from the SP channel characteristics estimation part 20. Then, the symbol direction interpolation part 30 outputs, to the adaptive interpolation part 50, the values of channel characteristics at the $3n^{th}$ carriers. Here, known technologies can be applied to the processing of symbol direction interpolation; for example, the symbol direction interpolation may be performed by using a filter with a fixed coefficient, or a filter whose passband can be changed according to the travelling speed and the Doppler spectrum.

The TMCC channel characteristics estimation part 40 extracts, from the signals output from the orthogonal transform subunit 14, control signals that carry control information pieces and are called Transmission Multiplexing Configuration Controls (TMCCs) (hereafter, "TMCC signals"). Then, based on the extracted TMCC signals, the TMCC channel characteristics estimation part 40 estimates TMCC channel characteristics, which are channel characteristics at carriers to which the TMCC signals are allocated, and outputs values of the estimated TMCC channel characteristics to the adaptive interpolation part 50. The TMCC signals include system identifications, transmission parameter switch indices, emergency alert broadcast initiation flags, current information, next information, and the like, so that the receiver can perform demodulation and decoding.

Figure 6:
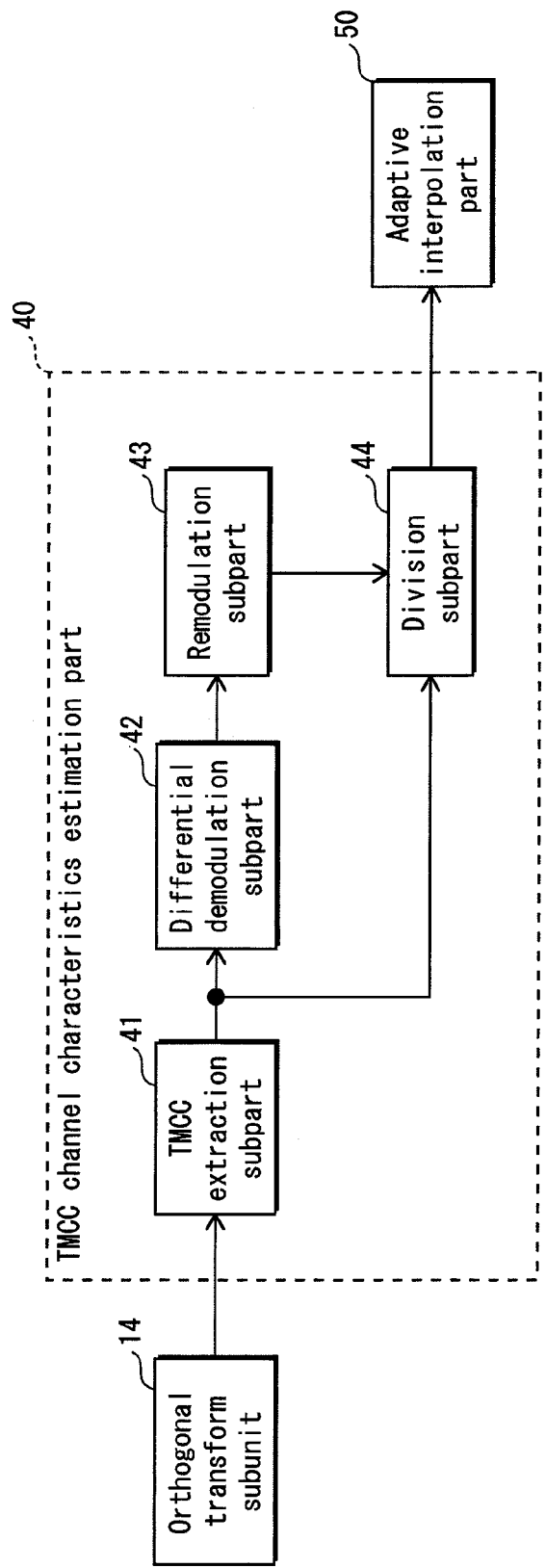
FIG. 6 is a structural diagram of a TMCC channel characteristics estimation part shown in FIG. 3.

The following describes the structure and operations of the TMCC channel characteristics estimation part 40 with reference to FIG. 6. FIG. 6 is a structural diagram of the TMCC channel characteristics estimation part 40 shown in FIG. 3. In FIG. 6, the orthogonal transform subunit 14 and the adaptive interpolation part 50 are also illustrated to clearly convey how the internal elements of the TMCC channel characteristics estimation part 40 are connected thereto.

The TMCC channel characteristics estimation part 40 includes a TMCC extraction subpart 41, a differential demodulation subpart 42, a remodulation subpart 43, and a division subpart 44. TMCC signals are allocated to all the carriers that are assigned certain non-periodic carrier numbers (an SP signal is allocated to none of these carriers). The positions of the TMCC signals are known to the receiver. Differential Binary Phase-Shift Keying (DBPSK) has been performed on the TMCC signals in the symbol direction. A differential reference signal that has been modulated using a known phase is inserted into the first symbol of each frame. All the TMCC signals allocated to carriers included in a single symbol carry the same control information piece. The subparts included in the TMCC channel characteristics estimation part 40 can perform the following processing due to the above factors. By way of example, FIG. 7 shows carrier numbers assigned to carriers to which the TMCC signals are allocated (TMCC carriers) when Mode 3 of the ISDB-T standard and synchronous modulation are utilized.

The TMCC extraction subpart 41 extracts TMCC signals from the signals output from the quadrature transform subunit 14, and outputs the extracted TMCC signals to the differential demodulation subpart 42 and the division subpart 44.

With use of the differential reference signal allocated to the start of each frame, the differential demodulation subpart 42 decodes the control information pieces carried by the TMCC signals input from the TMCC extraction subpart 41, by performing demodulation processing corresponding to the DBPSK on the TMCC signals. Thereafter, the differential demodulation subpart 42 outputs the control information pieces to the remodulation subpart 43. It should be reminded here that all the TMCC signals allocated to carriers included in a single symbol carry the same control information piece. Hence, based on the decoded control information pieces belonging to each symbol, the differential demodulation subpart 42 identifies a real control information piece that is meant to be carried by majority decision, i.e., by comparing all of the decoded control information pieces. This process improves accuracy of decoding the control information pieces.

The remodulation subpart 43 estimates modulation phases with which the TMCC signals have been modulated by the transmitter, by performing the DBPSK on the control information pieces, which have been input from the differential demodulation subpart 42, with use of the differential reference signal allocated to the start of each frame. The remodulation subpart 43 then outputs, to the division subpart 44, post-DBPSK signals which are signals obtained as a result of performing the DBPSK.

The division subpart 44 divides (i) each of the TMCC signals input from the TMCC extraction subpart 41 by (ii) a corresponding one of the post-DBPSK signals that is assigned the same symbol number and the same carrier number as the TMCC signal, the post-DBPSK signals being input from the remodulation subpart 43. Then, the division subpart 44 outputs, to the adaptive interpolation part 50, each result of the division as a value of channel characteristics at the corresponding symbol number and carrier number (at the TMCC carrier to which the corresponding TMCC signal is allocated).

The adaptive interpolation part 50 performs the following processing for each symbol. First, the adaptive interpolation part 50 calculates filter coefficient by using (i) the values of the channel characteristics at $3n^{th}$ carriers, which are output from the symbol direction interpolation part 30, and (ii) the values of the channel characteristics at the TMCC carriers, which are output from the TMCC channel characteristics estimation part 40. Next, with use of the calculated filter coefficients, the adaptive interpolation part 50 performs adaptive interpolation by filtering the values of the channel characteristics at $3n^{th}$ carriers, which are output from the symbol direction interpolation part 30. This way, the adaptive interpolation part 50 can calculate channel characteristics at certain carriers which have not been obtained yet. The adaptive interpolation part 50 then outputs values of channel characteristics at all the carriers to the equalization subunit 16.

Figure 8:
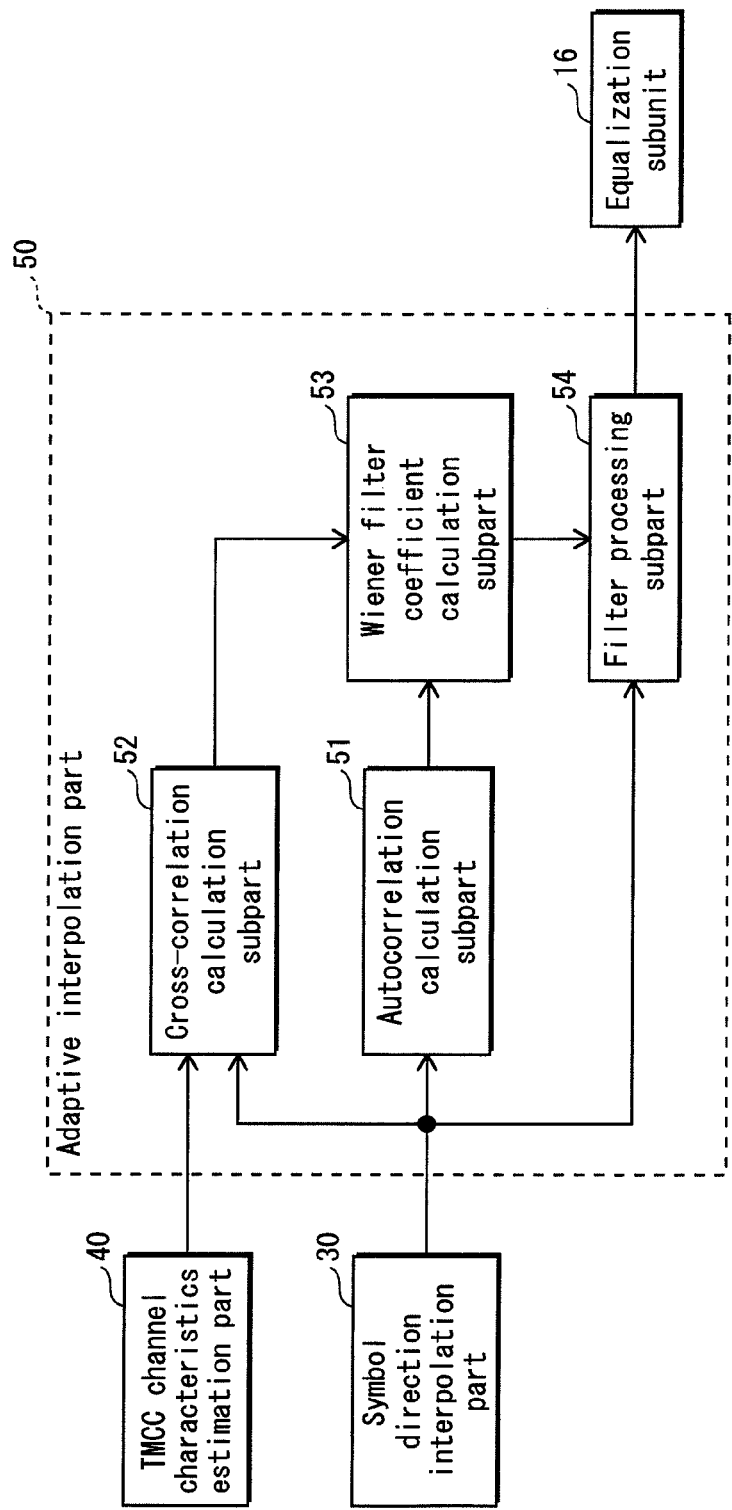
FIG. 8 is a structural diagram of an adaptive interpolation part shown in FIG. 3.

The following describes the structure and operations of the adaptive interpolation part 50 with reference to FIG. 8. FIG. 8 is a structural diagram of the adaptive interpolation part 50 shown in FIG. 3. In FIG. 8, the symbol direction interpolation part 30, the TMCC channel characteristics estimation part 40 and the equalization subunit 16 are also illustrated to clearly convey how the internal elements of the adaptive interpolation part 50 are connected thereto.

The adaptive interpolation part 50 includes an autocorrelation calculation subpart 51, a cross-correlation calculation subpart 52, a Wiener filter coefficient calculation subpart 53, and a filter processing subpart 54.

Figure 9:
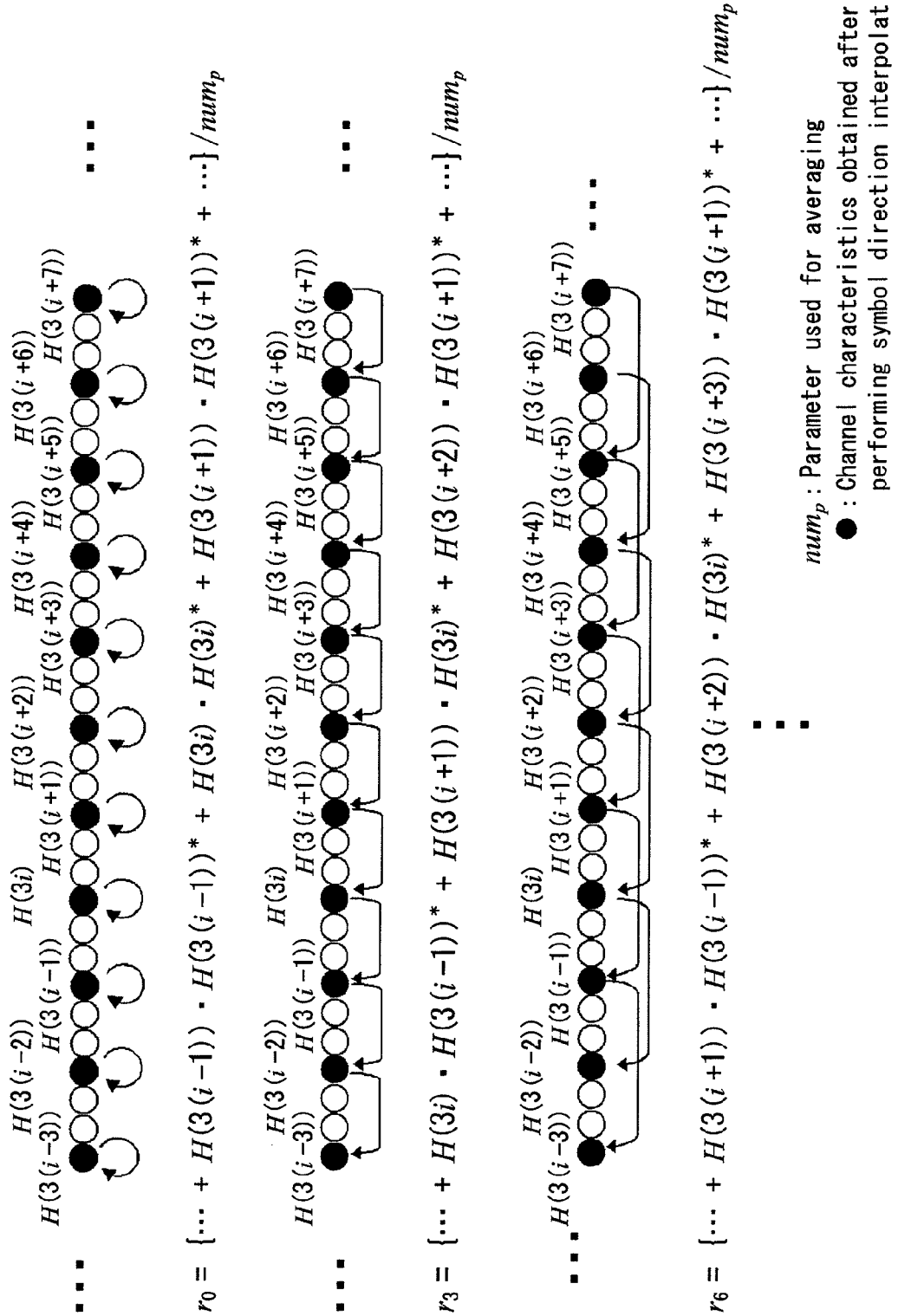
FIG. 9 shows a concept of autocorrelation calculations performed by an autocorrelation calculation subpart shown in FIG. 8.

Given that a carrier number is expressed as i (with i being an integer equal to or greater than "0"), the autocorrelation calculation subpart 51 calculates autocorrelation values each of whose notations is "0" or a multiple of "3", namely $r_0$, $r_3$, $r_6$, . . . by performing the autocorrelation calculation shown in the following (Equation 8) with use of the channel characteristics H(i) at $3n^{th}$ carriers, which are output from the symbol direction interpolation part 30. Then, by taking advantage of the relationship $r_{-m}=r_m{}^*$, the autocorrelation calculation subpart 51 calculates the autocorrelation matrix $R_{xx}$ shown in the following (Equation 9) with use of the calculated autocorrelation values r. Thereafter, the autocorrelation calculation subpart 51 outputs the calculated autocorrelation matrix $R_{xx}$ to the Wiener filter coefficient calculation subpart 53. Note, a concept of autocorrelation calculations for obtaining the autocorrelation values $r_0$, $r_3$, $r_6$, . . . is shown in FIG. 9. As autocorrelation calculation is a known technique, its detailed description is omitted.

$$r_{3m} = E[H(3n)H(3n-3m)^*] \qquad \text{(Equation 8)}$$

$$R_{xx} = \begin{bmatrix} r_0 & r_3 & r_6 & r_9 & r_{12} & \cdots & r_{3(tap-1)} \\ r_{-3} & r_0 & r_3 & r_6 & r_9 & \cdots & r_{3(tap-2)} \\ r_{-6} & r_{-3} & r_0 & r_3 & r_6 & \cdots & r_{3(tap-3)} \\ r_{-9} & r_{-6} & r_{-3} & r_0 & r_3 & \cdots & r_{3(tap-4)} \\ r_{-12} & r_{-9} & r_{-6} & r_{-3} & r_0 & \cdots & r_{3(tap-5)} \\ \vdots & \vdots & \vdots & \vdots & \vdots & \ddots & \vdots \\ r_{-3(tap-1)} & r_{-3(tap-2)} & r_{-3(tap-3)} & r_{-3(tap-4)} & r_{-3(tap-5)} & \cdots & r_0 \end{bmatrix} \qquad \text{(Equation 9)}$$

Note, the superscripted symbol "*" denotes a complex conjugate, and "E[·]" denotes an ensemble average (expected value) calculation. Also, "tap" indicates a row number or a column number of the autocorrelation matrix $R_{xx}$. These rules apply to the rest of this Description. In the embodiments of the present invention, including the present embodiment, it is assumed that "tap" is odd-numbered.

Figure 10:
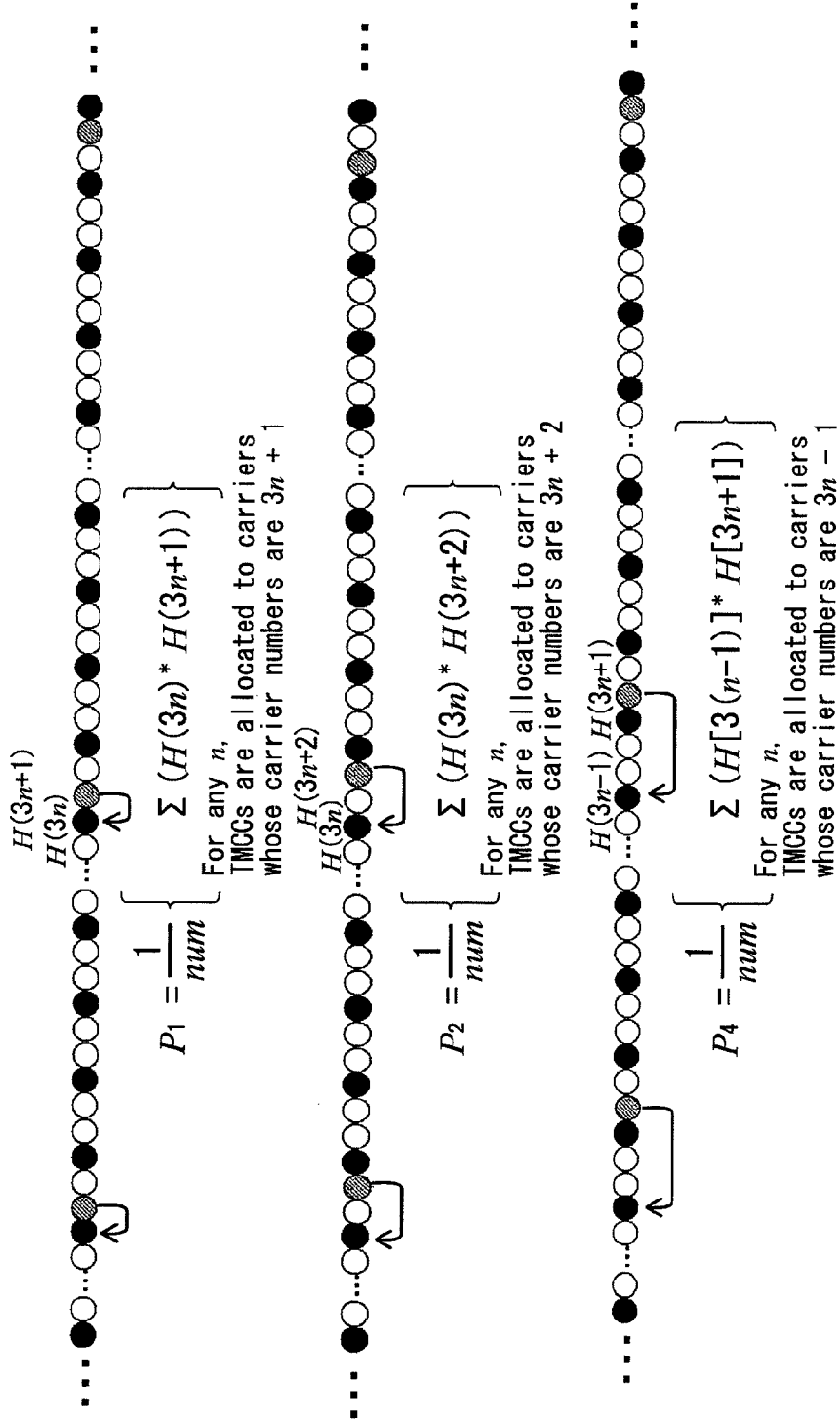
FIG. 10 shows a concept of cross-correlation calculations performed by a cross-correlation calculation subpart shown in FIG. 8.

Given that a carrier number is expressed as i or j (with each of i and j being an integer equal to or greater than "0"), the cross-correlation calculation subpart 52 calculates cross-correlation values p by performing the cross-correlation calculation shown in the following (Equation 10) with use of (i) the TMCC channel characteristics H(j), which are output from the TMCC channel characteristics estimation part 40, and (ii) the channel characteristics H(i) at $3n^{th}$ carriers, which are output from the symbol direction interpolation part 30. Then, with use of the calculated cross-correlation values p, the cross-correlation calculation subpart 52 calculates cross-correlation vectors $P_{dx,z}$ shown in the following (Equation 11) (in the present embodiment, cross-correlation vectors $P_{dx,1}$ and $P_{dx,2}$ are calculated for z=1 and 2). Thereafter, the cross-correlation calculation subpart 52 outputs the calculated cross-correlation vectors $P_{dx,z}$ to the Wiener filter coefficient calculation subpart 53. Note, a concept of cross-correlation calculations for obtaining the cross-correlation values $p_1$, $p_2$, $p_4$, is shown in FIG. 10.

$$p_{z+3m}=E[H(3n+z)H(3n-3m^*] \qquad \text{(Equation 10)}$$

$$P_{dx,z}=[p_{z+3(tap-1)/2} \cdots p_{z+3}p_zp_{z-3} \cdots p_{z-3(tap-1)/2}]^T \qquad \text{(Equation 11)}$$

In (Equation 10), "H(3n+z)" represents the TMCC channel characteristics, which are output from the TMCC channel characteristics estimation part 40, and "H (3n−3m)" represents the channel characteristics at $3n^{th}$ carriers, which are output from the symbol direction interpolation part 30. Here, m is an integer ranging between −(tap−1)/2 and (tap−1)/2, inclusive. The superscripted symbol "$T$" denotes a transpose, and this rule applies to the rest of this Description.

As specific examples of processing performed by the cross-correlation calculation subpart 52, the following describes two cases where a cross-correlation value $p_1$ ($z=1$, $m=0$) and a cross-correlation value $p_2$ ($z=2$, $m=0$) are calculated, respectively.

First, calculation of the cross-correlation value $p_1$ ($z=1$, $m=0$) is described below. The targets of calculation of the cross-correlation value $p_1$ are all the TMCC carriers whose carrier numbers are larger by one than the carrier numbers of $3n^{th}$ carriers whose channel characteristics values are output from the symbol direction interpolation part 30 (i.e., all the TMCC carriers that are on the immediate right of the $3n^{th}$ carriers). Here, the carrier numbers of $3n^{th}$ carriers are also expressed as $3n$, where n is an integer equal to or greater than "0". Of all the carrier numbers $3n+1$, carrier numbers assigned to the TMCC carriers to which the TMCC signals are allocated are shown in FIG. 11. The cross-correlation calculation subpart 52 calculates cross-correlation between (i) each of the values of channel characteristics at the TMCC carriers whose carrier numbers are shown in FIG. 11, which is calculated by the TMCC channel characteristics estimation subpart 40, and (ii) the value of channel characteristics at the corresponding $3n^{th}$ carrier whose carrier number is smaller by one than the carrier number of the TMCC carrier (at a carrier that is on the immediate left of the TMCC carrier). The cross-correlation calculation subpart 52 calculates the cross-correlation value $p_1$ by averaging the cross-correlations calculated in the above manner (see the upper row of FIG. 10).

Next, calculation of the cross-correlation value $p_2$ ($z=2$, $m=0$) is described below. The targets of calculation of the cross-correlation value m are all the TMCC carriers whose carrier numbers are larger by two than the carrier numbers of $3n^{th}$ carriers whose channel characteristics values are output from the symbol direction interpolation part 30 (i.e., all the TMCC carriers that are on the right of the $3n^{th}$ carriers with one carrier therebetween). Of all the carrier numbers $3n+2$, carrier numbers assigned to the TMCC carriers to which the TMCC signals are allocated are shown in FIG. 12. The cross-correlation calculation subpart 52 calculates cross-correlation between (i) each of the values of channel characteristics at the TMCC carriers whose carrier numbers are shown in FIG. 12, which is calculated by the TMCC channel characteristics estimation subpart 40, and (ii) the value of channel characteristics at the corresponding $3n^{th}$ carrier whose carrier number is smaller by two than the carrier number of the TMCC carrier (at a carrier that is on the left of the TMCC carrier with one carrier therebetween). The cross-correlation calculation subpart 52 calculates the cross-correlation value $p_2$ by averaging the cross-correlations calculated in the above manner (see the middle row of FIG. 10).

The Wiener filter coefficient calculation subpart 53 calculates Wiener filter coefficients $w_k$ by performing the calculation shown in the following (Equation 12) with use of (i) the autocorrelation matrix $R_{xx}$ input from the autocorrelation calculation subpart 51 and (ii) the cross-correlation vectors $P_{dx,z}$ input from the cross-correlation calculation subpart 52. In the present embodiment, the calculation shown in (Equation 12) is performed for each of the cross-correlation vectors $P_{dx,1}$ and $P_{dx,2}$. Then, based on the values of the calculated Wiener filter coefficients $W_k$, the Wiener filter coefficient calculation subpart 53 calculates filter coefficients $c_k$ of the filter processing subpart 54 by using the following (Equation 13), and outputs the values of the calculated filter coefficients $c_k$ to the filter processing subpart 54. Note, in (Equation 13), s is an integer.

$$W_z = \begin{bmatrix} w_{z+3(tap-1)/2} & \cdots \\ w_{z+3} \ w_z \ w_{z-3} & \cdots \\ w_{z-3(tap-1)/2} \end{bmatrix}^T = R_{xx}^{-1} P_{dx,z} \quad \text{(Equation 12)}$$

$$c_k = \begin{cases} w_k & : \ k = 3s \pm 1 \\ 1 & : \ k = 0 \\ 0 & : \ k = 3s \ (s \neq 0) \end{cases} \quad \text{(Equation 13)}$$

The filter processing subpart 54 calculates channel characteristics at certain carriers which have not been obtained yet, by filtering the values of channel characteristics at the $3n^{th}$ carriers, which have been output from the symbol direction interpolation part 30, with use of the values of the filter coefficients $c_k$ input from the Wiener filter coefficient calculation subpart 53. The filter processing subpart 54 then outputs the values of channel characteristics at all the carriers to the equalization subunit 16. The above processing performed by the filter processing subpart 54 is expressed by the following (Equation 14). Note, in (Equation 14), (i) the values of channel characteristics at $3n^{th}$ carriers, which are output from the symbol direction interpolation part 30, are substituted into H(i) when $i=3n$ (with n being an integer equal to or greater than "0"), and (ii) a value "0" is substituted into H(i) when $i \neq 3n$.

$$\hat{H}(l) = \Sigma c_{-k} H(k+l) \quad \text{(Equation 14)}$$

<Principles>

The following describes principles of calculation of Wiener filter coefficients.

Provided that signals input to the filter (hereafter, "filter input signals") are expressed as $x_k$ and filter coefficients are expressed as $w_k$, signals that are output from the filter after having been filtered (hereafter, "filter output signals $y_k$") are expressed by the following (Equation 15). Note, the filter input signals $x_k$ and the filter coefficients $w_k$ can be obtained by using the following (Equation 16) and (Equation 17), respectively.

$$y_k = W_k^T X_k \quad \text{(Equation 15)}$$

$$X_k = [x_k x_{k-1} \ldots x_{k-M+1}]^T \quad \text{(Equation 16)}$$

$$W_k = [w_{1k} w_{2k} \ldots w_{Mk}]^T \quad \text{(Equation 17)}$$

It is desired that the filter output signals $y_k$ are as close to target signals $d_k$ as possible. An error $\epsilon_k$ between the target signals $d_k$ and the filter output signals $y_k$ can be calculated by using the following (Equation 18). It is desired that this error $\epsilon_k$ is as close to "0" as possible. Its squared error $\epsilon_k^2$ is expressed by the following (Equation 19).

$$\epsilon_k = d_k - y_k = d_k - W_k^T X_k \quad \text{(Equation 18)}$$

$$\epsilon_k^2 = d_k^2 + W_k^T X^* X_k^T W_k - 2 d_k X_k^T W_k \quad \text{(Equation 19)}$$

Under the assumption that a signal series has stationarity, optimum filter coefficients would be filter coefficients $w_{Mk}$ that realize the smallest mean squared error $E[\epsilon_k^2]$. The mean squared error $E[\epsilon_k^2]$ is expressed by the following (Equation 20). Here, P and R are expressed by the following (Equation 21) and (Equation 22), respectively. P denotes cross-correlation vectors obtained by cross-correlating the target signals $d_k$ and the filter input signals $x_k$. R denotes an autocorrelation matrix of the filter input signals $x_k$.

$$E[\varepsilon_k^2] = E[d_k^2] + W^T R W - 2P^T W \quad \text{(Equation 20)}$$

$$P = E[d_k X_k] = E[d_k x_k \; d_k x_{k-1} \; \cdots \; d_k x_{k-M+1}]^T \quad \text{(Equation 21)}$$

$$R = E[X_k X_k^T] = \quad \text{(Equation 22)}$$

$$E\left[\begin{pmatrix} x_k^2 & x_k x_{k-1} & \cdots & x_k x_{k-M+1} \\ x_{k-1} x_k & x_{k-1}^2 & \cdots & x_{k-1} x_{k-M+1} \\ \vdots & \vdots & \ddots & \vdots \\ x_{k-M+1} x_k & x_{k-M+1} x_{k-1} & \cdots & x_{k-M+1}^2 \end{pmatrix}\right]$$

The above (Equation 20) lies on a quadric surface relating to the filter coefficients $w_{Mk}$ and has a smallest value. The filter coefficients $w_{Mk}$ that realize such a smallest value would be the optimum filter coefficients. The filter coefficients $w_{Mk}$ that realize the smallest mean squared error can be obtained when a result of differentiating (Equation 20) with use of each of filter coefficients $w_{Mk}$ becomes "0". The following (Equation 23) can be obtained from derivatives of the filter coefficients $w_{Mk}$ in (Equation 20). The following (Equation 24) can be obtained from (Equation 23), and the following (Equation 25) can be obtained from (Equation 24).

$$2RW - 2P = 0 \quad \text{(Equation 23)}$$

$$RW - P = 0 \quad \text{(Equation 24)}$$

$$W_{opt} = R^{-1} P \quad \text{(Equation 25)}$$

Put another way, with use of (Equation 25), the optimum filter coefficients $w_{mk}$ can be calculated from (i) the autocorrelation matrix R of the filter input signals $x_k$ and (ii) the cross-correlation vectors P obtained by cross-correlating the filter input signals $x_k$ and the target signals $d_k$. This concludes the description of the principles of the Wiener filter (document referenced: "Waveform Equalization Technology for Digital Mobile Communication", published by Triceps, Inc., pages 30 to 33).

<Summary of Channel Characteristics Estimation Subunit>

By using the above-described Wiener filter, the channel characteristics estimation subunit 15 adaptively calculates filter coefficients of a filter that interpolates channel characteristics. In calculating such filter coefficients, the channel characteristics estimation subunit 15 utilizes, as target signals, values of channel characteristics calculated by using TMCC signals, which are different from SP signals. That is to say, the channel characteristics estimation subunit 15 calculates filter coefficients by utilizing (i) the values of channel characteristics at $3n^{th}$ carriers, which are output from the symbol direction interpolation part 30, as the filter input signals, and (ii) the values of TMCC channel characteristics, which are output from the TMCC channel characteristics estimation part 40, as the target signals. By using values of the calculated filter coefficients for other carriers, the channel characteristics estimation subunit 15 calculates channel characteristics at certain carriers which have not been obtained yet.

Figure 13:
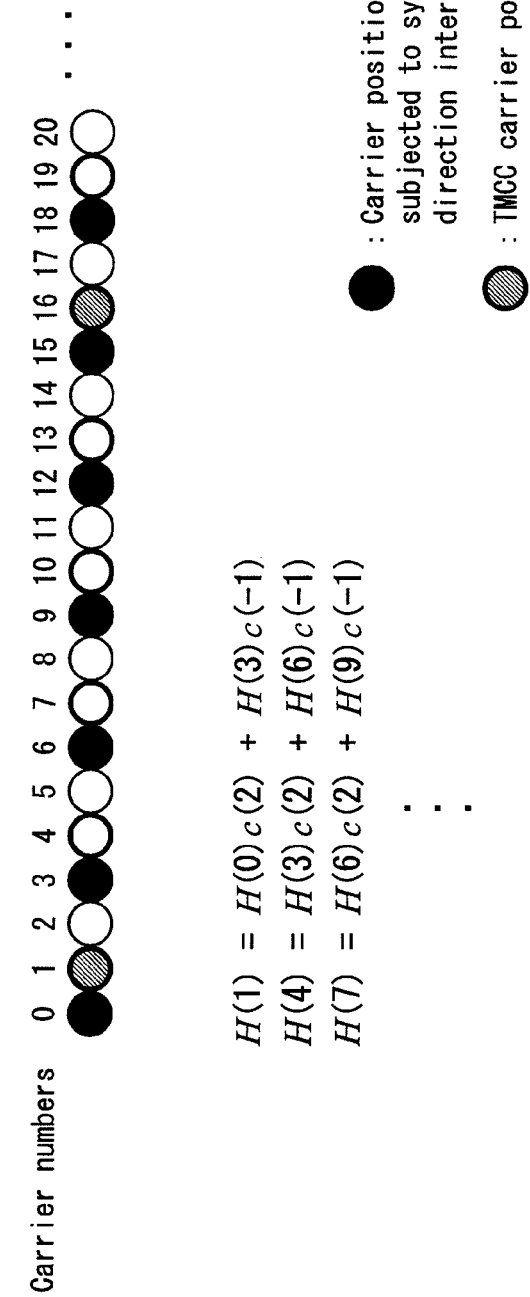
FIG. 13 shows a concept of adaptive interpolation performed by the adaptive interpolation part shown in FIG. 8.

FIG. 13 shows a simple example of adaptive interpolation that is performed by using (i) channel characteristics calculated with use of TMCC signals and (ii) channel characteristics obtained as a result of performing the symbol direction interpolation for $3n^{th}$ carriers. Assume, for instance, a case where channel characteristics are adaptively interpolated by using two channel characteristics that have been obtained after performing the symbol direction interpolation. Given that a carrier number is i and channel characteristics at each carrier is H(i), H(3n) denotes channel characteristics that have been obtained as a result of performing the symbol direction interpolation (with each of i and n being an integer equal to or greater than "0"). For example, when TMCC signals are allocated to carriers whose carrier numbers are 1 and 16, filter coefficients c(−1) and c(2) can be obtained by calculating the autocorrelations and cross-correlations by utilizing (i) H(3n) as the filter input signals and (ii) H(1) and H(16) as the target signals. Channel characteristics H(3n+1) can be obtained by using the above filter coefficients and channel characteristics that have been obtained as a result of performing the symbol direction interpolation. Note, FIG. 13 shows examples of calculating H(1), H(4) and H(7). Although the above has explained a calculation method for z=1, channel characteristics at carriers whose carrier numbers are H(3n+2) can also be calculated by using the same method for z=2.

<Comparison Between First Embodiment and Conventional Technology>

FIG. 14A shows a concept of filter configuration used in conventional interpolation (four symbol estimation), and FIG. 14B shows a concept of filter configuration used in the adaptive interpolation performed by the adaptive interpolation part 50 of First Embodiment. Note, FIGS. 14A and 14B incorporate schematic diagrams showing delay profiles, whereby there are (i) dominant waves and (ii) delayed waves whose delay spread exceeds Tu/3 [s].

As a result of performing the symbol direction interpolation, channel characteristics at $3n^{th}$ carriers have been obtained. Hence, according to the sampling theorem, aliasing components appear at every Tu/3 [s] (see FIGS. 14A and 14B). In the cases of both four symbol estimation and the method pertaining to First Embodiment, channel characteristics at all the carriers can be calculated by performing filter processing on the channel characteristics at $3n^{th}$ carriers. Interpolation can be properly performed if the filter processing (i) causes the signal components shown by solid lines to pass through the filter and (ii) removes the aliasing components shown by dotted lines.

However, according to the conventional four symbol estimation, interpolation is performed with use of a filter whose passband is equal to or smaller than Tu/3 [s]. Consequently, as indicated by the second and fourth solid lines in FIG. 14A, parts of signal components that are supposed to pass through the filter (i.e., components of delayed waves whose delay spread exceeds Tu/3 [s]) fall outside the passband of the filter. Furthermore, as indicated by the first and fifth dotted lines in FIG. 14A, some aliasing components (i.e., aliasing components of delayed waves whose delay spread exceeds Tu/3 [s]) fall within the passband of the filter. For this reason, interpolation cannot be properly performed by using the conventional four symbol estimation.

On the other hand, according to the method pertaining to First Embodiment, Wiener filter coefficients are calculated by utilizing the following (i) and (ii) as the filter input signals and the target signals, respectively: (i) values of channel characteristics that have been calculated by interpolating, in the symbol direction, values of channel characteristics calculated with use of SP signals; and (ii) values of channel characteristics that have been calculated with use of TMCC signals. This method makes it possible to configure a filter with a filter property that (i) makes only the desired signal components (shown by solid lines in FIG. 14B) pass through the filter, and (ii) removes the aliasing components (shown by dotted lines in FIG. 14B). Therefore, with the method pertaining to First Embodiment, interpolation can be properly performed without being affected by aliasing, even if the receiver is in a receiving environment where there are delayed waves whose delay spread exceeds Tu/3 [s]. Also, as shown in FIG. 14B, the method pertaining to First Embodiment allows configuring a filter that would make only the desired signals pass through the filter. Therefore, the method pertaining to First Embodiment does not require undue broadening of the passband of the filter, prevents the reception signal from being affected by noise components, such as Johnson-Nyquist noise and Inter-carrier interference components associated with mobility of the receiver, and improves robustness against noise.

As set forth above, due to aliasing, the conventional four symbol estimation can achieve proper interpolation only when delay times of all the delayed waves are equal to or smaller than Tu/3 [s]. In contrast, with the method pertaining to First Embodiment, an adaptive filter is calculated by using cross-correlations between (i) channel characteristics that have been calculated by interpolating, in the symbol direction, channel characteristics calculated with use of periodically-inserted SP signals, and (ii) channel characteristics calculated with use of TMCC signals. Therefore, the method pertaining to First Embodiment allows configuring a filter that is not affected by aliasing, even when there are delayed waves whose delay times exceed Tu/3 [s]. Accordingly, the method pertaining to First Embodiment allows (i) adaptively interpolating channel characteristics according to the channel environment, (ii) accurately correcting amplitude distortions and phase distortions of the reception signal, and (iii) reliably receiving the reception signal.

FIG. 15A shows a range within which interpolation can be performed with conventional technology (four symbol estimation), and FIG. 15B shows a range within which adaptive interpolation can be performed by the adaptive interpolation part 50 of First Embodiment.

With the conventional four symbol estimation, interpolation can be properly performed as long as delay spread is equal to or smaller than Tu/3 [s] and Doppler broadening is equal to or smaller than 1/(4 Ts) [Hz] (see FIG. 15A). As opposed to this, with the method pertaining to First Embodiment, interpolation can be properly performed as long as delay spread is equal to or smaller than Tu[s] and Doppler broadening is equal to or smaller than 1/(4 Ts) [Hz] (see FIG. 15B). That is to say, although the method pertaining to First Embodiment offers the same level of robustness against mobility as the conventional four symbol estimation, the method pertaining to First Embodiment offers an improved level of robustness against delay compared to the conventional four symbol estimation.

As set forth above, the adaptive interpolation part 50 of the present embodiment utilizes channel characteristics calculated by using TMCC signals in calculating filter coefficients that are used to interpolate channel characteristics at $3n^{th}$ carriers. Therefore, the sampling theorem holds that when extracting $3n^{th}$ carriers, the adaptive interpolation part 50 can calculate filter coefficients for realizing a filter property that (i) removes aliasing components, which appear at every Tu/3 [s], and (ii) makes only desired signals pass through the filter. Accordingly, even when the receiver is in a receiving environment where the extent of delay spread is so large that interpolation cannot be properly performed with conventional technologies due to the effects of aliasing components, the adaptive interpolation part 50 of the present embodiment can properly perform interpolation without being affected by the aliasing components. The present embodiment can thus improve robustness against delay.

Furthermore, by interpolating the SP channel characteristics in the time axis direction in advance, the adaptive interpolation part 50 can perform adaptive interpolation with use of channel characteristics at $3n^{th}$ carriers in each symbol.

Therefore, by calculating two types of Wiener filter coefficients (i.e., $W_1$ and $W_2$ of (Equation 12)) channel characteristics at all the carriers can be interpolated. As compared to a case where adaptive interpolation is performed by using only SP channel characteristics within one symbol (an SP signal is allocated to every $12^{th}$ carrier within one symbol), the method pertaining to First Embodiment increases the number of TMCC signals used in calculating one filter coefficient. Accordingly, the method pertaining to First Embodiment can reduce the effects of errors in the channel characteristics calculated by using TMCC signals, and improves accuracy of calculation of Wiener filter coefficients. As a result, although the robustness against mobility is restricted by the symbol direction interpolation, the accuracy of interpolation can be further improved when the fluctuations of channel characteristics in the time axis direction are small or when the level of Doppler broadening is small. In this manner, the rate of errors in demodulated data can be lowered.

Second Embodiment

Second Embodiment of the present invention is described below with reference to the accompanying drawings. Note, as with First Embodiment, the following description of Second Embodiment is given by taking an example of a digital television broadcast receiver compliant with the ISDB-T standard.

The channel characteristics estimation subunit 15 of First Embodiment utilizes, as target signals, the values of channel characteristics calculated with use of TMCC signals. As opposed to this, a channel characteristics estimation subunit of the present embodiment utilizes, as target signals, the values of channel characteristics calculated with use of auxiliary signals that carry auxiliary information pieces called Auxiliary Channels (ACs). Hereafter, such auxiliary signals are referred to as "AC signals". Other structural elements of the receiver of Second Embodiment are substantially the same as those of the receiver of First Embodiment, as far as the present invention is concerned.

Described below are the structure and operations of the channel characteristics estimation subunit. Structural elements of Second Embodiment that are substantially the same as in First Embodiment are assigned the same reference numbers thereas. As these structural elements have been explained in First Embodiment, they are omitted from or only briefly discussed in the description of Second Embodiment.

<Structure and Operations of Channel Characteristics Estimation Subunit>

Figure 16:
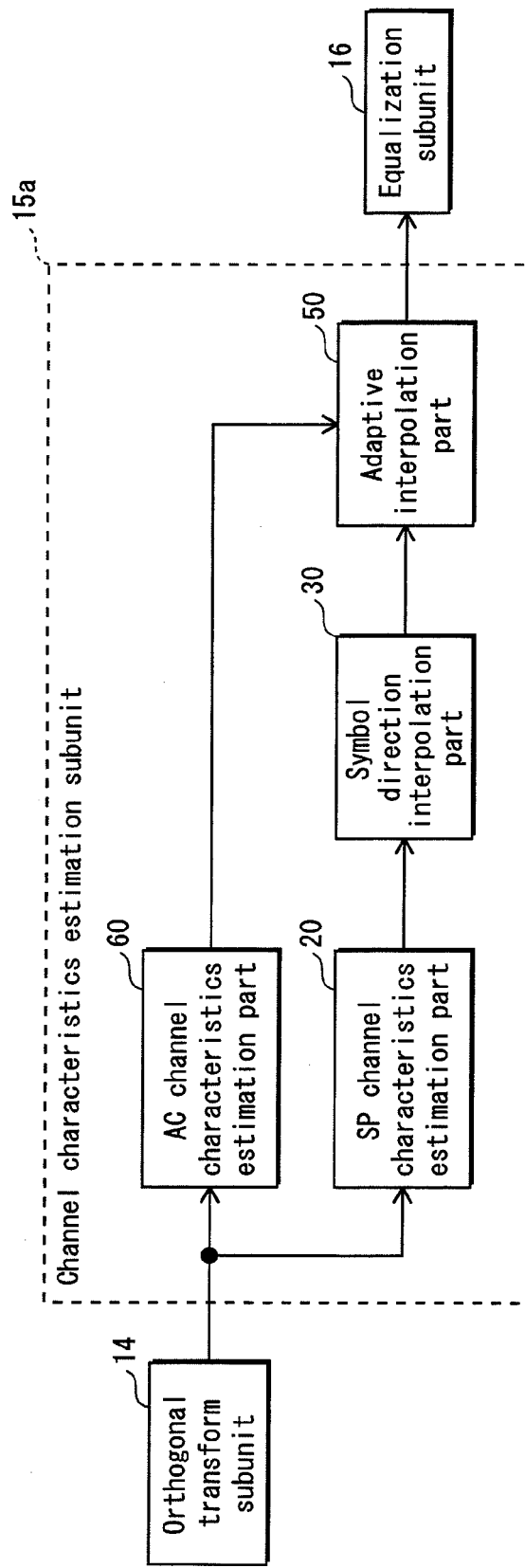
FIG. 16 is a structural diagram of a channel characteristics estimation subunit pertaining to Second Embodiment.

FIG. 16 is a structural diagram of a channel characteristics estimation subunit 15a pertaining to the present embodiment. In FIG. 16, the orthogonal transform subunit 14 and the equalization subunit 16 are also illustrated to clearly convey how the internal elements of the channel characteristics estimation subunit 15a are connected thereto.

The channel characteristics estimation subunit 15a includes an SP channel characteristics estimation part 20, a symbol direction interpolation part 30, an AC channel characteristics estimation part 60, and an adaptive interpolation part 50.

The SP channel characteristics estimation part 20 (i) extracts SP signals from the signals output from the orthogonal transform subunit 14, (ii) based on the extracted SP signals, estimates SP channel characteristics, which are channel characteristics at SP carriers to which the SP signals are allocated, and (iii) outputs values of the estimated SP channel characteristics to the symbol direction interpolation part 30. The symbol direction interpolation part 30 calculates values of channel characteristics at $3n^{th}$ carriers by interpolating, in the symbol direction, these channel characteristics at the $3n^{th}$ carriers with use of the values of estimated SP channel characteristics input from the SP channel characteristics estimation part 20. The symbol direction interpolation part 30 then outputs, to the adaptive interpolation part 50, the calculated values of channel characteristics at $3n^{th}$ carriers.

The AC channel characteristics estimation part 60 (i) extracts AC signals from the signals output from the orthogonal transform subunit 14, (ii) based on the extracted AC signals, estimates AC channel characteristics, which are channel characteristics at carriers to which the AC signals are allocated (hereafter, "AC carriers"), and (iii) outputs values of the estimated AC channel characteristics to the adaptive interpolation part 50.

Figure 17:
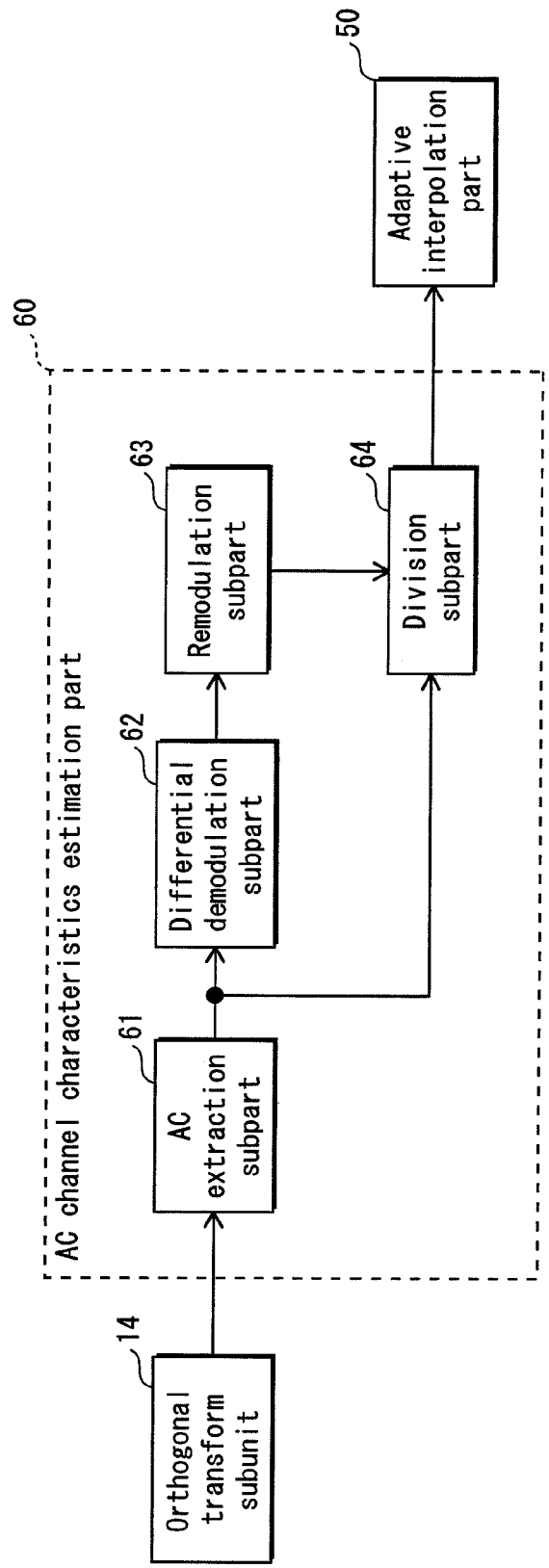
FIG. 17 is a structural diagram of an AC channel characteristics estimation part shown in FIG. 16.

The following describes the structure and operations of the AC channel characteristics estimation part 60 with reference to FIG. 17. FIG. 17 is a structural diagram of the AC channel characteristics estimation part 60 shown in FIG. 16. In FIG. 17, the orthogonal transform subunit 14 and the adaptive interpolation part 50 are also illustrated to clearly convey how the internal elements of the AC channel characteristics estimation part 60 are connected thereto.

The AC channel characteristics estimation part 60 includes an AC extraction subpart 61, a differential demodulation subpart 62, a remodulation subpart 63, and a division subpart 64. AC signals are allocated to all the carriers that are assigned certain non-periodic carrier numbers (an SP signal is allocated to none of these carriers). The positions of the AC signals are known to the receiver. Differential Binary Phase-Shift Keying (DBPSK) has been performed on the AC signals in the symbol direction. A differential reference signal that has been modulated using a known phase is inserted into the first symbol of each frame. The subparts included in the AC channel characteristics estimation part 60 can perform the following processing due to the above factors. By way of example, FIG. 18 shows carrier numbers assigned to carriers to which the AC signals are allocated (AC carriers) when Mode 3 of the ISDB-T standard and synchronous modulation are utilized.

The AC extraction subpart 61 extracts AC signals from the signals output from the orthogonal transform subunit 14, and outputs the extracted AC signals to the differential demodulation subpart 62 and the division subpart 64.

The differential demodulation subpart 62 decodes auxiliary information pieces carried by the AC signals input from the AC extraction subpart 61, by performing demodulation processing corresponding to the DBPSK on the AC signals with use of the differential reference signal allocated to the start of each frame. The differential demodulation subpart 62 then outputs the decoded auxiliary information pieces to the remodulation subpart 63.

The remodulation subpart 63 estimates modulation phases with which the AC signals have been modulated by the transmitter, by performing the DBPSK on the auxiliary information pieces, which have been input from the differential demodulation subpart 62, with use of the differential reference signal allocated to the first symbol of each frame. The remodulation subpart 63 then outputs, to the division subpart 64, post-DBPSK signals which are signals obtained as a result of performing the DBPSK.

The division subpart 64 divides (i) each of the AC signals input from the AC extraction subpart 61 by (ii) a corresponding one of the post-DBPSK signals that is assigned the same symbol number and the same carrier number as the AC signal, the post-DBPSK signals being input from the remodulation subpart 63. Then, the division subpart 64 outputs, to the adaptive interpolation part 50, each result of the division as a value of channel characteristics at the corresponding symbol number and carrier number (at the AC carrier to which the corresponding AC signal is allocated).

The adaptive interpolation part 50 of the present embodiment performs the same processing as the adaptive interpolation part 50 of First Embodiment, except that in the present embodiment, the values of TMCC channel characteristics, which have been estimated by the TMCC channel characteristics estimation part 40, are replaced by the values of AC channel characteristics, which have been estimated by the AC channel characteristics estimation part 60. In other words, a cross-correlation calculation subpart 52 in the adaptive interpolation part 50 of the present embodiment calculates cross-correlations between the signals output from the symbol direction interpolation part 30 and the signals output from the AC channel characteristics estimation part 60, instead of calculating cross-correlations between the signals output from the symbol direction interpolation part 30 and the signals output from the TMCC channel characteristics estimation part 40.

The channel characteristics estimation subunit 15a of the present embodiment achieves substantially the same effects as the channel characteristics estimation subunit 15 of First Embodiment.

Third Embodiment

Third Embodiment of the present invention is described below with reference to the accompanying drawings. Note, as with First and Second Embodiments, the following description of Third Embodiment is given by taking an example of a digital television broadcast receiver compliant with the ISDB-T standard.

The channel characteristics estimation subunit 15 of First Embodiment utilizes, as the target signals, the values of channel characteristics calculated with use of TMCC signals. As opposed to this, a channel characteristics estimation subunit of the present embodiment utilizes, as the target signals, (i) the values of channel characteristics calculated with use of TMCC signals and (ii) the values of channel characteristics calculated with use of AC signals. Other structural elements of the receiver of Third Embodiment are substantially the same as those of the receiver of First Embodiment, as far as the present invention is concerned.

The following describes the structure and operations of the channel characteristics estimation subunit. Structural elements of Third Embodiment that are substantially the same as in First and Second Embodiments are assigned the same reference numbers thereas. As these structural elements have been explained in First and Second Embodiments, they are omitted from or only briefly discussed in the description of Third Embodiment.

<Structure and Operations of Channel Characteristics Estimation Subunit>

Figure 19:
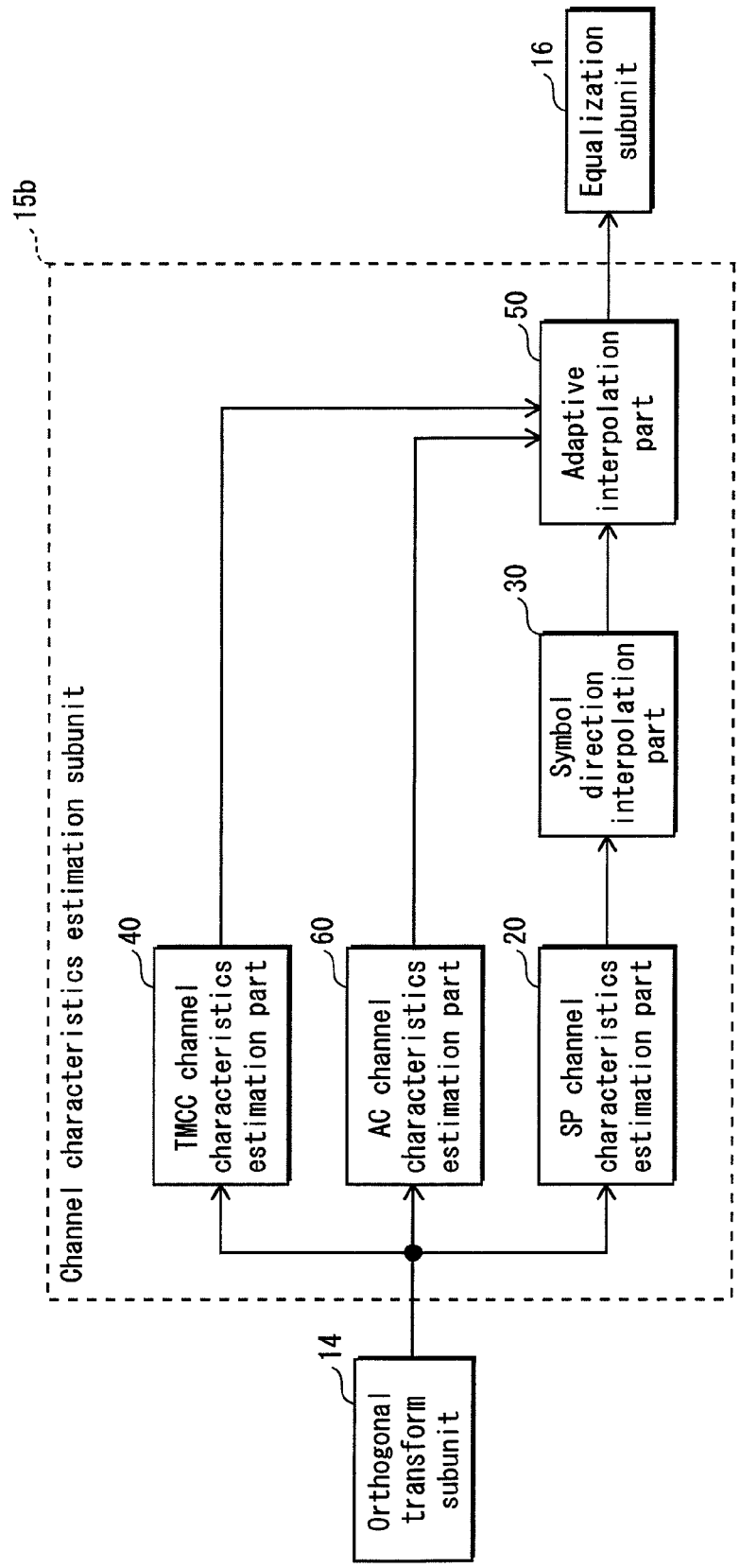
FIG. 19 is a structural diagram of a channel characteristics estimation subunit pertaining to Third Embodiment.

FIG. 19 is a structural diagram of a channel characteristics estimation subunit 15b pertaining to the present embodiment. In FIG. 19, the orthogonal transform subunit 14 and the equalization subunit 16 are also illustrated to clearly convey how the internal elements of the channel characteristics estimation subpart 15b are connected thereto.

The channel characteristics estimation subunit 15b includes an SP channel characteristics estimation part 20, a symbol direction interpolation part 30, a TMCC channel characteristics estimation part 40, an AC channel characteristics estimation part 60, and an adaptive interpolation part 50.

The SP channel characteristics estimation part 20 (i) extracts SP signals from the signals output from the orthogonal transform subunit 14, (ii) based on the extracted SP signals, estimates SP channel characteristics, which are channel characteristics at the SP carriers to which the SP signals are allocated, and (iii) outputs values of the estimated SP channel characteristics to the symbol direction interpolation part 30. The symbol direction interpolation part 30 calculates values of channel characteristics at $3n^{th}$ carriers by interpolating, in the symbol direction, these channel characteristics at the $3n^{th}$ carriers with use of the values of the SP channel characteristics which have been input from the SP channel characteristics estimation part 20. Then, the symbol direction interpolation part 30 outputs, to the adaptive interpolation part 50, the calculated values of channel characteristics at the $3n^{th}$ carriers.

The TMCC channel characteristics estimation part 40 (i) extracts TMCC signals from the signals output from the orthogonal transform subunit 14, (ii) based on the extracted TMCC signals, estimates TMCC channel characteristics, which are channel characteristics at TMCC carriers to which the TMCC signals are allocated, and (iii) outputs values of the estimated TMCC channel characteristics to the adaptive interpolation part 50. The AC channel characteristics estimation part 60 (i) extracts AC signals from the signals output from the orthogonal transform subunit 14, (ii) based on the extracted AC signals, estimates AC channel characteristics, which are channel characteristics at AC carriers to which the AC signals are allocated, and (iii) outputs values of the estimated AC channel characteristics to the adaptive interpolation part 50.

The adaptive interpolation part 50 of the present embodiment performs the same processing as the adaptive interpolation part 50 of First Embodiment, except that in the present embodiment, the values of TMCC channel characteristics, which have been estimated by the TMCC channel characteristics estimation part 40, are replaced by both of (i) the values of TMCC channel characteristics, which have been estimated by the TMCC channel characteristics estimation part 40, and (ii) the values of AC channel characteristics, which have been estimated by the AC channel characteristics estimation part 60. In other words, a cross-correlation calculation subpart 52 in the adaptive interpolation part 50 of the present embodiment (i) integrates, in the carrier order, signals output from the TMCC channel characteristics estimation part 40 and the signals output from the AC channel characteristics estimation part 60 into one signal, and (ii) calculates cross-correlations between the signals output from the symbol direction interpolation part 30 and the above integrated signal, instead of calculating cross-correlations between the signals output from the symbol direction interpolation part 30 and the signals output from the TMCC channel characteristics estimation part 40.

The channel characteristics estimation subunit 15b of the present embodiment achieves substantially the same effects as the channel characteristics estimation subunit 15 of First Embodiment. In addition, use of the channel characteristics estimation subunit 15b of the present embodiment increases the number of channel characteristics that can be utilized as the target signals. This makes it possible to calculate filter coefficients that can further reduce the effects of errors in calculation of channel characteristics to be utilized as the target signals.

Fourth Embodiment

Fourth Embodiment of the present invention is described below with reference to the accompanying drawings. Note, as opposed to First to Third Embodiments, the following description of Fourth Embodiment is given by taking an example of a digital television broadcast receiver compliant with the DVB-T standard.

The channel characteristics estimation subunit 15 of First Embodiment utilizes, as the target signals, the values of channel characteristics calculated by using TMCC signals. As opposed to this, a channel characteristics estimation subunit of the present embodiment utilizes, as the target signals, the values of channel characteristics calculated by using control signals that carry control information called Transmission Parameters Signalling (TPS). Hereafter, such control signals are referred to as TPS signals. Other structural elements of the receiver of Fourth Embodiment are substantially the same as those of the receiver of First Embodiment, as far as the present invention is concerned.

The following describes the structure and operations of the channel characteristics estimation subunit. Structural elements of Fourth Embodiment that are substantially the same as in First to Third Embodiments are assigned the same reference numbers thereas. As these structural elements have been explained in First to Third Embodiments, they are omitted from or only briefly discussed in the description of Fourth Embodiment.

<Structure and Operations of Channel Characteristics Estimation Subunit>

Figure 20:
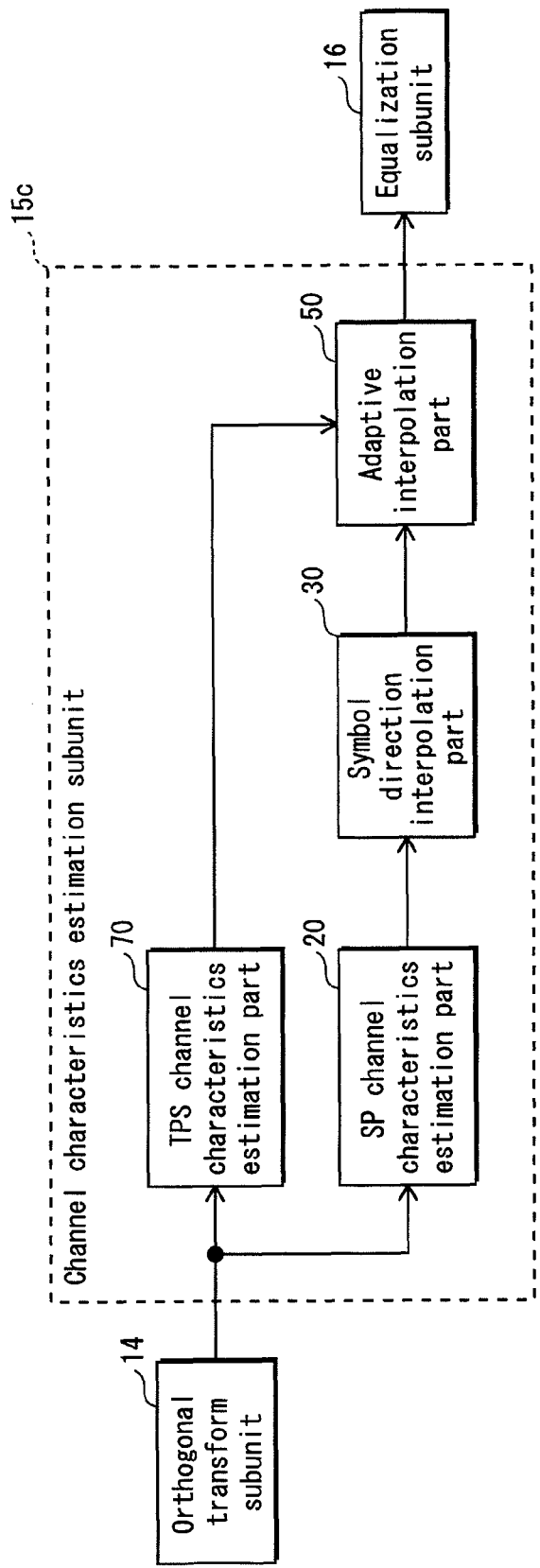
FIG. 20 is a structural diagram of a channel characteristics estimation subunit pertaining to Fourth Embodiment.

FIG. 20 is a structural diagram of a channel characteristics estimation subunit 15c pertaining to the present embodiment. In FIG. 20, the orthogonal transform subunit 14 and the equalization subunit 16 are also illustrated to clearly convey how the internal elements of the channel characteristics estimation subpart 15c are connected thereto.

The channel characteristics estimation subunit 15c includes an SP channel characteristics estimation part 20, a symbol direction interpolation part 30, a TPS channel characteristics estimation part 70, and an adaptive interpolation part 50.

The SP channel characteristics estimation part 20 (i) extracts SP signals from the signals output from the orthogonal transform subunit 14, (ii) based on the extracted SP signals, estimates SP channel characteristics, which are channel characteristics at the SP carriers to which the SP signals are allocated, and (iii) outputs values of the estimated SP channel characteristics to the symbol direction interpolation part 30. The symbol direction interpolation part 30 calculates values of channel characteristics at $3n^{th}$ carriers by interpolating, in the symbol direction, these channel characteristics at the $3n^{th}$ carriers by using the values of the estimated SP channel characteristics which have been input from the SP channel characteristics estimation part 20. Then, the symbol direction interpolation part 30 outputs the calculated values of channel characteristics at the $3n^{th}$ carriers to the adaptive interpolation part 50.

The TPS channel characteristics estimation part 70 (i) extracts TPS signals from the signals output from the orthogonal transform subunit 14, (ii) based on the extracted TPS signals, estimates TPS channel characteristics, which are channel characteristics at carriers to which the TPS signals are allocated (hereafter, "TPS carriers"), and (iii) outputs values of the estimated TPS channel characteristics to the adaptive interpolation part 50. Here, the TPS signals include information such as transmission parameters.

Figure 21:
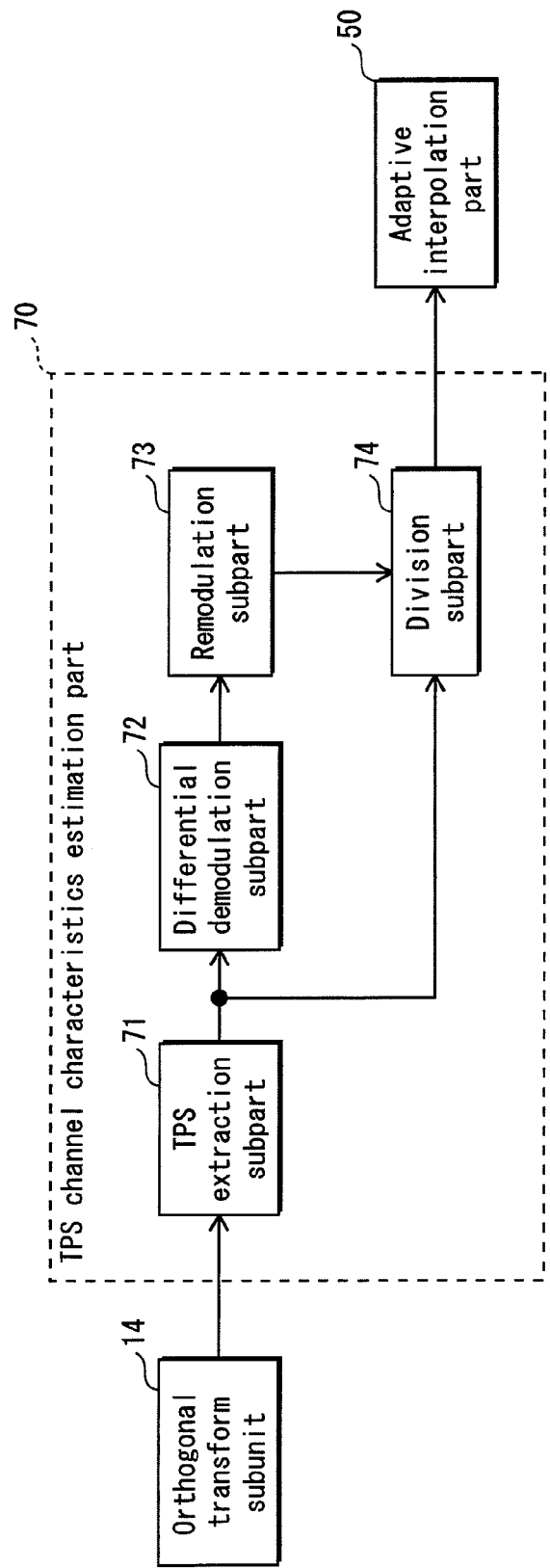
FIG. 21 is a structural diagram of a TPS channel characteristics estimation part shown in FIG. 20.

The following describes the structure and operations of the TPS channel characteristics estimation part 70 with reference to FIG. 21. FIG. 21 is a structural diagram of the TPS channel characteristics estimation part 70 shown in FIG. 20. In FIG. 21, the orthogonal transform subunit 14 and the adaptive interpolation part 50 are also illustrated to clearly convey how the internal elements of the TPS channel characteristics estimation part 70 are connected thereto.

The TPS channel characteristics estimation part 70 includes a TPS extraction subpart 71, a differential demodulation subpart 72, a remodulation subpart 73, and a division subpart 74. TPS signals are allocated to all the carriers that are assigned certain non-periodic carrier numbers (an SP signal is allocated to none of these carriers). The positions of the TPS signals are known to the receiver. The DBPSK has been performed on the TPS signals in the symbol direction. A differential reference signal that has been modulated using a known phase is inserted into the first symbol of each frame. All the TPS signals allocated to carriers included in a single symbol carry the same control information piece. The subparts included in the TPS channel characteristics estimation part 70 can perform the following processing due to the above factors. By way of example, FIG. 22 shows carrier numbers assigned to carriers to which the TPS signals are allocated (TPS carriers) when 8 k Mode of the DVB-T standard is utilized.

The TPS extraction subpart 71 extracts TPS signals from the signals output from the orthogonal transform subunit 14, and outputs the extracted TPS signals to the differential demodulation subpart 72 and the division subpart 74.

With use of the differential reference signal allocated to the start of each frame, the differential demodulation subpart 72 decodes the control information pieces carried by the TPS signals input from the TPS extraction subpart 71, by performing demodulation processing corresponding to the DBPSK on the TPS signals. The differential demodulation subpart 72 then outputs the decoded control information pieces to the remodulation subpart 73. It should be reminded here that all the TPS signals allocated to carriers included in a single symbol carry the same control information piece. Thus, based on the decoded control information pieces belonging to each symbol, the differential demodulation subpart 72 identifies a real control information piece that is meant to be carried by majority decision, i.e., by comparing all the decoded control information pieces. This process improves accuracy of decoding the control information pieces.

The remodulation subpart 73 estimates modulation phases with which the TPS signals have been modulated by the transmitter, by performing the DBPSK on the control information pieces, which have been input from the differential demodulation subpart 72, with use of the differential reference signal allocated to the first symbol of each frame. The remodulation subpart 73 then outputs, to the division subpart 74, post-DBPSK signals which are signals obtained as a result of performing the DBPSK.

The division subpart 71 divides (i) each of the TPS signals input from the TPS extraction subpart 71 by (ii) a corresponding one of the post-DBPSK signals that is assigned the same symbol number and the same carrier number as the TPS signal, the post-DBPSK signals being input from the remodulation subpart 73. Then, the division subpart 74 outputs, to the adaptive interpolation part 50, each result of the division as a value of channel characteristics at the corresponding symbol number and carrier number (at the TPS carrier to which the corresponding TPS signal is allocated).

The adaptive interpolation part 50 of the present embodiment performs the same processing as the adaptive interpolation part 50 of First Embodiment, except that in the present embodiment, the values of TMCC channel characteristics, which have been estimated by the TMCC channel characteristics estimation part 40, are replaced by the values of TPS channel characteristics, which have been estimated by the TPS channel characteristics estimation part 70. In other words, a cross-correlation calculation subpart 52 in the adaptive interpolation part 50 of the present embodiment calculates cross-correlations between the signals output from the symbol direction interpolation part 30 and the signals output from the TPS channel characteristics estimation part 70, instead of calculating cross-correlations between the signals output from the symbol direction interpolation part 30 and the signals output from the TMCC channel characteristics estimation part 40.

The channel characteristics estimation subunit 15*c* of the present embodiment achieves substantially the same effects as the channel characteristics estimation subunit 15 of First Embodiment.

Fifth Embodiment

Fifth Embodiment of the present invention is described below with reference to the accompanying drawings. As with Fourth Embodiment, the following description of Fifth Embodiment is given by taking an example of a digital television broadcast receiver compliant with the DVB-T standard.

The channel characteristics estimation subunit 15 of First Embodiment utilizes the following (i) and (ii) as the filter input signals and the target signals, respectively: (i) the values of channel characteristics at $3n^{th}$ carriers, which are obtained by interpolating, in the symbol (time) direction, the values of channel characteristics calculated by using SP signals; and (ii) the values of channel characteristics calculated by using TMCC signals. As opposed to this, a channel characteristics estimation subunit of the present embodiment utilizes the following (i) and (ii) as the filter input signals and the target signals, respectively: (i) the values of channel characteristics at $12n^{th}$ carriers, which are calculated by using SP signals; and (ii) both of (a) the values of channel characteristics calculated by using TPS signals and (b) the values of channel characteristics calculated by using signals called continual pilots that are used in, for example, removing Common Phase Errors (CPEs). Hereinafter, such signals are referred to as "continual pilot signals" or "CP signals". Other structural elements of the receiver of Fifth Embodiment are substantially the same as those of the receiver of First Embodiment, as far as the present invention is concerned.

The following describes the structure and operations of the channel characteristics estimation subunit. Structural elements of Fifth Embodiment that are substantially the same as in First to Fourth Embodiments are assigned the same reference numbers thereas. As these structural elements have been explained in First to Fourth Embodiments, they are omitted from or only briefly discussed in the description of Fifth Embodiment.

<Structure and Operations of Channel Characteristics Estimation Subunit>

Figure 23:
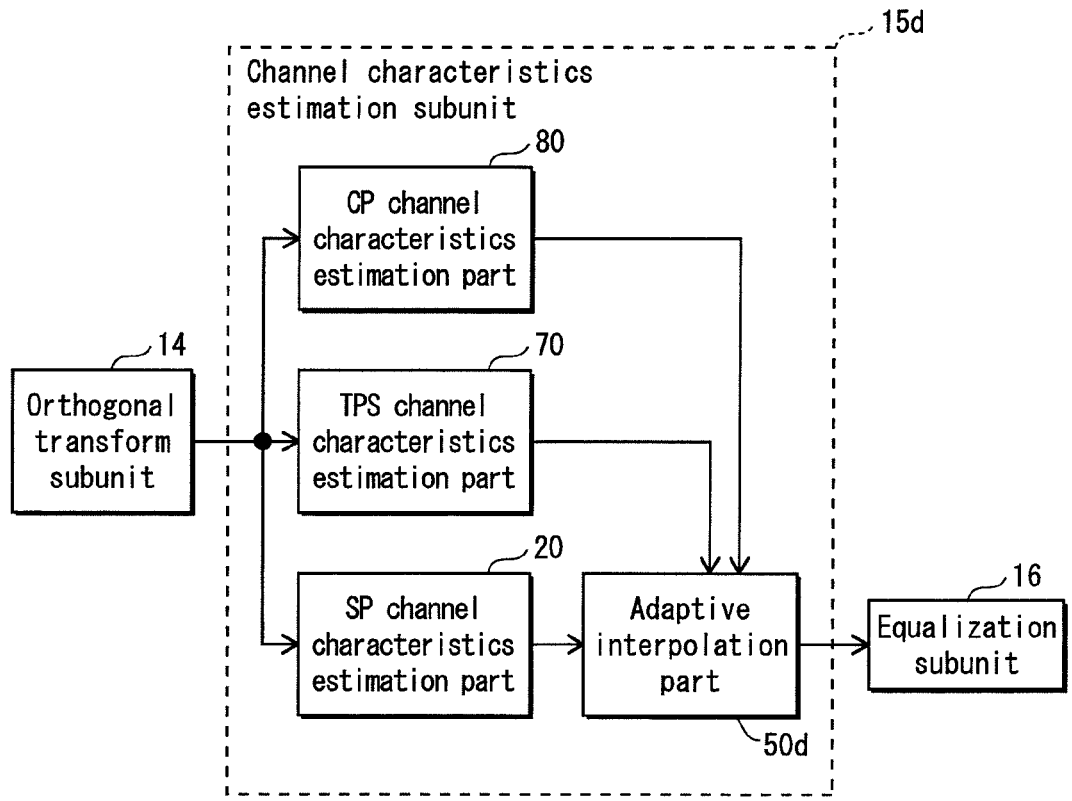
FIG. 23 is a structural diagram of a channel characteristics estimation subunit pertaining to Fifth Embodiment.

FIG. 23 is a structural diagram of a channel characteristics estimation subunit 15*d* pertaining to the present embodiment. In FIG. 23, the orthogonal transform subunit 14 and the equalization subunit 16 are also illustrated to clearly convey how the internal elements of the channel characteristics estimation subpart 15*d* are connected thereto.

The channel characteristics estimation subunit 15*d* includes an SP channel characteristics estimation part 20, a TPS channel characteristics estimation part 70, a CP channel characteristics estimation part 80, and an adaptive interpolation part 50*d*.

The SP channel characteristics estimation part 20 (i) extracts SP signals from the signals output from the orthogonal transform subunit 14, (ii) based on the extracted SP signals, estimates SP channel characteristics, which are channel characteristics at SP carriers to which the SP signals are allocated, and (iii) outputs values of the estimated SP channel characteristics to the adaptive interpolation part 50d.

The TPS channel characteristics estimation part 70 (i) extracts TPS signals from the signals output from the orthogonal transform subunit 14, (ii) based on the extracted TPS signals, estimates TPS channel characteristics, which are channel characteristics at TPS carriers to which the TPS signals are allocated, and (iii) outputs values of the estimated TPS channel characteristics to the adaptive interpolation part 50d.

The CP channel characteristics estimation part 80 (i) extracts CP signals from the signals output from the orthogonal transform subunit 14, (ii) based on the extracted CP signals, estimates CP channel characteristics, which are channel characteristics at carriers to which the CP signals are allocated (hereafter, "CP carriers"), and (iii) outputs values of the estimated CP channel characteristics to the adaptive interpolation part 50d. Note, some CP carriers may also be SP carriers.

Figure 24:
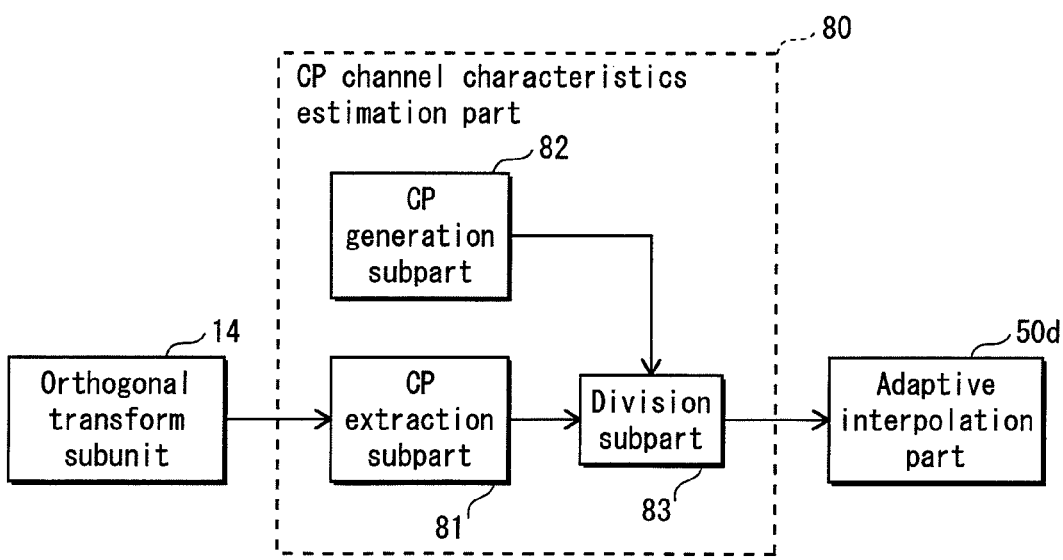
FIG. 24 is a structural diagram of a CP channel characteristics estimation part shown in FIG. 23.

The following describes the structure and operations of the CP channel characteristics estimation part 80 with reference to FIG. 24. FIG. 24 is a structural diagram of the CP channel characteristics estimation part 80 shown in FIG. 23. In FIG. 24, the orthogonal transform subunit 14 and the adaptive interpolation part 50d are also illustrated to clearly convey how the internal elements of the CP channel characteristics estimation part 80 are connected thereto.

The CP channel characteristics estimation part 80 includes a CP extraction subpart 81, a CP generation subpart 82, and a division subpart 83. CP signals are allocated to all the carriers that are assigned certain non-periodic carrier numbers (SP signals are allocated to some of these carriers). The positions of the CP signals are known to the receiver. The amplitudes and phases of CP signals generated by the transmitter are also known to the receiver. The subparts included in the CP channel characteristics estimation part 80 can perform the following processing due to the above factors. By way of example, FIG. 25 shows carrier numbers assigned to carriers to which the CP signals are allocated (CP carriers) when 8 k Mode of the DVB-T standard is utilized.

The CP extraction subpart 81 extracts CP signals from the signals output from the orthogonal transform subunit 14, and outputs the extracted CP signals to the division subpart 83. The CP generation subpart 82 generates reference CP signals that have the same amplitudes and phases as the CP signals generated by the transmitter, and outputs the generated reference CP signals to the division subpart 83. The division subpart 83 divides (i) each of the CP signals input from the CP extraction subpart 82 by (ii) a corresponding one of the generated reference CP signals that is assigned the same symbol number and the same carrier number as the extracted CP signal, the generated reference CP signals being input from the CP generation subpart 82. Then, the division subpart 83 outputs, to the adaptive interpolation part 50d, each result of the division as a value of channel characteristics at the corresponding symbol number and carrier number (at the CP carrier at which the corresponding CP signal is allocated).

The adaptive interpolation part 50d performs the following processing for each symbol. The adaptive interpolation part 50d calculates filter coefficients by using (i) the values of channel characteristics at $12n^{th}$ carriers, which are output from the SP channel characteristics estimation part 20, and (ii) both of (a) the values of TPS channel characteristics, which are output from the TPS channel characteristics estimation part 70, and (b) the values of CP channel characteristics, which are output from the CP channel characteristics estimation part 80. Then, the adaptive interpolation part 50d performs adaptive interpolation by filtering the values of channel characteristics at $12n^{th}$ carriers, which are output from the SP channel characteristics estimation part 20, with use of the calculated filter coefficients. This way, the adaptive interpolation part 50d can calculate channel characteristics at certain carriers which have not been obtained yet. The adaptive interpolation part 50d then outputs the values of channel characteristics at all the carriers to the equalization subunit 16.

Figure 26:
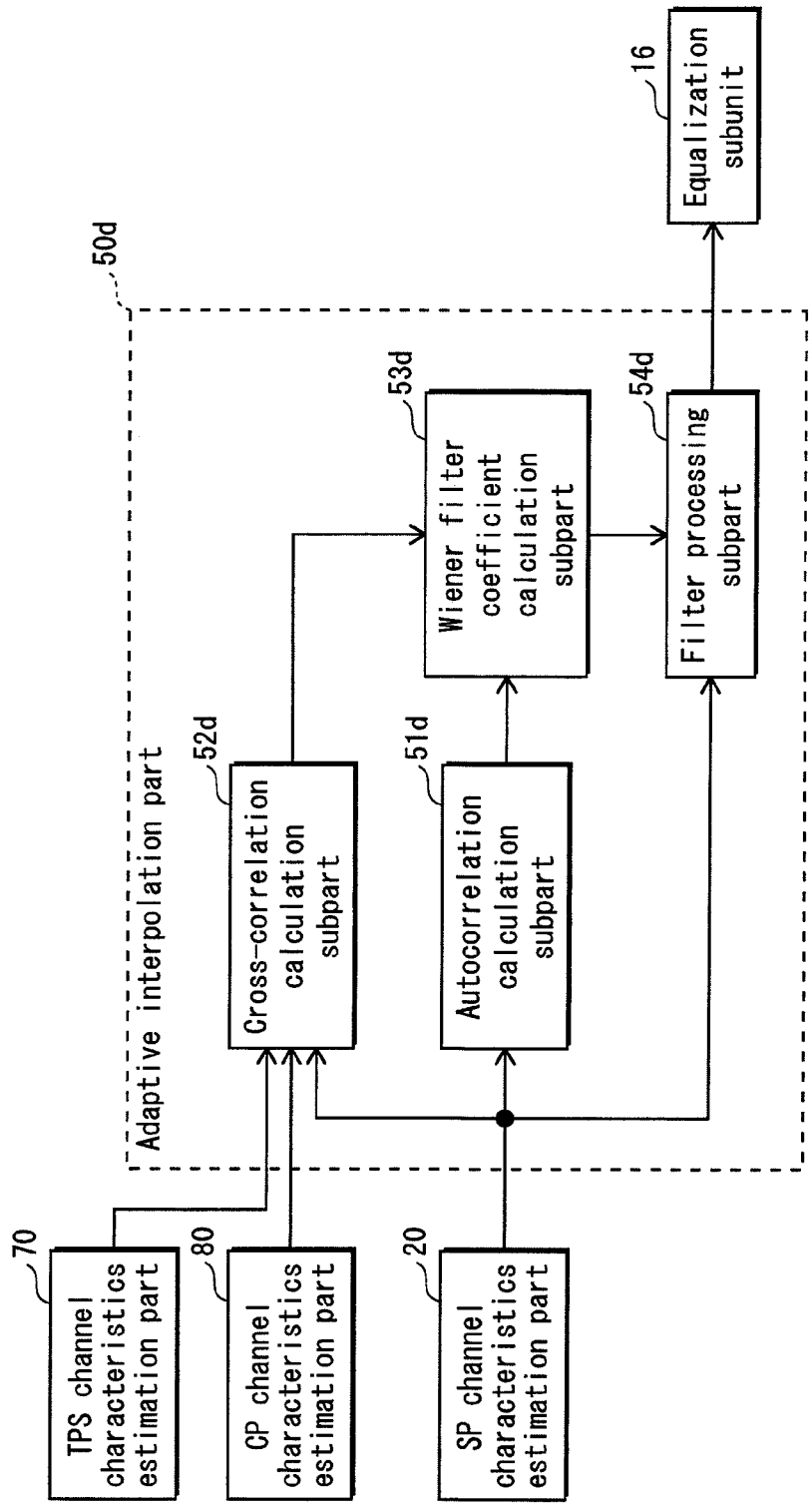
FIG. 26 is a structural diagram of an adaptive interpolation part shown in FIG. 23.

The following describes the structure and operations of the adaptive interpolation part 50d with reference to FIG. 26. FIG. 26 is a structural diagram of the adaptive interpolation part 50d shown in FIG. 23. In FIG. 26, the SP channel characteristics estimation part 20, the TPS channel characteristics estimation part 70, the CP channel characteristics estimation part 80 and the equalization subunit 16 are also illustrated to clearly convey how the internal elements of the adaptive interpolation part 50d are connected thereto.

The adaptive interpolation part 50d includes an autocorrelation calculation subpart 51b, a cross-correlation calculation subpart 52b, a Wiener filter coefficient calculation subpart 53d, and a filter processing subpart 54d.

Figure 27:
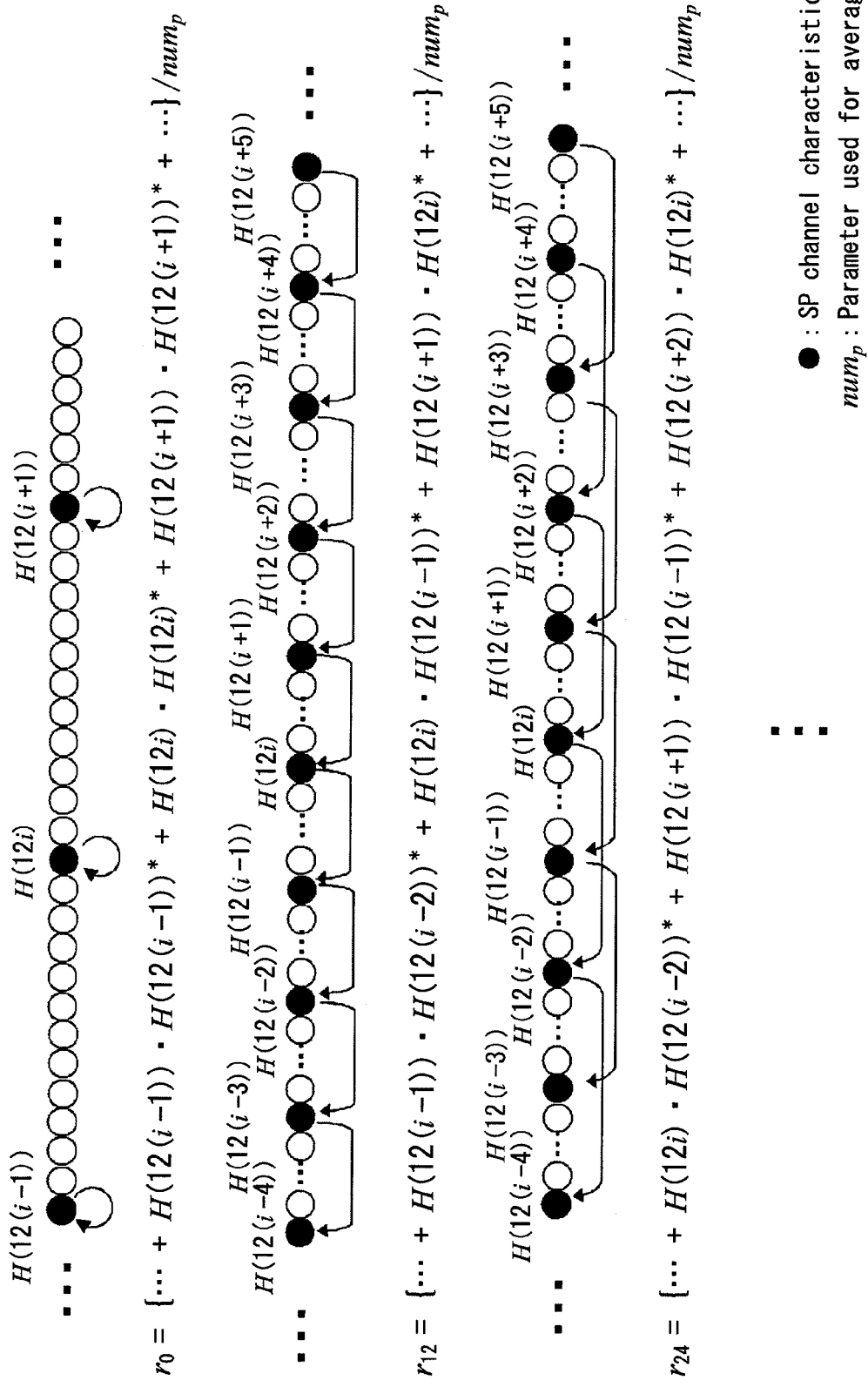
FIG. 27 shows a concept of autocorrelation calculations performed by an autocorrelation calculation subpart shown in FIG. 26.

Given that a carrier number is expressed as i (with i being an integer equal to or greater than "0"), the autocorrelation calculation subpart 51d calculates autocorrelation values each of whose notations is "0" or a multiple of "12", namely $r_0, r_{12}, r_{24} \ldots$ by performing the autocorrelation calculation shown in the following (Equation 26) with use of the channel characteristics H(i) at $12n^{th}$ carriers, which are output from the SP channel characteristics estimation part 20. Then, by taking advantage of the relationship $r_{-m} = r_m^*$, the autocorrelation calculation subpart 51d calculates the autocorrelation matrix $R_{xx}$ shown in the following (Equation 27) with use of the calculated autocorrelation values r. Thereafter, the autocorrelation calculation subpart 51d outputs the calculated autocorrelation matrix $R_{xx}$ to the Wiener filter coefficient calculation subpart 53b. Note, a concept of autocorrelation calculations for obtaining the autocorrelation values $r_0$, $r_{12}$, $r_{24}$, ... is shown in FIG. 27. As autocorrelation calculation is a known technique, its detailed description is omitted.

$$r_{12m} = E[H(12n + 3(q \bmod 4))H(12n - 12m + 3(q \bmod 4))^*] \quad \text{(Equation 26)}$$

$$R_{xx} = \begin{bmatrix} r_0 & r_{12} & r_{24} & r_{36} & r_{48} & \cdots & r_{12(tap-1)} \\ r_{-12} & r_0 & r_{12} & r_{24} & r_{36} & \cdots & r_{12(tap-2)} \\ r_{-24} & r_{-12} & r_0 & r_{12} & r_{24} & \cdots & r_{12(tap-3)} \\ r_{-36} & r_{-24} & r_{-12} & r_0 & r_{12} & \cdots & r_{12(tap-4)} \\ r_{-48} & r_{-36} & r_{-24} & r_{-12} & r_0 & \cdots & r_{12(tap-5)} \\ \vdots & \vdots & \vdots & \vdots & \vdots & \ddots & \vdots \\ r_{-12(tap-1)} & r_{-12(tap-2)} & r_{-12(tap-3)} & r_{-12(tap-4)} & r_{-12(tap-5)} & \cdots & r_0 \end{bmatrix} \quad \text{(Equation 27)}$$

Note, "mod" represents a remainder operator. Also, "q" is an integer equal to or greater than "0" and represents a symbol number. These rules apply to the rest of this Description.

Figure 28:
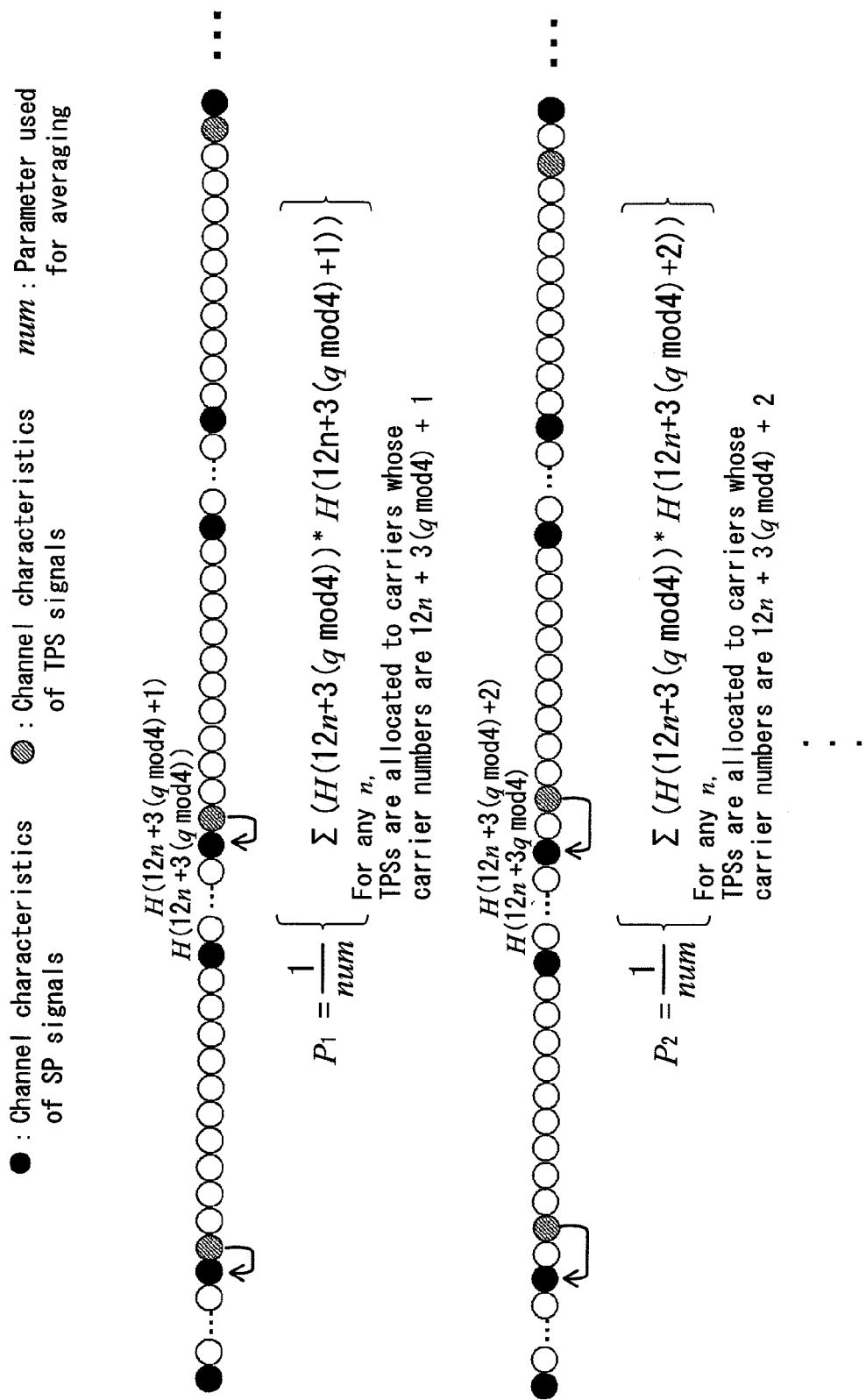
FIG. 28 shows a concept of cross-correlation calculations performed by a cross-correlation calculation subpart shown in FIG. 26.

Given that a carrier number is expressed as i or j (with each of i and j being an integer equal to or greater than "0"), the cross-correlation calculation subpart $52d$ calculates cross-correlation values p by performing the cross-correlation calculation shown in the following (Equation 28) with use of (i) both of (a) TPS channel characteristics H(j), which are output from the TPS channel characteristics estimation part $70$, and (b) CP channel characteristics H(j), which are output from the CP channel characteristics estimation part $80$, and (ii) channel characteristics H(i) at $12n^{th}$ carriers, which are output from the SP channel characteristics estimation part $20$. Then, with use of the calculated cross-correlation values p, the cross-correlation calculation subpart $52d$ calculates cross-correlation vectors $P_{dx,z}$ shown in the following (Equation 29) (in the present embodiment, cross-correlation vectors $P_{dx,1}$ to $P_{dx,11}$ are calculated for z=1 to 11). Thereafter, the cross-correlation calculation subunit $52d$ outputs the calculated cross-correlation vectors $P_{dx,z}$ to the Wiener filter coefficient calculation subpart $53d$. Note, a concept of cross-correlation calculations for obtaining the cross-correlation values $p_1$ and $p_2$ is shown in FIG. 28.

$$p_{z+12m} = E[H(12n+z+3(q \bmod 4))H(12n-12m+3(q \bmod 4))^*] \quad \text{(Equation 28)}$$

$$P_{dx,z} = [p_{z+12(tap-1)/2} \cdots p_{z+12} p_z p_{z-12} \cdots p_{z-12(tap-1)/2}]^T \quad \text{(Equation 29)}$$

In (Equation 28), "H(12n+z+3 (qmod 4))" represents both of the TPS channel characteristics output from the TPS channel characteristics estimation part $70$ and the CP channel characteristics output from the CP channel characteristics estimation part $80$, and "H (12n−12m+3(qmod 4))" represents the channel characteristics at $12n^{th}$ carriers, which are output from the SP channel characteristics estimation part $20$. Here, m is an integer ranging between −(tap−1)/2 and (tap−1)/2, inclusive.

TPS signals are non-periodically allocated to carriers whose carrier numbers do not include any SP signals. CP signals are non-periodically allocated to carriers whose carrier numbers include SP signals. Accordingly, in the cross-correlation calculation shown in (Equation 28), (i) signals output from the TPS channel characteristics estimation part $70$ are used for "H (12n+z+3(gmod 4))" when z is equal to none of 3, 6 and 9, and (ii) signals output from the CP channel characteristics estimation part $80$ are used for "H (12n+z+3 (qmod 4))" when z is equal to 3, 6 or 9.

When only the TPS signals are used, it is not possible to calculate a value of cross-correlation between (i) each SP carrier and (ii) a carrier position whose carrier number is larger than the carrier number of the SP carrier by three, six, or nine. However, when the CP signals are used, it is possible to calculate such a value of cross-correlation between. Meanwhile, when only the CP signals are used, it is not possible to calculate a value of cross-correlation between (i) each SP carrier and (ii) a carrier position whose carrier number is larger than the carrier number of the SP carrier by one to eleven (except for a carrier position whose carrier number is larger than the carrier number of the SP carrier by three, six, or nine). However, when the TPS signals are used, it is possible to calculate such a value of cross-correlation.

As specific examples of processing performed by the cross-correlation calculation subpart $52d$, the following describes two cases where a cross-correlation value $p_1$ (z=1, m=0) and a cross-correlation value $p_2$ (z=2, m=0) are calculated, respectively.

First, calculation of the cross-correlation value $p_1$ (z=1, m=0) is described below. The targets of calculation of the cross-correlation value $p_1$ are all the TPS carriers whose carrier numbers are larger by one than the carrier numbers of $12n^{th}$ carriers whose channel characteristics values are output from the SP channel characteristics estimation part $20$ (i.e., all the TPS carriers that are on the immediate right of the $12n^{th}$ carriers). Here, the carrier numbers of $12n^{th}$ carriers are expressed as 12n+3(qmod 4), where each of n and q is an integer equal to or greater than "0". For any n whereby TPS signals are allocated to carriers whose carrier numbers are 12n+3(qmod 4)+1, the cross-correlation calculation subpart $52d$ calculates cross-correlation between (i) each of the values of the TPS channel characteristics at TPS carriers, which are estimated by the TPS channel characteristics estimation part $70$, and (ii) the value of channel characteristics at the corresponding $12n^{th}$ carrier whose carrier number is smaller by one than the carrier number of the TPS carrier (at a carrier that is on the immediate left of the TPS carrier), the value being estimated by the SP channel characteristics estimation part $20$. The cross-correlation calculation subpart $52d$ calculates the cross-correlation value $p_1$ by averaging the cross-correlations calculated in the above manner (see the upper row of FIG. 28).

Next, calculation of the cross-correlation value $p_2$ (z=2, m=0) is described below. The targets of calculation of the cross-correlation value $p_2$ are all the TPS carriers whose carrier numbers are larger by two than the carrier numbers of $12n^{th}$ carriers whose channel characteristics values are output from the SP channel characteristics estimation part $20$ (i.e., all the TPS carriers that are on the right of the $12n^{th}$ carriers with one carrier therebetween). Here, the carrier numbers of $12n^{th}$ carriers are expressed as 12n+3 (qmod 4). For any n whereby TPS signals are allocated to carriers whose carrier numbers are 12n+3 (qmod 4)+2, the cross-correlation calculation subpart $52d$ calculates cross-correlation between (i) each of the values of the TPS channel characteristics at TPS carriers, which are estimated by the TPS channel characteristics estimation part $70$, and (ii) the value of channel characteristics at the corresponding $12n^{th}$ carrier whose carrier number is smaller by two than the carrier number of the TPS carrier (at a carrier that is on the left of the TPS carrier with one carrier therebetween), the value being estimated by the SP channel characteristics estimation part $20$. The cross-correlation calculation subpart $52d$ calculates the cross-correlation value $p_2$ by averaging the cross-correlations calculated in the above manner.

The Wiener filter coefficient calculation subpart $53d$ calculates Wiener filter coefficients $w_k$, by performing the calculation shown in the following (Equation 30) with use of (i) the autocorrelation matrix $R_{xx}$ input from the autocorrelation calculation subpart $51d$ and (ii) the cross-correlation vectors $P_{dx,z}$ input from the cross-correlation calculation subpart $52d$. In the present embodiment, the calculation shown in (Equation 30) is performed for each of the cross-correlation vectors $P_{dx,1}$ to $P_{dx,11}$. Then, based on the values of the calculated Wiener filter coefficients $w_k$, the Wiener filter coefficient calculation subpart $53d$ calculates filter coefficients $c_k$ of the filter processing subpart $54$ by using the following (Equation 31), and outputs the values of the calculated filter coefficients $c_k$ to the filter processing subpart $54d$. Note, in (Equation 31), s is an integer.

$$W_z = [w_{z+12(tap-1)/2} \cdots w_{z+12}\ w_z\ w_{z-12} \cdots w_{z-12(tap-1)/2}]^T = \quad \text{(Equation 30)}$$
$$R_{xx}^{-1} P_{dx,z}$$

$$c_k = \begin{cases} w_k & : k \ne 12s \\ 1 & : k = 0 \\ 0 & : k = 12s\ (s \ne 0) \end{cases} \quad \text{(Equation 31)}$$

The filter processing subpart 54d calculates channel characteristics at certain carriers which have not been obtained yet, by filtering the values of channel characteristics at the $12n^{th}$ carriers, which have been output from the SP channel characteristics estimation part 20, with use of the values of the filter coefficients $c_k$ input from the Wiener filter coefficient calculation subpart 53d. The filter processing subpart 54d then outputs values of channel characteristics at all the carriers to the equalization subunit 16. The above processing performed by the filter processing subpart 54d is expressed by the following (Equation 32). Note, in (Equation 32), (i) the values of channel characteristics at $12n^{th}$ carriers, which are output from the SP channel characteristics estimation subpart 20, are substituted into H(i) when i=12n (with n being an integer equal to or greater than "0"), and (ii) a value "0" is substituted into H(i) when i≠12n.

$$\hat{H}(l) = \Sigma c_{-k} H(k+l) \quad \text{(Equation 32)}$$

<Comparison between Fifth Embodiment and Conventional Interpolation (One Symbol Estimation)>

FIG. 29A shows a concept of filter configuration used in conventional interpolation (one symbol estimation), and FIG. 29B shows a concept of filter configuration used in the adaptive interpolation performed by the adaptive interpolation part 50 of Fifth Embodiment. Note, FIGS. 29A and 29B incorporate schematic diagrams showing delay profiles, whereby there are (i) dominant waves and (ii) delayed waves whose delay spread exceeds Tu/12 [s].

When the symbol direction interpolation is not performed, channel characteristics at $12n^{th}$ carriers are input to the adaptive interpolation part 50d. Thus, according to the sampling theorem, aliasing components appear at every Tu/12 [s] (see FIGS. 29A and 29B). In both of the one symbol estimation and the method pertaining to Fifth Embodiment, interpolation is performed by executing filter processing on the channel characteristics at $12n^{th}$ carriers. As a result, channel characteristics at all the carriers are calculated. Interpolation can be properly performed if the filter processing (i) causes the signal components shown by solid lines to pass through the filter and (ii) removes the aliasing components shown by dotted lines.

However, according to the conventional one symbol estimation, interpolation is performed by using a filter whose passband is equal to or smaller than Tu/12 [s]. Consequently, of the signal components that are supposed to pass through the filter (shown by the solid lines), components of delayed waves whose delay spread exceeds Tu/12 [s] fall outside the passband of the filter. Furthermore, the aliasing components shown by the dotted lines (aliasing components of delayed waves whose delay spread exceeds Tu/12[s]) fall within the passband of the filter (see FIG. 29A). For the above reasons, interpolation cannot be properly performed with the conventional one symbol estimation.

On the other hand, according to the method pertaining to Fifth Embodiment, the Wiener filter coefficients are calculated by utilizing the following (i) and (ii) as the filter input signals and the target signals, respectively: (i) values of channel characteristics calculated with use of SP signals; and (ii) values of channel characteristics calculated with use of TPS signals and CP signals. This method makes it possible to configure a filter with a filter property that (i) makes only the desired signal components (shown by solid lines in FIG. 29B) pass through the filter, and (ii) removes the aliasing components (shown by dotted lines in FIG. 29B). Therefore, with the method pertaining to Fifth Embodiment, interpolation can be properly performed without being affected by aliasing, even if the receiver is in a receiving environment where there are delayed waves whose delay spread exceeds Tu/12 [s]. Also, as shown in FIG. 29B, the method pertaining to Fifth Embodiment allows configuring a filter that would make only the desired signals pass through filter. Therefore, the method pertaining to Fifth Embodiment does not require undue broadening of the passband of the filter, prevents the reception signal from being affected by noise components, such as Johnson-Nyquist noise and Intercarrier interference components associated with mobility of the receiver, and improves robustness against noise.

FIG. 30A shows a range within which interpolation can be performed with conventional technology (one symbol estimation), and FIG. 30B shows a range within which adaptive interpolation can be performed by the adaptive interpolation part 50d of Fifth Embodiment.

With the conventional one symbol estimation, interpolation can be properly performed as long as delay spread is equal to or smaller than Tu/12 [s] and Doppler broadening is equal to or smaller than 1/Ts [Hz] (see FIG. 30A). As opposed to this, with the method pertaining to Fifth Embodiment, interpolation can be properly performed as long as delay spread is equal to or smaller than Tu[s] and Doppler broadening is equal to or smaller than 1/Ts [Hz] (see FIG. 30B). That is to say, although the method pertaining to Fifth Embodiment offers the same level of robustness against mobility as the conventional one symbol estimation, the method pertaining to Fifth Embodiment offers an improved level of robustness against delay compared to the conventional one symbol estimation.

<Comparison Between Fifth Embodiment and Conventional Interpolation (Four Symbol Estimation)>

With the conventional four symbol estimation, interpolation can be properly performed as long as delay spread is equal to or smaller than Tu/3 [s] and Doppler broadening is equal to or smaller than 1/(4 Ts) [Hz] (see FIG. 15A). As opposed to this, with the method pertaining to Fifth Embodiment, interpolation can be properly performed as long as delay spread is equal to or smaller than Tu[s] and Doppler broadening is equal to or smaller than 1/Ts [Hz] (see FIG. 30B). That is to say, the method pertaining to Fifth Embodiment offers an improved level of robustness against both mobility and delay compared to the conventional four symbol estimation.

<Comparison Between Methods Pertaining to First and Fifth Embodiments>

In both of the methods pertaining to First and Second Embodiments, adaptive interpolation is performed in the carrier direction. Hence, these methods make it possible to properly perform interpolation as long as delay spread is equal to or smaller than Tu[s] (see FIGS. 15B and 30B). Also, in the method pertaining to First Embodiment, the symbol direction interpolation is performed. Hence, the method pertaining to First Embodiment only makes it possible to properly perform interpolation as long as Doppler broadening is equal to or smaller than 1/(4 Ts) [Hz] (see FIG. 15B). In contrast, in the method pertaining to Fifth Embodiment, the symbol direction interpolation is not performed. Hence, the method pertaining to Fifth Embodiment makes it possible to properly perform interpolation as long as Doppler broadening is equal to or smaller than 1/Ts [Hz] (see FIG. 30B). As can be seen from the above, although the method pertaining to Fifth Embodiment offers the same level of robustness against delay as the method pertaining to First Embodiment, the method pertaining to Fifth Embodiment offers an improved level of robustness against mobility compared to the method pertaining to First Embodiment.

The above comparisons show that the channel characteristics estimation subunit 15d of Fifth Embodiment can interpolate channel characteristics in a wider variety of receiving environments.

Sixth Embodiment

Sixth Embodiment of the present invention is described below with reference to the accompanying drawings. Note, as with First to Third Embodiments, the following description of Sixth Embodiment is given by taking an example of a digital television broadcast receiver compliant with the ISDB-T standard.

The channel characteristics estimation subunit 15 of First Embodiment performs symbol direction interpolation and adaptive interpolation. As opposed to this, a channel characteristics estimation subunit of the present embodiment performs adaptive interpolation and carrier direction interpolation. Other structural elements of the receiver of Sixth Embodiment are substantially the same as those of the receiver of First Embodiment, as far as the present invention is concerned.

The following describes the structure and operations of the channel characteristics estimation subunit. Structural elements of Sixth Embodiment that are substantially the same as in First to Fifth Embodiments are assigned the same reference numbers thereas. As these structural elements have been explained in First to Fifth Embodiments, they are omitted from or only briefly discussed in the description of Sixth Embodiment.

<Structure and Operations of Channel Characteristics Estimation Subunit>

Figure 31:
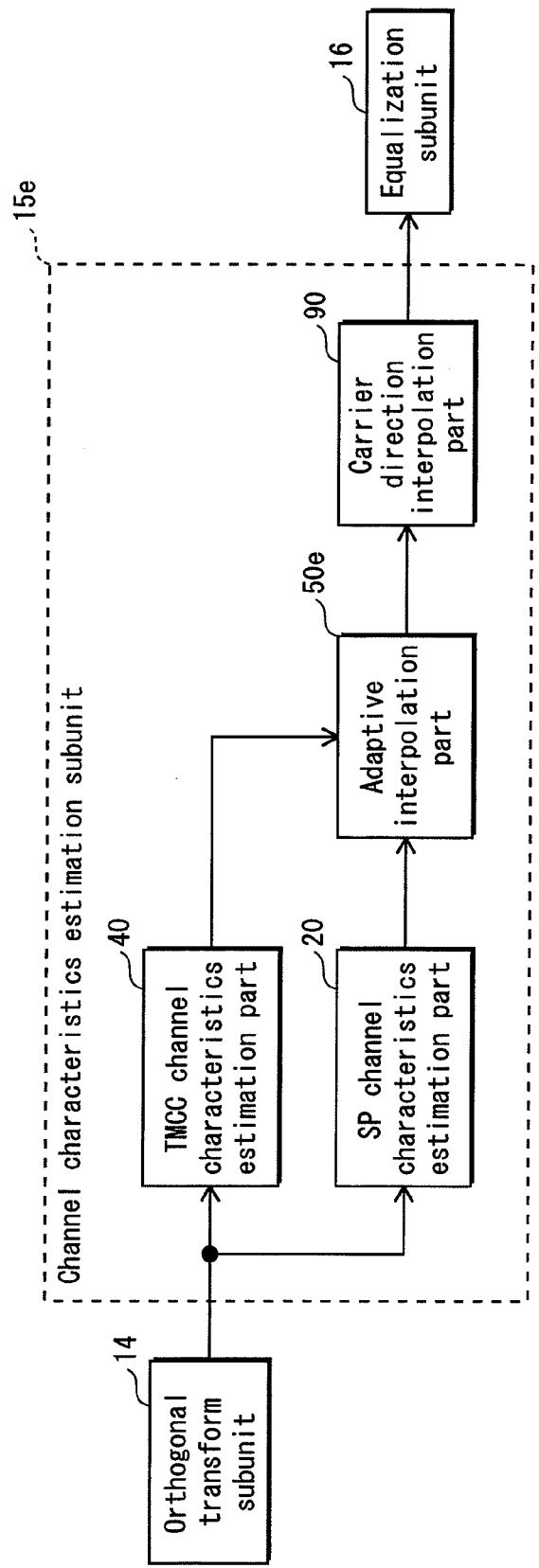
FIG. 31 is a structural diagram of a channel characteristics estimation subunit pertaining to Sixth Embodiment.

FIG. 31 is a structural diagram of a channel characteristics estimation subunit 15e pertaining to the present embodiment. In FIG. 31, the orthogonal transform subunit 14 and the equalization subunit 16 are also illustrated to clearly convey how the internal elements of the channel characteristics estimation subpart 15e are connected thereto.

The channel characteristics estimation subunit 15e includes an SP channel characteristics estimation part 20, a TMCC channel characteristics estimation part 40, an adaptive interpolation part 50e, and a carrier direction interpolation part 90.

The SP channel characteristics estimation part 20 (i) extracts SP signals from the signals output from the orthogonal transform subunit 14, (ii) based on the extracted SP signals, estimates SP channel characteristics, which are channel characteristics at the SP carriers to which the SP signals are allocated, and (iii) outputs values of the estimated SP channel characteristics to the adaptive interpolation part 50e. The TMCC channel characteristics estimation part 40 (i) extracts TMCC signals from the signals output from the orthogonal transform subunit 14, (ii) based on the extracted TMCC signals, estimates TMCC channel characteristics, which are channel characteristics at TMCC carriers to which the TMCC signals are allocated, and (iii) outputs values of the estimated TMCC channel characteristics to the adaptive interpolation part 50e.

The adaptive interpolation part 50e performs the following processing for each symbol. First, the adaptive interpolation part 50e calculates filter coefficients by using (i) the values of channel characteristics at $12n^{th}$ carriers, which are output from the SP channel characteristics estimation part 20, and (ii) the values of TMCC channel characteristics, which are output from the TMCC channel characteristics estimation part 40. Next, with use of the calculated filter coefficients, the adaptive interpolation part 50e performs adaptive interpolation by filtering the values of channel characteristics at $12n^{th}$ carriers, which are output from the SP channel characteristics estimation part 20. This way, the adaptive interpolation part 50e can calculate channel characteristics at carriers other than $3n^{th}$ carriers (with n being an integer equal to or greater than "0"). The adaptive interpolation part 50e then outputs the calculation results to the carrier direction interpolation part 90.

Figure 32:
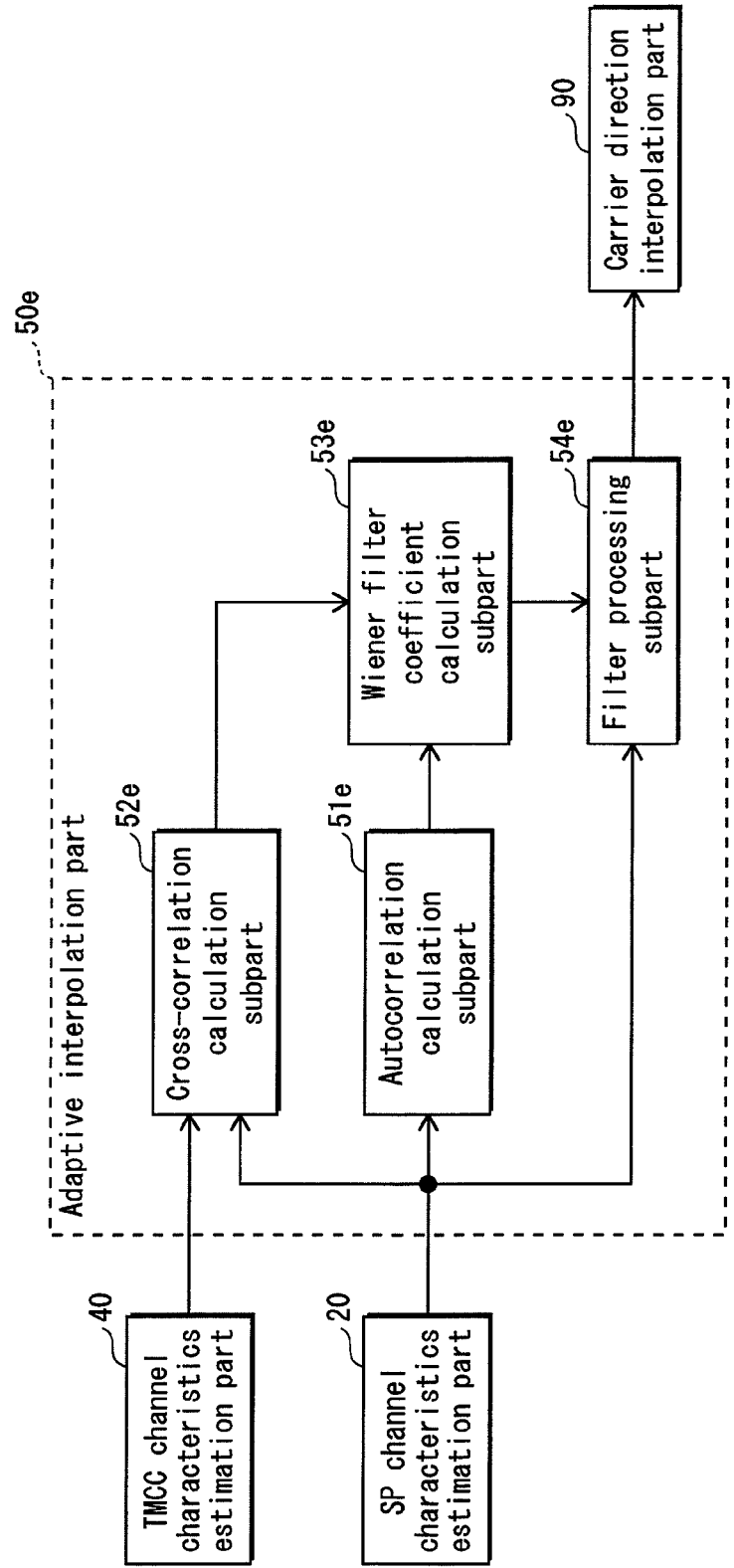
FIG. 32 is a structural diagram of an adaptive interpolation part shown in FIG. 31.

The following describes the structure and operations of the adaptive interpolation part 50e with reference to FIG. 32. FIG. 32 is a structural diagram of the adaptive interpolation part 50e shown in FIG. 31. In FIG. 32, the SP channel characteristics estimation part 20, the TMCC channel characteristics estimation part 40 and the carrier direction interpolation part 90 are also illustrated to clearly convey how the internal elements of the adaptive interpolation part 50e are connected thereto.

The adaptive interpolation part 50e includes an autocorrelation calculation subpart 51e, a cross-correlation calculation subpart 52e, a Wiener filter coefficient calculation subpart 53e, and a filter processing subpart 54e.

Given that a carrier number is expressed as i (with i being an integer equal to or greater than "0"), the autocorrelation calculation subpart 51e calculates autocorrelation values each of whose notations is "0" or a multiple of "12", namely $r_0, r_{12}, r_{24}, \ldots$ by performing the autocorrelation calculation shown in the following (Equation 33) with use of the channel characteristics H(i) at $12n^{th}$ carriers, which are output from the SP channel characteristics estimation part 20. Then, by taking advantage of the relationship $r_{-m}=r_m^*$, the autocorrelation calculation subpart 51e calculates the autocorrelation matrix $R_{xx}$ shown in the following (Equation 34) with use of the calculated autocorrelation values r. Thereafter, the autocorrelation calculation subpart 51e outputs the calculated autocorrelation matrix $R_{xx}$ to the Wiener filter coefficient calculation subpart 53e.

$$r_{12m} = E[H(12n+3(q\bmod 4))H(12n-12m+3(q\bmod 4))^*] \quad \text{(Equation 33)}$$

$$R_{xx} = \begin{bmatrix} r_0 & r_{12} & r_{24} & r_{36} & r_{48} & \cdots & r_{12(tap-1)} \\ r_{-12} & r_0 & r_{12} & r_{24} & r_{36} & \cdots & r_{12(tap-2)} \\ r_{-24} & r_{-12} & r_0 & r_{12} & r_{24} & \cdots & r_{12(tap-3)} \\ r_{-36} & r_{-24} & r_{-12} & r_0 & r_{12} & \cdots & r_{12(tap-4)} \\ r_{-48} & r_{-36} & r_{-24} & r_{-12} & r_0 & \cdots & r_{12(tap-5)} \\ \vdots & \vdots & \vdots & \vdots & \vdots & \ddots & \vdots \\ r_{-12(tap-1)} & r_{-12(tap-2)} & r_{-12(tap-3)} & r_{-12(tap-4)} & r_{-12(tap-5)} & \cdots & r_0 \end{bmatrix} \quad \text{(Equation 34)}$$

Given that a carrier number is expressed as i or j (with each of i and j being an integer equal to or grater than "0"), the cross-correlation calculation subpart 52e calculates cross-correlation values p by performing the cross-correlation calculation shown in the following (Equation 35) with use of (i) TMCC channel characteristics H(j), which are output from the TMCC channel characteristics estimation part 40, and (ii) channel characteristics H(i) at $12n^{th}$ carriers, which are output from the SP channel characteristics estimation part 20. Then, by using the calculated cross-correlation values p, the cross-correlation calculation subpart 52e calculates cross-correlation vectors $P_{dx,z}$ shown in the following (Equation 36) (in the present embodiment, cross-correlation vectors $P_{dx,1}$, $P_{dx,2}$, $P_{dx,4}$, $P_{dx,5}$, $P_{dx,7}$, $P_{dx,8}$, $P_{dx,10}$, and $P_{dx,11}$ are calculated for z=1, 2, 4, 5, 7, 8, 10, and 11). Thereafter, the cross-correlation calculation subunit 52e outputs the calculated cross-correlation vectors $P_{dx,z}$ to the Wiener filter coefficient calculation subpart 53e.

$$p_{z+12m} = E[H(12n+3(q \bmod 4))H(12n-12m+3(q \bmod 4))^*]$$ (Equation 35)

$$P_{dx,z} = [p_{z+12(tap-1)/2} \cdots p_{z+12} p_z p_{z-12} \cdots p_{z-12(tap-1)/2}]^T$$ (Equation 36)

In (Equation 35), "H (12n+z+3 (qmod 4))" represents TMCC channel characteristics, which are output from the TMCC channel characteristics estimation part 40, and "H (12n−12m+3 (qmod 4))" represents channel characteristics at $12n^{th}$ carriers, which are output from the SP channel characteristics estimation part 20. Here, m is an integer ranging between −(tap−1)/2 and (tap−1)/2, inclusive.

The Wiener filter coefficient calculation subpart 53e calculates Wiener filter coefficients $w_k$ by performing the calculation shown in the following (Equation 37) with use of (i) the autocorrelation matrix $R_{xx}$ input from the autocorrelation calculation subpart 51e and (ii) the cross-correlation vectors $P_{dx,z}$ input from the cross-correlation calculation subpart 52e. In the present embodiment, the calculation shown in (Equation 37) is performed for each of the cross-correlation vectors $P_{dx,1}$, $P_{dx,2}$, $P_{dx,4}$, $P_{dx,5}$, $P_{dx,7}$, $P_{dx,8}$, $P_{dx,10}$ and $P_{dx,11}$. Then, based on the values of the calculated Wiener filter coefficients $w_k$, the Wiener filter coefficient calculation subpart 53e calculates filter coefficients $c_k$ of the filter processing subpart 54e by using the following (Equation 38), and outputs the values of the calculated filter coefficients $c_k$ to the filter processing subpart 54d. Note, in (Equation 38), s is an integer.

$$W_z = [w_{z+12(tap-1)/2} \cdots w_{z+12} \, w_z \, w_{z-12} \cdots w_{z-12(tap-1)/2}]^T = R_{xx}^{-1} P_{dx,z}$$ (Equation 37)

$$c_k = \begin{cases} w_k & : k \neq 3s \\ 0 & : k = 3s \end{cases}$$ (Equation 38)

It should be reminded here that TMCC signals are not allocated to carriers whose carrier numbers are 3n and include SP signals (with n being an integer equal to or greater than "0"). Therefore, it is impossible to calculate cross-correlation values $p_3$, $p_6$, $p_9$, etc., which are obtained by cross-correlating (i) values of channel characteristics at carriers whose carrier numbers are 3n and (ii) values of channel characteristics at $12n^{th}$ carriers, which are calculated by using SP signals. As a result, filter coefficients for calculating channel characteristics at $3n^{th}$ carriers (3n≠12m+3(qmod 4)) cannot be calculated—i.e., channel characteristics at $3n^{th}$ carriers cannot be calculated.

Figure 33A:
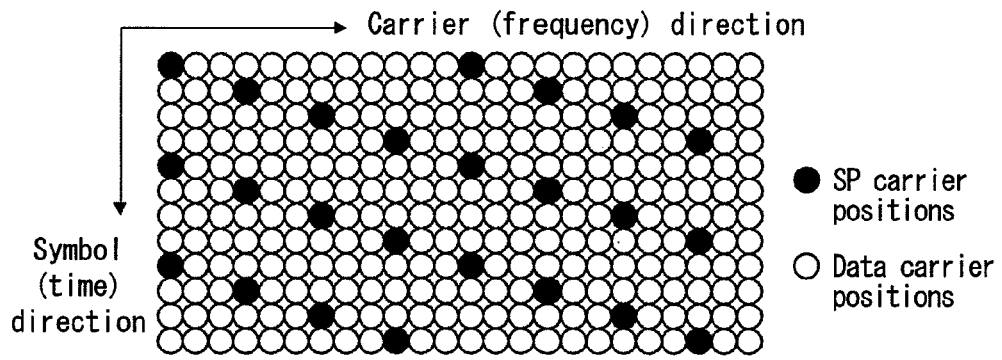
FIG. 33A shows a concept of allocations of scattered pilot signals.
Figure 33B:
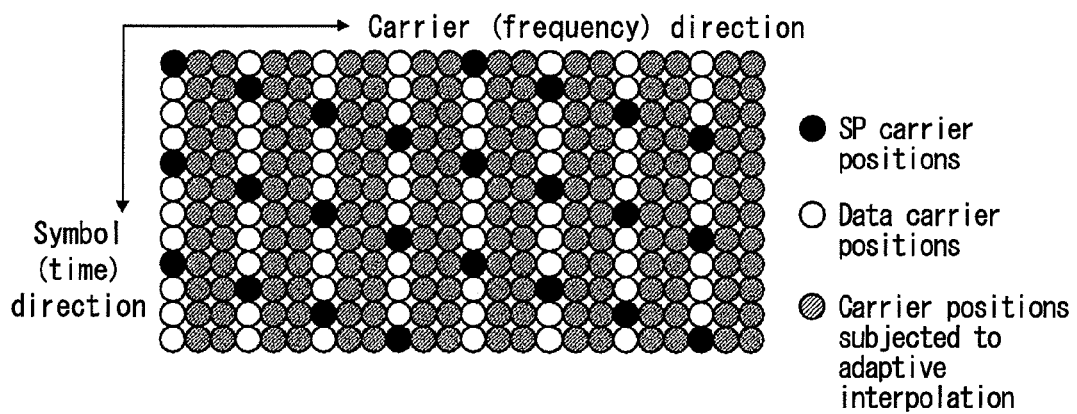
FIG. 33B shows a concept of adaptive interpolation performed by the adaptive interpolation part shown in FIG. 32.

The filter processing subpart 54e calculates channel characteristics at carriers other than $3n^{th}$ carriers by filtering the values of channel characteristics at $12n^{th}$ carriers, which are output from the SP channel characteristics estimation part 20, with use of the values of filter coefficients $c_k$ input from the Wiener filter coefficient calculation subpart 53e (see FIGS. 33A and 33B). The above processing performed by the filter processing subpart 54e is expressed by the following (Equation 39). Note, in (Equation 39), (i) the values of channel characteristics at $12n^{th}$ carriers, which are output from the SP channel characteristics estimation subpart 20, are substituted into H(i) when i=12n (with n being an integer equal to or greater than "0"), and (ii) a value "0" is substituted into H(i) when i≠12n. Thereafter, the filter processing subpart 54e further masks the values of channel characteristics at $3n^{th}$ carriers (at carriers whose channel characteristics cannot be calculated by the adaptive interpolation part 50e performing the adaptive interpolation, and at SP carriers) to "0" (see FIGS. 33B and 33C).

$$H_a(l) = \Sigma c_{-k} H(k+l)$$ (Equation 39)

Figure 33C:
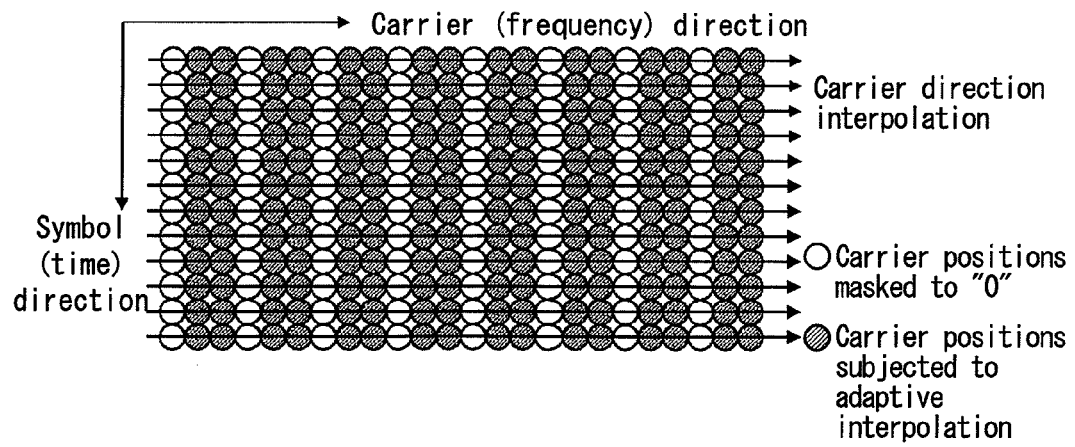
FIG. 33C shows a concept of carrier direction interpolation performed by a carrier direction interpolation part shown in FIG. 32.

As shown in FIG. 33C, the carrier direction interpolation part 90 calculates values of channel characteristics at all the carriers by interpolating channel characteristics in the carrier direction with use of (i) the values of channel characteristics output from the adaptive interpolation part 50e and (ii) fixed coefficients. The carrier direction interpolation part 90 then outputs the values of calculated channel characteristics at all the carriers to the equalization subunit 16. This processing performed by the carrier direction interpolation part 90 is expressed by the following (Equation 40). Note, in (Equation 40), (i) a value "0" is substituted into $H_a$ (i) when i=3n (with n being an integer equal to or greater than "0"), and (ii) the values of channel characteristics obtained by the adaptive interpolation part 50e performing the adaptive interpolation are substituted into $H_a$ (i) when i≠3n. Here, the carrier direction interpolation part 90 uses coefficients that allow obtaining channel characteristics at all the carriers by averaging (i) channel characteristics H1, which are interpolated by using a group of carriers whose carrier numbers are 3n+1 (with n being an integer equal to or greater than "0"), and (ii) channel characteristics H2, which are interpolated by using a group of carriers whose carrier numbers are 3n+2. At this time, interpolation processing and averaging processing may be performed collectively by using one filter having fixed coefficients, or may each be performed individually by using different filters. Note, the carrier direction interpolation is not limited to being performed by using fixed coefficients. Instead, the carrier direction interpolation may be performed by changing the bandwidth depending on the delay amount.

$$\hat{H}(l) = \Sigma d_{-k} H(k+l)$$ (Equation 40)

Comparison Between Sixth Embodiment and Conventional Interpolation (One Symbol Estimation)>

FIG. 34A shows a concept of filter configuration used in conventional interpolation (one symbol estimation), and FIG. 34B shows a concept of filter configuration used in the adaptive interpolation pertaining to Sixth Embodiment. Note, FIGS. 34A and 34B incorporate schematic diagrams showing delay profiles, whereby there are (i) dominant waves and (ii) delayed waves whose delay spread exceeds Tu/12 [s].

When the symbol direction interpolation is not performed, channel characteristics at $12n^{th}$ carriers are input to the adaptive interpolation part 50e. Thus, according to the sampling theorem, aliasing components appear at every Tu/12 [s] (see FIGS. 34A and 34B). In both of the one symbol estimation and the method pertaining to Sixth Embodiment, interpolation is performed by executing filter processing on the channel characteristics at $12n^{th}$ carriers. As a result, channel characteristics at all the carriers are calculated. Interpolation can be properly performed if the filter processing (i) causes the signal components shown by solid lines to pass through the filter and (ii) removes the aliasing components shown by dotted lines.

However, according to the conventional one symbol estimation, interpolation is performed by using a filter whose passband is equal to or smaller than Tu/12 [s]. Consequently, of the signal components that are supposed to pass through the filter (shown by the solid lines), components of delayed waves whose delay spread exceeds Tu/12 [s] fall outside the passband of the filter. Furthermore, the aliasing components shown by the dotted lines (aliasing components of delayed waves whose delay spread exceeds Tu/12 [s]) fall within the passband of the filter (see FIG. 34A). For the above reasons, interpolation cannot be properly performed with the conventional one symbol estimation.

On the other hand, according to the method pertaining to Sixth Embodiment, the Wiener filter coefficients is calculated by utilizing the following (i) and (ii) as the filter input signals and the target signals, respectively: (i) values of channel characteristics calculated with use of SP signals; and (ii) values of channel characteristics calculated with use of TMCC signals. This method makes it possible to configure a filter with a filter property that (i) makes only the desired signal components (shown by solid lines) pass through the filter, and (ii) removes the aliasing components (shown by dotted lines) (see the adaptive interpolation shown in FIG. 34B). Therefore, with the method pertaining to Sixth Embodiment, interpolation can be performed without being affected by aliasing, even if the receiver is in a receiving environment where there are delayed waves whose delay spread exceeds Tu/12 [s]. Note, since channel characteristics at $3n^{th}$ carriers are calculated by performing carrier direction interpolation by way of filter processing that employs ordinary fixed coefficients, the method pertaining to Sixth Embodiment offers robustness against delay as long as the delay spread is equal to or smaller than Tu/3 [s] (see the carrier interpolation shown in FIG. 34B). Further, as shown in the adaptive interpolation of FIG. 34B, the method pertaining to Sixth Embodiment allows configuring a filter that makes only the desired signals pass through the filter. Therefore, the method pertaining to Sixth Embodiment does not require undue broadening of the passband of the filter, prevents the reception signal from being affected by noise components, such as Johnson-Nyquist noise and Intercarrier interference components associated with mobility of the receiver, and improves robustness against noise.

Figure 35:
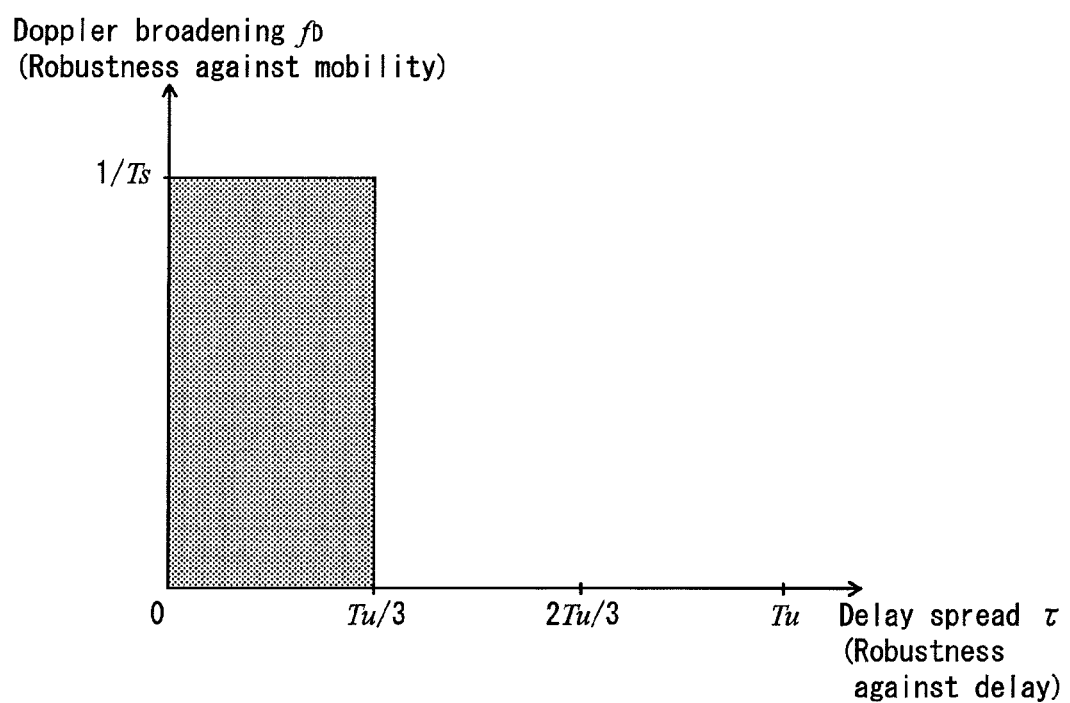
FIG. 35 shows a range within which adaptive interpolation can be performed with the method pertaining to Sixth Embodiment.

FIG. 35 shows a range within which channel interpolation can be performed with the method pertaining to Sixth Embodiment.

With the conventional one symbol estimation, interpolation can be properly performed as long as delay spread is equal to or smaller than Tu/12 [s] and Doppler broadening is equal to or smaller than 1/Ts [Hz] (see FIG. 30A). As opposed to this, with the method pertaining to Sixth Embodiment, interpolation can be properly performed as long as delay spread is equal to or smaller than Tu/3 [s] and Doppler broadening is equal to or smaller than 1/Ts [Hz] (see FIG. 35). That is to say, although the method pertaining to Sixth Embodiment offers the same level of robustness against mobility as the conventional one symbol estimation, the method pertaining to Sixth Embodiment offers an improved level of robustness against delay compared to the conventional one symbol estimation.

<Comparison Between Sixth Embodiment and Conventional Interpolation (Four Symbol Estimation)>

With the conventional four symbol estimation, interpolation can be properly performed as long as delay spread is equal to or smaller than Tu/3 [s] and Doppler broadening is equal to or smaller than 1/(4 Ts) [Hz] (see FIG. 15A). As opposed to this, with the method pertaining to Sixth Embodiment, interpolation can be properly performed as long as delay spread is equal to or smaller than Tu/3 [s] and Doppler broadening is equal to or smaller than 1/Ts [Hz] (see FIG. 35). That is to say, although the method pertaining to Sixth Embodiment offers the same level of robustness against delay as the conventional four symbol estimation, the method pertaining to Sixth Embodiment offers an improved level of robustness against mobility compared to the conventional four symbol estimation.

As set forth above, the method pertaining to Sixth Embodiment allows performing interpolation in a wider variety of receiving environments than the conventional methods. Furthermore, when channel characteristics at certain carriers cannot be calculated by performing adaptive interpolation with use of the Wiener filter, the method pertaining to Sixth Embodiment calculates said channel characteristics at certain carriers by performing the carrier direction interpolation. Accordingly, the method pertaining to Sixth Embodiment is effective in providing improved robustness against delay and the Doppler effect to a wider variety of transmission formats.

Figure 36A:
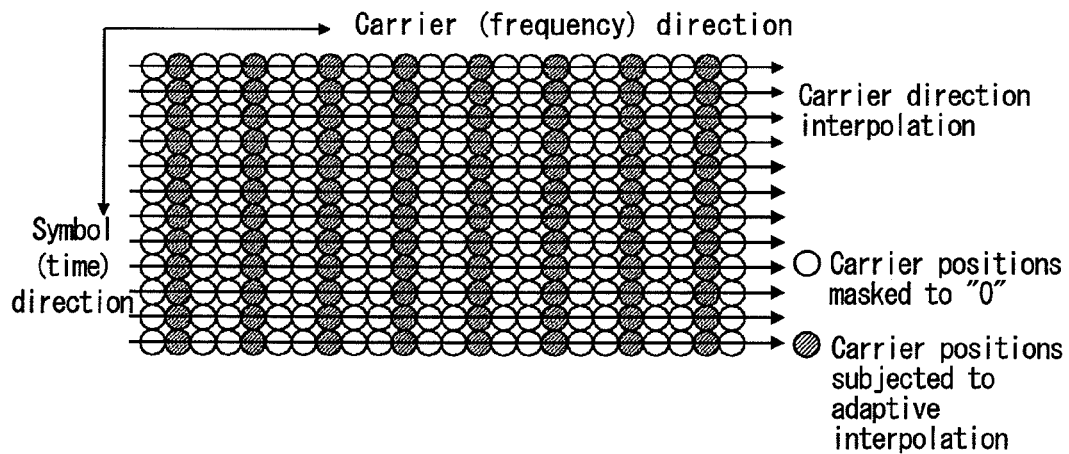
FIG. 36A shows a concept of one type of adaptive interpolation, which is different from the adaptive interpolation shown in FIG. 33B.
Figure 36B:
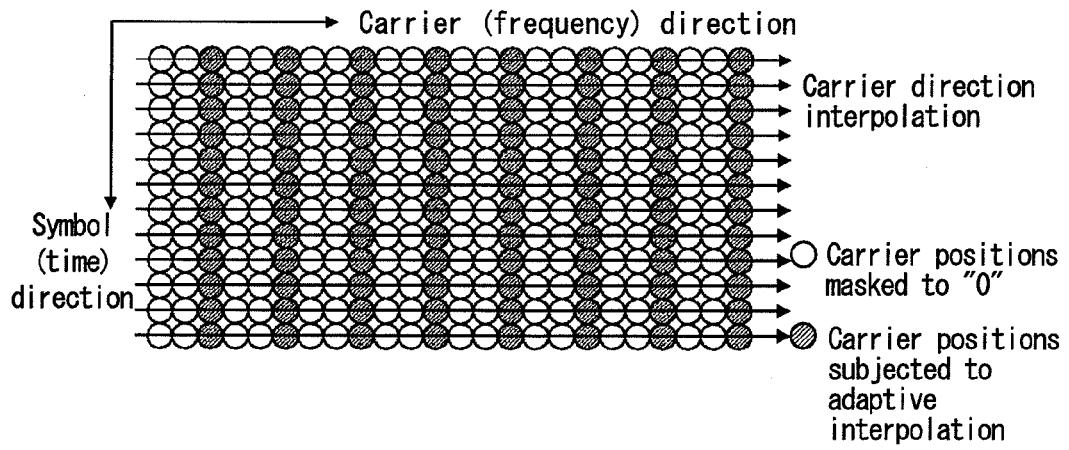
FIG. 36B shows a concept of another type of adaptive interpolation, which is also different from the adaptive interpolation shown in FIG. 33B.

As shown in FIG. 33B, the method pertaining to Sixth Embodiment calculates all the channel characteristics at certain carriers (carriers other than $3n^{th}$ carriers) which can be calculated by performing the adaptive interpolation with use of the Wiener filter. However, considering that the carrier direction interpolation part 90 interpolates the signals output from the adaptive interpolation part 50e in the carrier direction, it is possible to calculate only a part of such channel characteristics at certain carriers which can be calculated by performing the adaptive interpolation with use of the Wiener filter, as shown in FIGS. 36A and 36B. This can reduce the calculation amount required to calculate cross-correlation values, the Wiener filter coefficients, etc.

Seventh Embodiment

Seventh Embodiment of the present invention is described below with reference to the accompanying drawings. Note, as with Fourth and Fifth Embodiments, the following description of Seventh Embodiment is given by taking an example of a digital television broadcast receiver compliant with the DVB-T standard.

The channel characteristics estimation subunit 15e of Sixth Embodiment utilizes, as the target signals, values of channel characteristics calculated by using TMCC signals. As opposed to this, a channel characteristics estimation subunit of the present embodiment utilizes, as the target signals, values of channel characteristics calculated by using CP signals. Other structural elements of the receiver of Seventh Embodiment are substantially the same as those of the receiver of First Embodiment, as far as the present invention is concerned.

The following describes the structure and operations of the channel characteristics estimation subunit. Structural elements of Seventh Embodiment that are substantially the same as in First to Sixth Embodiments are assigned the same reference numbers thereas. As these structural elements have been explained in First to Sixth Embodiments, they are omitted from or only briefly discussed in the description of Seventh Embodiment.

<Structure and Operations of Channel Characteristics Estimation Subunit>

Figure 37:
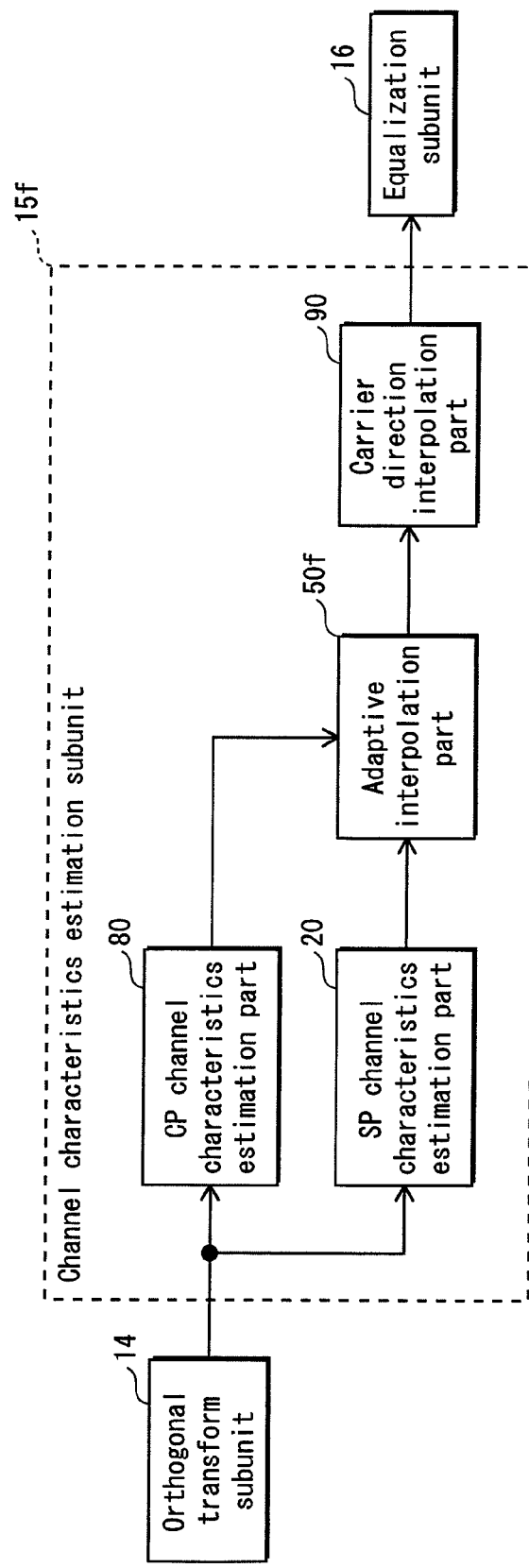
FIG. 37 is a structural diagram of a channel characteristics estimation subunit pertaining to Seventh Embodiment.

FIG. 37 is a structural diagram of a channel characteristics estimation subunit 15f pertaining to the present embodiment. In FIG. 37, the orthogonal transform subunit 14 and the equalization subunit 16 are also illustrated to clearly convey how the internal elements of the channel characteristics estimation subpart 15f are connected thereto.

The channel characteristics estimation subunit 15f includes an SP channel characteristics estimation part 20, a CP channel characteristics estimation part 80, an adaptive interpolation part 50f, and a carrier direction interpolation part 90.

The SP channel characteristics estimation part 20 (i) extracts SP signals from the signals output from the orthogonal transform subunit 14, (ii) based on the extracted SP signals, estimates SP channel characteristics, which are channel characteristics at SP carriers to which the SP signals are allocated, and (iii) outputs values of the estimated SP channel characteristics to the adaptive interpolation part 50f. The CP channel characteristics estimation part 80 (i) extracts CP signals from the signals output from the orthogonal transform subunit 14, (ii) based on the extracted CP signals, estimates CP channel characteristics, which are channel characteristics at CP carriers to which the CP signals are allocated, and (iii) outputs values of the estimated CP channel characteristics to the adaptive interpolation part 50f.

The adaptive interpolation part 50f performs the following processing for each symbol. First, the adaptive interpolation part 50f calculates filter coefficients by using (i) values of channel characteristics at $12n^{th}$ carriers, which are output from the SP channel characteristics estimation part 20, and (ii) values of CP channel characteristics, which are output from the CP channel characteristics estimation part 80. Next, the adaptive interpolation part 50f performs adaptive interpolation by filtering the values of channel characteristics at $12n^{th}$ carriers, which are output from the SP channel characteristics estimation part 20, with use of the calculated filter coefficients. This way, the adaptive interpolation part 50d can calculate channel characteristics at certain carriers whose carrier numbers are 3n (3n≠12m+3 (qmod 4)). The adaptive interpolation part 50f then outputs the results of the calculation to the carrier direction interpolation part 90.

Figure 38:
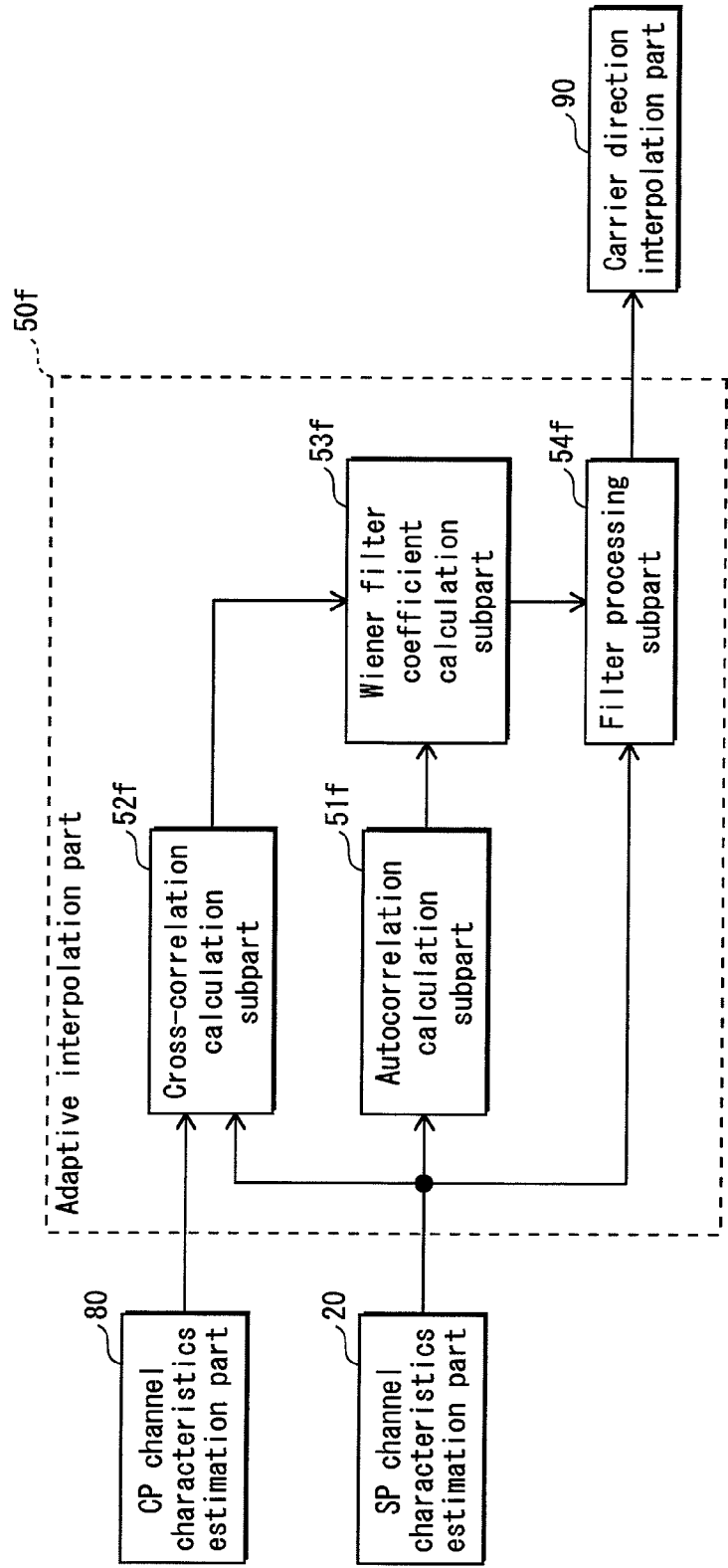
FIG. 38 is a structural diagram of an adaptive interpolation part shown in FIG. 37.

The following describes the structure and operations of the adaptive interpolation part 50f with reference to FIG. 38. FIG. 38 is a structural diagram of the adaptive interpolation part 50f shown in FIG. 37. In FIG. 38, the SP channel characteristics estimation part 20, the CP channel characteristics estimation part 80 and the carrier direction interpolation part 90 are also illustrated to clearly convey how the internal elements of the adaptive interpolation part 50f are connected thereto.

The adaptive interpolation part 50f includes an autocorrelation calculation subpart 51f, a cross-correlation calculation subpart 52f, a Wiener filter coefficient calculation subpart 53f, and a filter processing subunit 54f.

Given that a carrier number is expressed as i (with i being an integer equal to or greater than "0"), the autocorrelation calculation subpart 51f calculates autocorrelation values each of whose notations is "0" or a multiple of "12", namely $r_0, r_{12}, r_{24}, \ldots$ by performing the autocorrelation calculation shown in the following (Equation 41) with use of the channel characteristics H(i) at $12n^{th}$ carriers, which are output from the SP channel characteristics estimation part 20. Then, by taking advantage of the relationship $r_{-m}=r_m^*$, the autocorrelation calculation subpart 51f calculates the autocorrelation matrix $R_{xx}$ shown in the following (Equation 42) with use of the calculated autocorrelation values r. Thereafter, the autocorrelation calculation subpart 51f outputs the calculated autocorrelation matrix $R_{xx}$ to the Wiener filter coefficient calculation subpart 53f.

$$r_{12m} = E[H(12n + 3(q \bmod 4))H(12n - 12m + 3(q \bmod 4))^*] \quad \text{(Equation 41)}$$

$$R_{xx} = \begin{bmatrix} r_0 & r_{12} & r_{24} & r_{36} & r_{48} & \cdots & r_{12(tap-1)} \\ r_{-12} & r_0 & r_{12} & r_{24} & r_{36} & \cdots & r_{12(tap-2)} \\ r_{-24} & r_{-12} & r_0 & r_{12} & r_{24} & \cdots & r_{12(tap-3)} \\ r_{-36} & r_{-24} & r_{-12} & r_0 & r_{12} & \cdots & r_{12(tap-4)} \\ r_{-48} & r_{-36} & r_{-24} & r_{-12} & r_0 & \cdots & r_{12(tap-5)} \\ \vdots & \vdots & \vdots & \vdots & \vdots & \ddots & \vdots \\ r_{-12(tap-1)} & r_{-12(tap-2)} & r_{-12(tap-3)} & r_{-12(tap-4)} & r_{-12(tap-5)} & \cdots & r_0 \end{bmatrix} \quad \text{(Equation 42)}$$

Given that a carrier number is expressed as i or j (with each of i and j being an integer equal to or greater than "0"), the cross-correlation calculation subpart 52f calculates cross-correlation values p by performing the cross-correlation calculation shown in the following (Equation 43) with use of (i) CP channel characteristics H(j), which are output from the CP channel characteristics estimation part 80, and (ii) channel characteristics H(i) at $12n^{th}$ carriers, which are output from the SP channel characteristics estimation part 20. Then, with use of the calculated cross-correlation values p, the cross-correlation calculation subpart 52f calculates cross-correlation vectors $P_{dx,z}$ shown in the following (Equation 44) (in the present embodiment, cross-correlation vectors $P_{dx,3}$, $P_{dx,6}$ and $P_{dx,9}$ are calculated for z=3, 6 and 9). Thereafter, the cross-correlation calculation subunit 52f outputs the calculated cross-correlation vectors $P_{dx,z}$ to the Wiener filter coefficient calculation subpart 53f.

$$p_{z+12m} = E[H(12n+z+3(q \bmod 4))H(12n-12m+3(q \bmod 4))^*] \quad \text{(Equation 43)}$$

$$P_{dx,z} = [p_{z+12(tap-1)/2} \cdots p_{z+12} p_z p_{z-12} \cdots p_{z-12(tap-1)/2}]^T \quad \text{(Equation 44)}$$

In (Equation 43), "H (12n+z+3 (qmod 4))" represents the CP channel characteristics output from the CP channel characteristics estimation part 80, and "H (12n−12m+3 (qmod 4))" represents the channel characteristics at $12n^{th}$ carriers, which are output from the SP channel characteristics estimation part 20. Here, m is an integer ranging between −(tap−1)/2 and (tap−1)/2, inclusive.

The Wiener filter coefficient calculation subpart 53f calculates Wiener filter coefficients $w_k$ by performing the calculation shown in the following (Equation 45) with use of (i) the autocorrelation matrix $R_{xx}$ input from the autocorrelation calculation subpart 51f and (ii) the cross-correlation vectors $P_{dx,z}$ input from the cross-correlation calculation subpart 52f. In the present embodiment, the calculation shown in (Equation 45) is performed for each of the cross-correlation vectors $P_{dx,3}$, $P_{dx,6}$ and $P_{dx,9}$. Then, based on the values of the calculated Wiener filter coefficients $w_k$, the Wiener filter coefficient calculation subpart 53f calculates filter coefficient $c_k$ of the filter processing subpart 54f by using the following (Equation 46), and outputs the values of the calculated filter coefficients $c_k$ to the filter processing subpart 54f. Note, in (Equation 46), each of s and t is an integer.

$$W_z = [w_{z+12(tap-1)/2} \cdots w_{z+12}\ w_z\ w_{z-12} \cdots w_{z-12(tap-1)/2}]^T = R_{xx}^{-1} P_{dx,z}$$ (Equation 45)

$$c_k = \begin{cases} w_k & : k \neq 3s(s \neq 0, k \neq 12t) \\ 1 & : k = 0 \\ 0 & : k \neq 3s\ (s \neq 0), k = 12s(s \neq 0) \end{cases}$$ (Equation 46)

It should be reminded here that CP signals are not allocated to carriers whose carrier numbers are other than 3n and do not include any SP signals (with n being an integer equal to or greater than "0"). Therefore, it is impossible to calculate cross-correlation values $p_1$, $p_2$, $p_4$, $p_5$, $p_7$, $p_8$, $p_{10}$, $p_{11}$, etc., which are obtained by cross-correlating (i) values of channel characteristics at carriers other than $3n^{th}$ carriers and (ii) values of channel characteristics at $12n^{th}$ carriers, which are calculated by using SP signals. As a result, filter coefficients for calculating channel characteristics at carriers other than $3n^{th}$ carriers ($3n \neq 12m+3$ (qmod 4)) cannot be calculated— i.e., channel characteristics at carriers other than $3n^{th}$ carriers cannot be calculated.

Figure 39:
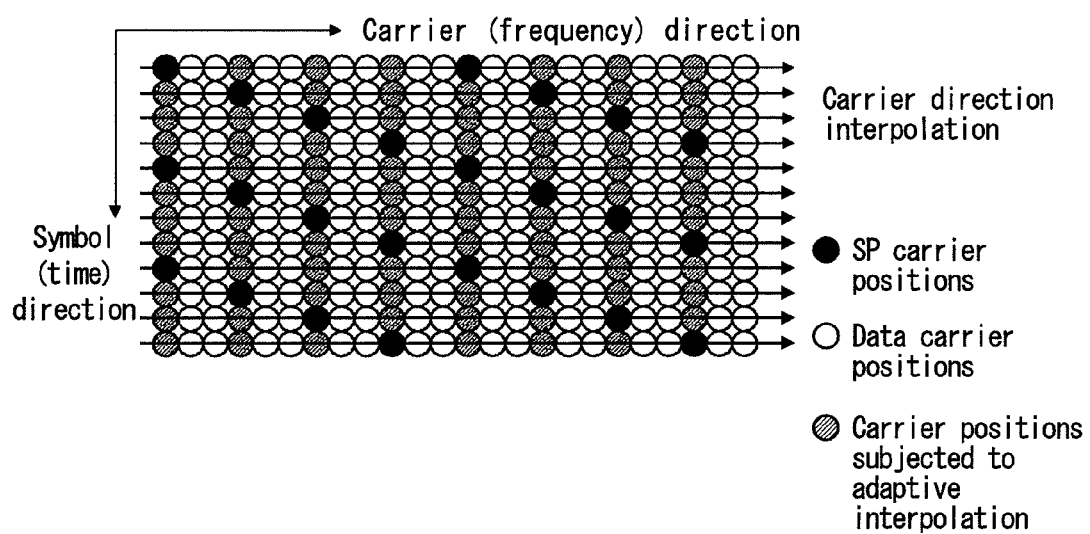
FIG. 39 shows a concept of carrier direction interpolation performed by a carrier direction interpolation part shown in FIG. 37.
Figure 41:
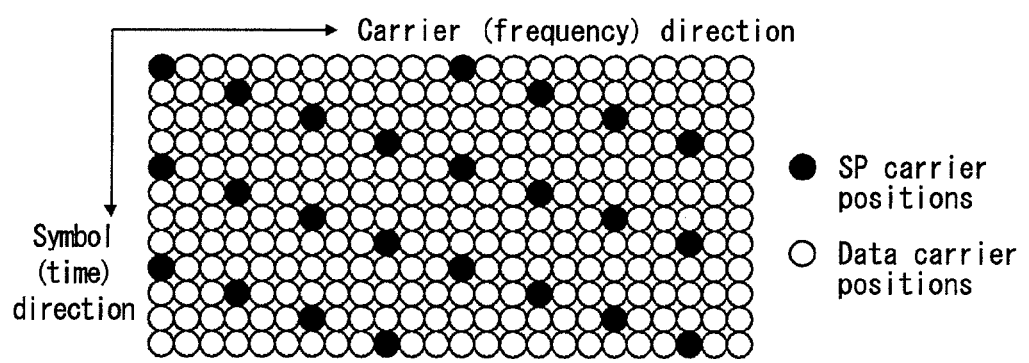
FIG. 41 shows a concept of allocations of scattered pilot signals according to the ISDB-T and DVB-T standards.
Figure 42:
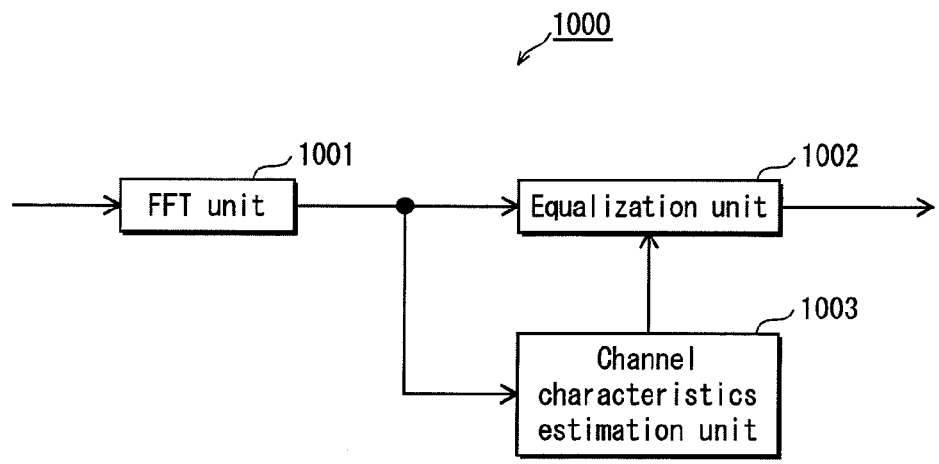
FIG. 42 is a structural diagram of a conventional receiver.
Figure 43:
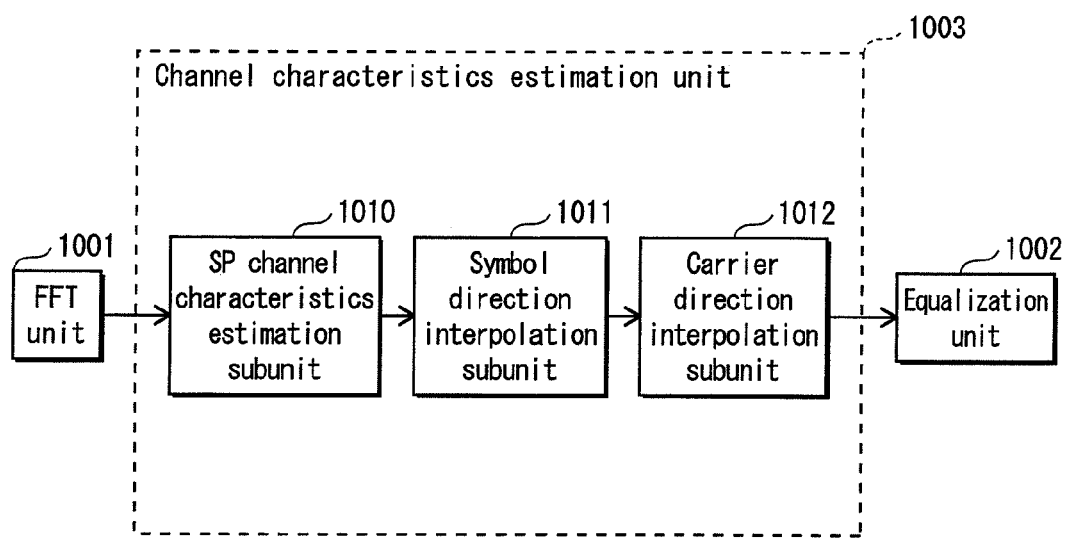
FIG. 43 is a structural diagram of one type of a conventional channel characteristics estimation unit.
Figure 44A:
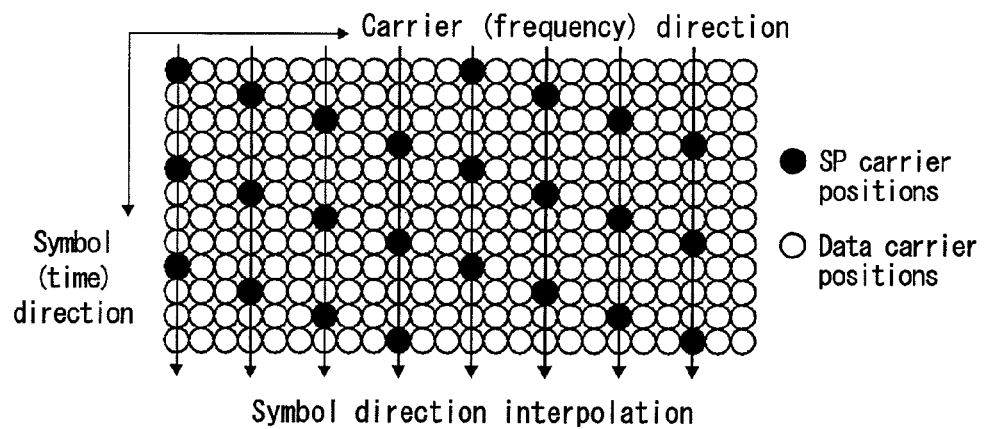
FIG. 44A shows a concept of symbol direction interpolation performed by a symbol direction interpolation subunit shown in FIG. 43.
Figure 44B:
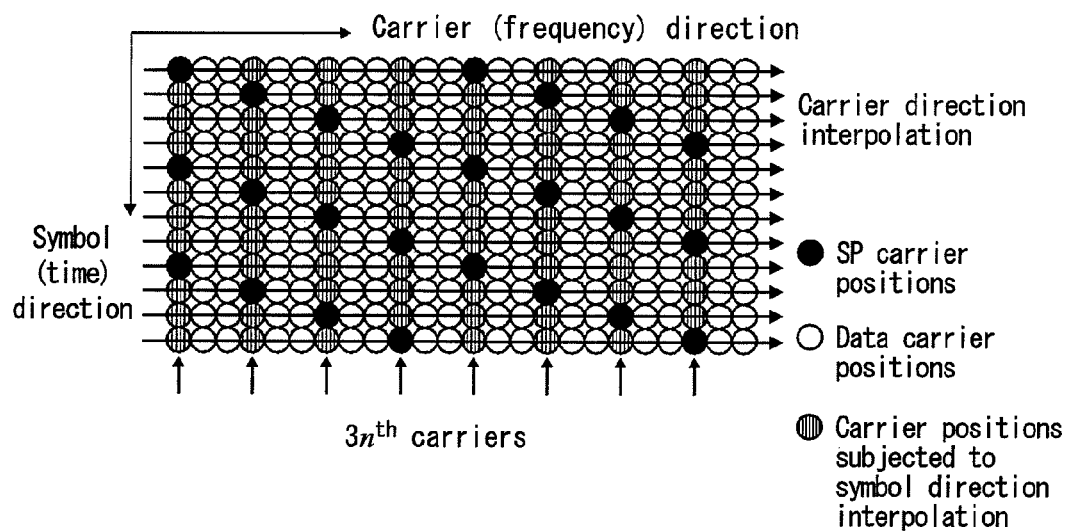
FIG. 44B shows a concept of carrier direction interpolation performed by a carrier direction interpolation subunit shown in FIG. 43.
Figure 45:
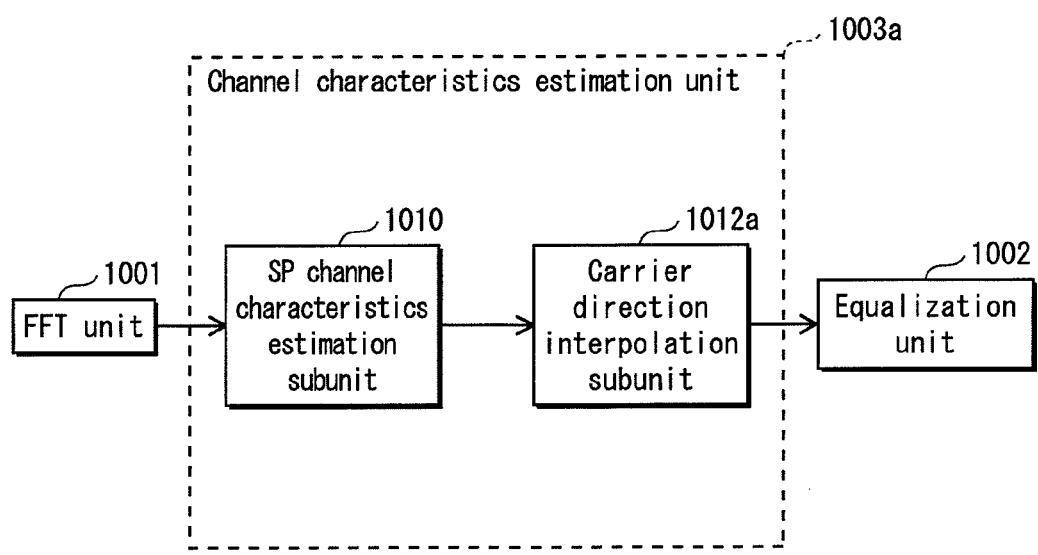
FIG. 45 is a structural diagram of another type of a conventional channel characteristics estimation unit.
Figure 46:
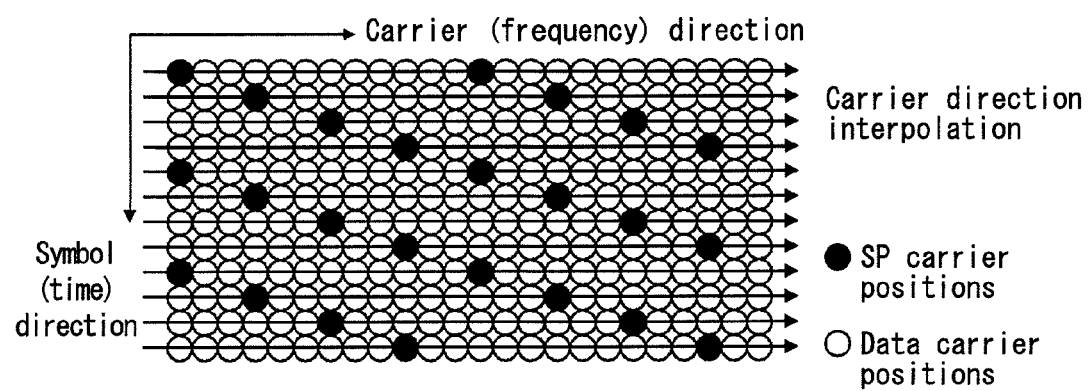
FIG. 46 shows a concept of carrier direction interpolation performed by the carrier direction interpolation subunit shown in FIG. 43.
Figure 48:
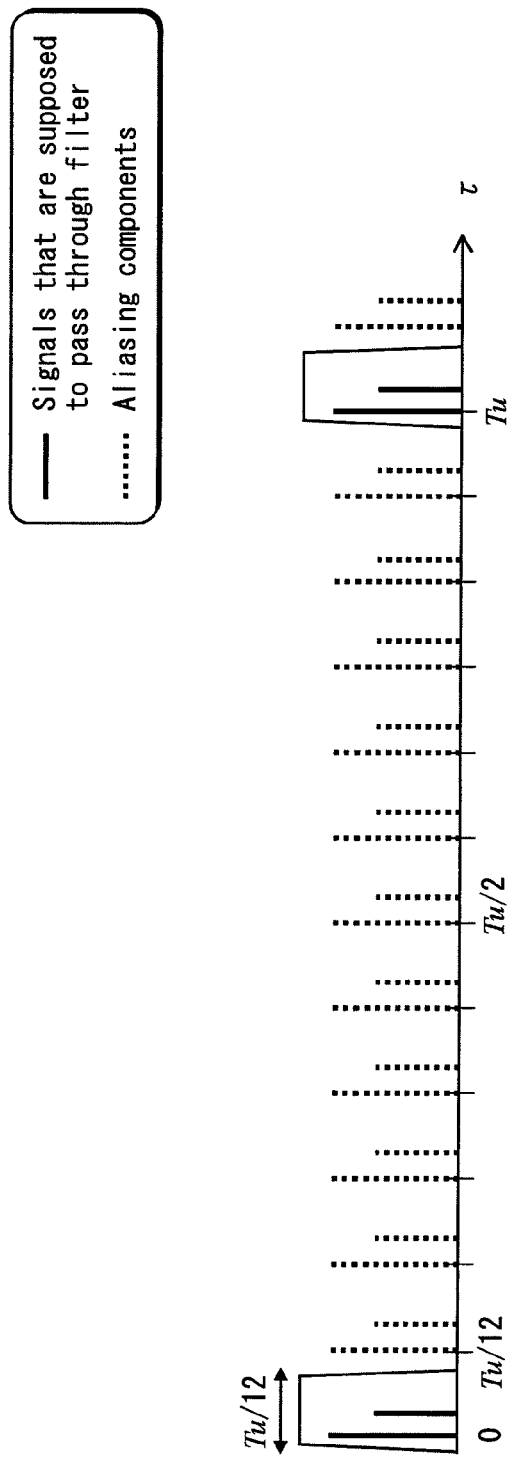
FIG. 48 shows a concept of carrier direction interpolation that is performed with one symbol estimation.

The filter processing subpart 54f calculates channel characteristics at $3n^{th}$ carriers by filtering the values of channel characteristics at $12n^{th}$ carriers, which are output from the SP channel characteristics estimation part 20, with use of the values of the filter coefficients $c_k$ input from the Wiener filter coefficient calculation subpart 53f (see FIG. 39). The above processing performed by the filter processing subpart 54f is expressed by the following (Equation 47). Note, in (Equation 47), (i) the values of channel characteristics at $12n^{th}$ carriers, which have been output from the SP channel characteristics estimation subpart 20, are substituted into H(i) when i=12n (with n being an integer equal to or greater than "0"), and (ii) a value "0" is substituted into H(i) when i≠12n. Thereafter, the filter processing subpart 54f masks the values of channel characteristics at carriers other than $3n^{th}$ carriers to "0".

$$H_a(l) = \Sigma c_{-k} H(k+l)$$ (Equation 47)

As shown in FIG. 39, the carrier direction interpolation part 90 calculates values of channel characteristics at all the carriers by interpolating channel characteristics in the carrier direction with use of (i) the values of channel characteristics output from the adaptive interpolation part 50f and (ii) fixed coefficients. The carrier direction interpolation part 90 then outputs the values of calculated channel characteristics to the equalization subunit 16. This processing performed by the carrier direction interpolation part 90 is expressed by the following (Equation 48). Note, in (Equation 48), (i) the values of channel characteristics calculated by the adaptive interpolation part 50f are substituted into $H_a$(i) when i=3n (with n being an integer equal to or greater than "0"), and (ii) a value "0" is inserted into $H_a$(i) when i≠3n. Here, the carrier direction interpolation is not limited to being performed by using fixed coefficients, but may be performed by changing the bandwidth depending on the delay amount.

$$\hat{H}(l) = \Sigma c_{-k} H(k+l)$$ (Equation 48)

The channel characteristics estimation subunit 15f of the present embodiment achieves substantially the same effects as the channel characteristics estimation subunit 15e of Sixth Embodiment.

The method pertaining to Seventh Embodiment calculates all the channel characteristics at certain carriers which can be calculated by performing the adaptive interpolation with use of the Wiener filter. However, considering that the carrier direction interpolation part 90 interpolates the signals output from the adaptive interpolation part 50f, it is possible to calculate only a part of such channel characteristics at certain carriers which can be calculated by performing the adaptive interpolation with use of the Wiener filter.

<<Additional Notes>>

The present invention is not limited to the above embodiments, and may be implemented in any forms as long as the aim of the present invention and other relevant/accompanying aims can be achieved. The following cases are also possible.

(1) Each of the above embodiments has exemplarily described a digital television broadcast receiver compliant with the ISDB-T or DVB-T standard. However, the present invention is not limited to this, and may instead be applied to digital television broadcast receivers compliant with other standards, or to receivers other than a digital television broadcast receiver.

For instance, the present invention may be applied to the following devices: (i) a digital television broadcast receiver compliant with the DVB-H standard or the Digital Video Broadcasting-Terrestrial 2 (DVB-T2) standard, both employed in Europe; (ii) a digital radio broadcast receiver compliant with the Digital Audio Broadcast (DAB) standard, which is prevalent in many countries; (iii) a digital television broadcast receiver compliant with the Digital Multimedia Broadcasting (DMB) standard and the Digital Multimedia Broadcasting-Terrestrial/Handled (DMB-TH) standard; and (iv) a wireless communication device compliant with the Worldwide Interoperability for Microwave Access (WiMAX) standard.

The present invention may also be applied to the following devices: (i) a wireless communication device utilizing a wireless Local Area Network (LAN), a wireless Personal Area Network (PAN), a wireless Wide Area Network (WAN), a wireless Metropolitan Area Network (MAN), etc.; (ii) a relay device or a receiver used for digital terrestrial broadcasting and digital satellite broadcasting; and (iii) a measuring device for carrying out measurement and the like.

(2) In each of the above embodiments, a received signal has been described as an OFDM signal. However, the received signal is not limited to being an OFDM signal, but may instead be a transmission signal generated by multiplexing a plurality of modulated carriers that are not orthogonal to each other.

(3) In Fourth, Fifth and Seventh Embodiments, the receiver has been described as the digital television broadcast receiver compliant with the DVB-T standard. However, the methods pertaining to these embodiments are also applicable to a digital television broadcast receiver compliant with the DVB-H standard.

(4) According to First to Fourth Embodiments, one of the following (i) to (iv) is utilized in calculating the target signals: (i) TMCC signals; (ii) AC signals; (iii) both of the TMCC signals and AC signals; and (iv) TPS signals. However, First to Fourth Embodiments are not limited to this. For example, alternatively, the following signals may be utilized in calculating the target signals. According to the DVB-T2 standard, as continual pilot signals (CP signals) are allocated to some of the carriers whose carrier numbers that do not include any SP signals, such CP signals may be utilized in calculating the target signals. Note, according to the DVB-T2 standard, there are a variety of allocation patterns according to which SP signals are allocated (hereafter, "SP signal allocation pattern(s)"), including the SP signal allocation pattern of the ISDB-T and DVB-T standards. FIG. 40 exemplarily shows carrier numbers assigned to carriers to which CP signals are allocated according to the DVB-T2 standard, in a case where (i) the SP signal allocation pattern of the ISDB-T and DVB-T standards is used, and (ii) the FFT size is 32 k.

(5) In Fifth Embodiment, both TPS signals and CP signals are utilized in calculating target signals. Fifth Embodiment, however, is not limited to this. Alternatively, the following signals may be utilized in calculating the target signals. According to the DVB-T2 standard, the reception signal includes two types of CP signals, i.e., CP signals that are allocated to some of the carriers whose carrier numbers do not include any SP signals, and CP signals that are allocated to some of the carriers whose carrier numbers include SP signals. Accordingly, with the DVB-T2 standard, such CP signals may be utilized in calculating the target signals.

(6) In Sixth Embodiment, TMCC signals are utilized in calculating target signals. Sixth Embodiment, however, is not limited to this. For example, alternatively, the following signals may be utilized in calculating the target signals: (i) AC signals of the ISDB-T standard; (ii) TMCC signals and AC signals of the ISDB-T standard; (iii) TPS signals of the DVB-T and DVB-H standards; and (iv) CP signals of the DVB-T2 standard, which are allocated to carriers whose carrier numbers do not include any SP signals.

(7) In Seventh Embodiment, CP signals of the DVB-T standard are utilized in calculating target signals. Seventh Embodiment, however, is not limited to this. For example, alternatively, CP signals of the DVB-T2 standard, which are allocated to carriers whose carrier numbers include SP signals, may be utilized in calculating the target signals.

(8) In the above embodiments and Additional Notes (3) to (7), each of the following (i) to (v) has been described as being of one mode: (i) carrier numbers assigned to carriers to which TMCC signals are allocated; (ii) carrier numbers assigned to carriers to which AC signals are allocated; (iii) carrier numbers assigned to carriers to which TPS signals are allocated; (iv) carrier numbers assigned to carriers to which CP signals of the DVB-T standard are allocated; and (v) carrier numbers assigned to carriers to which CP signals of the DVB-T2 standard are allocated. However, in the above embodiments and Additional Notes (3) to (7), each of the above (i) to (v) may be of a different mode. Furthermore, according to the DVB-T2 standard, there are a variety of SP signal allocation patters that are different from the SP signal allocation pattern used for the ISDB-T and DVB-T standards. Nonetheless, the above embodiments and Additional Notes (3) to (7) are still applicable, no matter which variety of SP signal allocation patterns is used.

(9) In First Embodiment etc., the differential demodulation subpart 42 in the TMCC channel characteristics estimation part 40 identifies a real control information piece that is meant to be carried by TMCC signals by majority decision, i.e., by comparing all of the decoded control information pieces included in each symbol. However, the present invention is not limited to this. Alternatively, the differential demodulation subpart 42 may (i) combine TMCC signals allocated to a plurality of carriers in each symbol, and (ii) decode the TMCC signals by using the combined TMCC signals. Alternatively, the differential demodulation subpart 42 may (i) select, from among a plurality of TMCC signals included in each symbol, a TMCC signal with an excellent reception quality, (ii) identify a real control information piece that is meant to be carried by the TMCC signals, by decoding the TMCC signals using the selected TMCC signal. Alternatively, the differential demodulation subpart 42 may identify a real control information piece that is meant to be carried by TMCC signals, by decoding certain TMCC signals allocated to predetermined carriers.

In Fourth Embodiment etc., the differential demodulation subpart 72 in the TPS channel characteristics estimation part 70 identifies a real control information piece that is meant to be carried by TPS signals by majority decision, i.e., by comparing all of the decoded control information pieces included in each symbol. However, the present invention is not limited to this. Alternatively, the differential demodulation subpart 72 may (i) combine TPS signals allocated to a plurality of carriers in each symbol, and (ii) decode the TPS signals by using the combined TPS signals. Alternatively, the differential demodulation subpart 72 may (i) select, from among a plurality of TPS signals included in each symbol, a TPS signal with an excellent reception quality, and (ii) identify a real control information piece that is meant to be carried by the TPS signals, by decoding the TPS signals using the selected TPS signal. Alternatively, the differential demodulation subpart 72 may identify a real control information piece that is meant to be carried by the TPS signals, by decoding certain TPS signals allocated to predetermined carriers.

(10) In First Embodiment, the cross-correlation calculation subpart 52 calculates cross-correlation vectors $p_{z+3m}$ by using the above (Equation 10). Instead, by taking advantage of the fact that cross-correlation values satisfy the relationship $p_m{}^* = p_{-m}$, the cross-correlation calculation subpart 52 may calculate the cross-correlation vectors $p_{z+3m}$ by using the following (Equation 49). This increases the number of parameters that are used in performing averaging, thus improving accuracy of calculation of cross-correlation vectors. The same rule applies to, for example, Fifth to Seventh Embodiments.

$$p_{z+3m} = \frac{E[H(3n+z)H(3n-3m)^*] + E[H(3n-z)H(3n+3m)^*]^*}{2} \quad \text{(Equation 49)}$$

(11) In the above embodiments, the averaging may be performed in the symbol direction when calculating autocorrelation values and cross-correlation values. This reduces errors in the autocorrelation values and the cross-correlation values. It is also possible to exclude, as parameters that are used in performing averaging, carriers with lower credibility (e.g., carriers affected by narrowband interference and carriers transmitted via an end of the band). This can prevent deterioration in accuracy of calculation of channel characteristics due to carriers with lower credibility.

(12) In each of the above embodiments, "tap" has been described as being odd-numbered. The present invention, however, is not limited to this. Alternatively, "tap" may be even-numbered. In this case, 3 (tap−1)/2 and 12 (tap−1)/2 may be, for instance, rounded up or down to an integer, so that the number of vector elements of cross-correlation vectors is equal to "tap".

(13) The above embodiments have each been described under the assumption that the filter is configured such that its central tap satisfies the relationship k=0. The present invention, however, is not limited to this. The filter may be configured in any manners, as long as the calculated filter coefficients can be applied thereto.

(14) In the above embodiments, each of the symbol numbers and the carrier numbers has been described as being an integer equal to or greater than "0". The present invention, however, is not limited to this.

(15) If only a part of a plurality of carriers is required as informational data, then it is permissible to calculate only the channel characteristics at such a necessary part of carriers. Accordingly, in such a case, the above embodiments may be modified so as to perform interpolation by calculating Wiener filter coefficients only for such a necessary part of carriers.

(16) The above embodiments have described transmission formats compliant with the ISDB-T standard or the DVB-T standard. The present invention, however, is not limited to this. The present invention is applicable to other transmission formats as well. For example, the present invention may be applied to a transmission format for a reception signal that (i) includes scattered pilot signals, which are referenced in performing equalization, and (ii) certain signals whose channel characteristics can be estimated by the receiver, the certain signals being allocated non-periodically in the frequency direction.

In the above embodiments, non-periodically allocated signals (TMCC signals, AC signals, TPS signals, and CP signals) are utilized in calculating target signals. The present invention, however, is not limited to this. The target signals may be calculated by utilizing signals that are periodically allocated in each symbol, examples of which include: (i) signals that are, in each symbol, periodically allocated to certain positions to none of which signals to be referenced in performing equalization are allocated; and (ii) signals that are periodically allocated to certain positions in each symbol that does not include any signals to be referenced in performing equalization.

Furthermore, in the above embodiments, signals that are allocated to all the symbols in the symbol direction (TMCC signals, AC signals, TPS signals, and CP signals) are utilized in calculating target signals. The present invention, however, is not limited to this. Signals utilized in calculating the target signals may not necessarily be allocated to all the symbols in the symbol direction.

Furthermore, given that performing the symbol direction interpolation can obtain a value of channel characteristics at every $A^{th}$ carrier in sequence (with A being an integer equal to or greater than "2") beginning with a carrier assigned a carrier number "0", the methods pertaining to First to Fourth Embodiments can be applied by utilizing the following signals in calculating the target signals, if such signals exist: signals (i) that are allocated to one or more of carriers whose carrier numbers are $A \times c + b$ (c=0, 1, 2, ...), which are obtained for all of b (b=1, 2, ..., A-1), and (ii) whose channel characteristics can be estimated by the receiver. Note, the carrier numbers of carriers whose channel characteristics can be obtained by performing the symbol direction interpolation do not necessarily begin with "0".

Furthermore, given that a pilot signal (in Fifth Embodiment, an SP signal) to be referenced when performing the equalization is allocated to every $A^{th}$ carrier in sequence (with A being an integer equal to or greater than "2") beginning with a carrier assigned a carrier number "0", the method pertaining to Fifth Embodiment can be applied by utilizing the following signals in calculating the target signals, if such signals exist: signals (i) that are allocated to one or more of carriers whose carrier numbers are $A \times c + b$ (c=0, 1, 2, ...), which are obtained for all of b (b=1, 2, ..., A-1), and (ii) whose channel characteristics can be estimated by the receiver. Note, the carrier numbers of carriers to which the pilot signals to be referenced when performing the equalization are allocated do not necessarily begin with "0".

Furthermore, given that a pilot signal (in Sixth and Seventh Embodiments, an SP signal) to be referenced when performing the equalization is allocated to every $A^{th}$ carrier in sequence (with A being an integer equal to or greater than "2") beginning with a carrier assigned a carrier number "0", the methods pertaining to Sixth and Seventh Embodiments can be applied by utilizing the following signals in calculating the target signals, if such signals exist: signals (i) that are allocated to one or more of carriers whose carrier numbers are $A \times c + b$ (c=0, 1, 2, ...), which are obtained for a part of b (b=1, 2, ..., A-1), and (ii) whose channel characteristics can be estimated by the receiver. Note, the carrier numbers of carriers to which the pilot signals to be referenced when performing the equalization are allocated do not necessarily begin with "0".

Furthermore, given that performing the symbol direction interpolation can obtain a value of channel characteristics at every $A^{th}$ carrier in sequence (with A being an integer equal to or greater than "2") beginning with a carrier assigned a carrier number "0", the method pertaining to Sixth Embodiment can be applied by utilizing the following signals in calculating the target signals, if such signals exist: signals (i) that are allocated to one or more of carriers whose carrier numbers are $A \times c + b$ (c=0, 1, 2, ...), which are obtained for a part of b (b=1, 2, ..., A-1), and (ii) whose channel characteristics can be estimated by the receiver. Note, the carrier numbers of carriers whose channel characteristics can be obtained by performing the symbol direction interpolation do not necessarily begin with "0".

(17) According to the above embodiments, signals on which the DBPSK has been performed are utilized in calculating the target signals, such as TMCC signals, AC signals, and TPS signals (signals whose amplitudes and phases are known to the receiver (CP signals) are excluded). The present invention, however, is not limited to this. Alternatively, the target signals may be calculated by utilizing signals on which differential modulation other than the DBPSK (e.g., Differential Quadrature Phase Shift Keying or DQPSK) has been performed. The target signals may also be calculated by utilizing any other types of signals that are known to the receiver, if such signals exist.

(18) It has been described in the above embodiments that (i) a pilot signal to be referenced when performing the equalization (referred to as an SP signal in the above embodiments) is allocated to every $12^{th}$ carrier in each symbol, (ii) in the carrier direction, each SP signal in one symbol is two carriers apart from the corresponding SP signal in another adjacent symbol, and (iii) in every $4^{th}$ symbol, each SP signal is assigned the same carrier number as the corresponding SE signals in other symbols. However, First to Fourth Embodiments are each applicable, for example, to pilot signals of the following cases (1) and (2).

Case (1): A pilot signal is allocated to every $fx^{th}$ carrier in each symbol (with fx being an integer equal to or greater than "2"). In the frequency direction, each pilot signal in one symbol is fs carriers apart from the corresponding pilot signal in another adjacent symbol (with fs being an integer satisfying the following relationship: $1 \leq fs < fx$). Thus, in every $ft^{th}$ symbol (ft=fx/fs), each pilot signal is assigned the same carrier number as the corresponding pilot signals in other symbols.

Case (2): A pilot signal is allocated to every $fx'^{th}$ or more carrier in one symbol (with fx' being an integer equal to or greater than "2"). Pilot signals are included in certain symbols that are equally or randomly spaced in the symbol direction.

In the frequency direction, each pilot signal in one of the certain symbols is fs' carriers apart from the corresponding pilot signal in the subsequent one of the certain symbols (with fs' being an integer satisfying the following relationship: $1 \leq fs' < fx'$).

Furthermore, Fifth to Seventh Embodiments are each applicable, for example, to pilot signals of the following case (3).

Case (3): A pilot signal is allocated to every fx"$^{th}$ carrier in one symbol (with fx" being an integer equal to or greater than "2"). Pilot signals may be included in all or some of the symbols in the symbol direction.

(19) In the above embodiments, the adaptive interpolation part 50 etc. may, for example, calculate filter coefficients for every symbol or for every few symbols.

(20) The receiver pertaining to each of the above embodiments is typically realized as LSI, which is an integrated circuit. A plurality of compositional units may each be manufactured integrated on one chip. Alternatively, a part or all of the compositional units may be manufactured integrated on one chip. Here, LSI may be IC, a system LSI, a super LSI or an ultra LSI, depending on the degree of integration. Furthermore, the integration of circuits is not limited to being realized with LSI, but may be realized with a special-purpose circuit or a general-use processor. Alternatively, the integration may be realized with use of a Field Programmable Gate Array (FPGA) that is programmable after manufacturing of LSI, or a reconfigurable processor that enables reconfiguration of the connection and settings of circuit cells in LSI. Furthermore, if new technology for an integrated circuit that replaces LSIs appears due to advances in or derivations from semiconductor technology, such new technology may be used for integration of the functional blocks. Bio-technology is one possible application.

(21) In a case where the procedures of the operations of the receiver explained in each of the above embodiments are at least partially written into a reception program, such partial procedures may be executed by a Central Processing Unit (CPU) reading and executing the reception program stored in memory. The reception program may be recorded on a recording medium for distribution purposes.

(22) In a case where (i) a part of the structure of the receiver explained in each of the above embodiments is realized with the receiver or an integrated circuit and (ii) the procedures of the operations performed by other parts of said structure are written into a reception program, such procedures may be executed by CPU reading and executing the reception program stored in memory.

INDUSTRIAL APPLICABILITY

The present invention can be applied when controlling filter coefficients of a filter used for channel estimation.

REFERENCE SIGNS LIST

1 receiver
2 antenna
3 tuner
4 demodulation unit
5 error correction unit
6 decode unit
7 display unit
11 A/D conversion subunit
12 quadrature detection subunit
13 symbol synchronization subunit
14 orthogonal transform subunit
15 channel characteristics estimation subunit
16 equalization subunit
20 SP channel characteristics estimation part
30 symbol direction interpolation part
40 TMCC channel characteristics estimation part
50 adaptive interpolation part
51 autocorrelation calculation subpart
52 cross-correlation calculation subpart
53 Wiener filter coefficient calculation subpart
54 filter processing subpart

The invention claimed is:

1. A receiver that receives a reception signal in which a plurality of symbols are arranged in a time axis direction, each symbol including a plurality of carriers that are arranged in a frequency axis direction, the receiver comprising:
   a separation unit operable to, on a per-symbol basis, (i) separate the reception signal into the carriers and (ii) output the carriers obtained as a result of separation;
   a first channel calculation unit operable to (i) calculate first channel characteristics at a plurality of first carriers included in the carriers output from the separation unit, the first carriers being disposed at a constant interval in the frequency axis direction and belonging to a first carrier group in each symbol, and (ii) output the calculated first channel characteristics;
   a second channel calculation unit operable to (i) calculate second channel characteristics at one or more second carriers included in the carriers output from the separation unit, the second carriers being different from the first carriers, and (ii) output the calculated second channel characteristics; and
   an adaptive interpolation unit operable to (i) calculate filter coefficients according to the first channel characteristics and the second channel characteristics, (ii) calculate channel characteristics at one or more carriers other than the first carriers, by filtering the first channel characteristics with use of values of the calculated filter coefficients, and (iii) output the calculated channel characteristics at the other carriers, wherein
   the adaptive interpolation unit includes:
   an autocorrelation calculation subunit operable to calculate an autocorrelation matrix (R) by performing autocorrelation calculations on the first channel characteristics;
   a cross-correlation calculation subunit operable to calculate a cross-correlation matrix (P) by performing cross-correlation calculations on the first channel characteristics and the second channel characteristics;
   a filter coefficient calculation subunit operable to calculate the filter coefficients by performing a multiplication $(R^{-1}) \times (P)$, where $(R^{-1})$ denotes an inverse matrix of the autocorrelation matrix (R); and
   a filter processing subunit operable to filter the first channel characteristics with use of the values of the calculated filter coefficients.

2. The receiver of claim 1, wherein
   the cross-correlation calculation subunit calculates the cross-correlation matrix (P) by performing cross-correlation calculations on (i) the first channel characteristics and (ii) parts of the second channel characteristics, which are obtained from some of the second carriers that (a) are disposed at the same interval in the frequency direction as the first carriers belonging to the first carrier group and (b) belong to a second carrier group, and
   the filter processing subunit calculates channel characteristics at carriers belonging to the second carrier group, by filtering the first channel characteristics with use of the values of the calculated filter coefficients.

3. The receiver of claim 2, wherein
the cross-correlation calculation subunit calculates the cross-correlation matrix (P) by performing cross-correlation calculations on (i) the first channel characteristics and (ii) parts of the second channel characteristics, which are obtained from some of the second carriers that (a) are disposed at the same interval in the frequency direction as the first carriers belonging to the first carrier group and (b) belong to a third carrier group, and
a smallest value of a frequency interval between (i) each of the some of the second carriers belonging to the third carrier group and (ii) a corresponding one of carriers belonging to the first carrier group, is equal to a smallest value of a frequency interval between (i) each of the some of the second carriers belonging to the second carrier group and (ii) a corresponding one of the carriers belonging to the first carrier group.

4. The receiver of claim 1, wherein
a subset of carriers in the first carrier group includes a plurality of pilot carriers disposed at the constant interval in the frequency axis direction and to which certain signals whose amplitudes and phases are known to the receiver are allocated, and
the first channel calculation unit includes:
a pilot channel estimation subunit operable to (i) estimate channel characteristics at each of the pilot carriers by using (a) a corresponding one of the carriers output from the separation unit and (b) a corresponding one of the certain signals, and (ii) output the estimated channel characteristics at the pilot carriers; and
a symbol direction interpolation subunit operable to (i) interpolate, in a symbol direction, the channel characteristics at the pilot carriers, and (ii) output results of the interpolation.

5. The receiver of claim 4, wherein
the reception signal is a signal that has been specified by an ISDB-T standard,
the pilot carriers are carriers to each of which a scattered pilot is allocated, and
the second carriers are carriers to each of which one or both of a TMCC and an AC is/are allocated.

6. The receiver of claim 4, wherein
the reception signal is a signal that has been specified by a DVB-T standard or a DVB-H standard,
the pilot carriers are carriers to each of which a scattered pilot is allocated, and
the second carriers are carriers to each of which a TPS is allocated.

7. The receiver of claim 4, wherein
the reception signal is a signal that has been specified by a DVB-T2 standard,
the pilot carriers are carriers to each of which a scattered pilot is allocated, and
the second carriers are carriers to each of which a continual pilot is allocated.

8. The receiver of claim 1, wherein
the plurality of first carriers are a plurality of pilot carriers to which certain signals whose amplitudes and phases are known to the receiver are allocated, and
the first channel calculation unit (i) estimates channel characteristics at each of the pilot carriers by using (a) a corresponding one of the carriers output from the separation unit and (b) a corresponding one of the certain signals, and (ii) outputs the estimated channel characteristics at the pilot carriers.

9. The receiver of claim 8, wherein
the reception signal is a signal that has been specified by a DVB-T standard or a DVB-H standard,
the pilot carriers are carriers to each of which a scattered pilot is allocated, and
the second carriers are carriers to each of which both of a TPS and a continual pilot are allocated.

10. The receiver of claim 8, wherein
the reception signal is a signal that has been specified by a DVB-T2 standard,
the pilot carriers are carriers to each of which a scattered pilot is allocated, and
the second carriers are carriers to each of which a continual pilot is allocated.

11. The receiver of claim 1, wherein
the plurality of first carriers are a plurality of pilot carriers to which certain signals whose amplitudes and phases are known to the receiver are allocated,
the first channel calculation unit (i) estimates channel characteristics at each of the pilot carriers by using (a) a corresponding one of the carriers output from the separation unit and (b) a corresponding one of the certain signals, and (ii) outputs the estimated channel characteristics at the pilot carriers, and
the receiver further comprises a carrier direction interpolation unit operable to interpolate, in a carrier direction, the channel characteristics at the other carriers.

12. The receiver of claim 11, wherein
the reception signal is a signal that has been specified by an ISDB-T standard,
the pilot carriers are carriers to each of which a scattered pilot is allocated, and
the second carriers are carriers to each of which one or both of a TMCC and an AC is/are allocated to.

13. The receiver of claim 11, wherein
the reception signal is a signal that has been specified by a DVB-T standard or a DVB-H standard,
the pilot carriers are carriers to each of which a scattered pilot is allocated, and
the second carriers are carriers to each of which a TPS or a continual pilot is allocated.

14. The receiver of claim 11, wherein
the reception signal is a signal that has been specified by a DVB-T2 standard,
the pilot carriers are carriers to each of which a scattered pilot is allocated, and
the second carriers are carriers to each of which a continual pilot is allocated.

15. An integrated circuit for a reception signal in which a plurality of symbols are arranged in a time axis direction, each symbol including a plurality of carriers that are arranged in a frequency axis direction, the integrated circuit comprising:
a separation unit operable to, on a per-symbol basis, (i) separate the reception signal into the carriers and (ii) output the carriers obtained as a result of separation;
a first channel calculation unit operable to (i) calculate first channel characteristics at a plurality of first carriers included in the carriers output from the separation unit, the first carriers being disposed at a constant interval in the frequency axis direction and belonging to a first carrier group in each symbol, and (ii) output the calculated first channel characteristics;
a second channel calculation unit operable to (i) calculate second channel characteristics at one or more second carriers included in the carriers output from the separation unit, the second carriers being different from the first carriers, and (ii) output the calculated second channel characteristics; and an adaptive interpolation unit operable to (i) calculate filter coefficients according to the first channel characteristics and the second channel characteristics, (ii) calculate channel characteristics at one or more carriers other than the first carriers, by filtering the first channel characteristics with use of values of the calculated filter coefficients, and (iii) output the calculated channel characteristics at the other carriers, wherein the adaptive interpolation unit includes:

an autocorrelation calculation subunit operable to calculate an autocorrelation matrix (R) by performing autocorrelation calculations on the first channel characteristics;

a cross-correlation calculation subunit operable to calculate a cross-correlation matrix (P) by performing cross-correlation calculations on the first channel characteristics and the second channel characteristics;

a filter coefficient calculation subunit operable to calculate the filter coefficients by performing a multiplication $(R^{-1}) \times (P)$, where $(R^{-1})$ denotes an inverse matrix of the autocorrelation matrix (R); and a filter processing subunit operable to filter the first channel characteristics with use of the values of the calculated filter coefficients.

16. A digital television receiver that receives a reception signal in which a plurality of symbols are arranged in a time axis direction, each symbol including a plurality of carriers that are arranged in a frequency axis direction, the digital television receiver comprising:

a separation unit operable to, on a per-symbol basis, (i) separate the reception signal into the carriers and (ii) output the carriers obtained as a result of separation;

a first channel calculation unit operable to (i) calculate first channel characteristics at a plurality of first carriers included in the carriers output from the separation unit, the first carriers being disposed at a constant interval in the frequency axis direction and belonging to a first carrier group in each symbol, and (ii) output the calculated first channel characteristics;

a second channel calculation unit operable to (i) calculate second channel characteristics at one or more second carriers included in the carriers output from the separation unit, the second carriers being different from the first carriers, and (ii) output the calculated second channel characteristics; and an adaptive interpolation unit operable to (i) calculate filter coefficients according to the first channel characteristics and the second channel characteristics, (ii) calculate channel characteristics at one or more carriers other than the first carriers, by filtering the first channel characteristics with use of values of the calculated filter coefficients, and (iii) output the calculated channel characteristics at the other carriers, wherein the adaptive interpolation unit includes:

an autocorrelation calculation subunit operable to calculate an autocorrelation matrix (R) by performing autocorrelation calculations on the first channel characteristics;

a cross-correlation calculation subunit operable to calculate a cross-correlation matrix (P) by performing cross-correlation calculations on the first channel characteristics and the second channel characteristics;

a filter coefficient calculation subunit operable to calculate the filter coefficients by performing a multiplication $(R^{-1}) \times (P)$, where $(R^{-1})$ denotes an inverse matrix of the autocorrelation matrix (R); and a filter processing subunit operable to filter the first channel characteristics with use of the values of the calculated filter coefficients.

17. A reception method used in a receiver that receives a reception signal in which a plurality of symbols are arranged in a time axis direction, each symbol including a plurality of carriers that are arranged in a frequency axis direction, the reception method comprising:

a separation step of, on a per-symbol basis, (i) separating the reception signal into the carriers and (ii) outputting the carriers obtained as a result of separation;

a first channel calculation step of (i) calculating first channel characteristics at a plurality of first carriers included in the carriers output in the separation step, the first carriers being disposed at a constant interval in the frequency axis direction and belonging to a first carrier group in each symbol, and (ii) outputting the calculated first channel characteristics;

a second channel calculation step of (i) calculating second channel characteristics at one or more second carriers included in the carriers output in the separation step, the second carriers being different from the first carriers, and (ii) outputting the calculated second channel characteristics; and an adaptive interpolation step of (i) calculating filter coefficients according to the first channel characteristics and the second channel characteristics, (ii) calculating channel characteristics at one or more carriers other than the first carriers, by filtering the first channel characteristics with use of values of the calculated filter coefficients, and (iii) outputting the calculated channel characteristics at the other carriers, wherein the adaptive interpolation step includes:

an autocorrelation calculation substep of calculating an autocorrelation matrix (R) by performing autocorrelation calculations on the first channel characteristics;

a cross-correlation calculation substep of calculating a cross-correlation matrix (P) by performing cross-correlation calculations on the first channel characteristics and the second channel characteristics;

a filter coefficient calculation substep of calculating the filter coefficients by performing a multiplication $(R^{-1}) \times (P)$, where $(R^{-1})$ denotes an inverse matrix of the autocorrelation matrix (R); and a filter processing substep of filtering the first channel characteristics with use of the values of the calculated filter coefficients.

18. A reception program embodied on a non-transitory computer readable medium, the reception program to be used by a receiver that receives a reception signal in which a plurality of symbols are arranged in a time axis direction, each symbol including a plurality of carriers that are arranged in a frequency axis direction, the reception program causing the receiver to execute the following steps:

a separation step of, on a per-symbol basis, (i) separating the reception signal into the carriers and (ii) outputting the carriers obtained as a result of separation;

a first channel calculation step of (i) calculating first channel characteristics at a plurality of first carriers included in the carriers output in the separation step, the first carriers being disposed at a constant interval in the frequency axis direction and belonging to a first carrier group in each symbol, and (ii) outputting the calculated first channel characteristics;

a second channel calculation step of (i) calculating second channel characteristics at one or more second carriers included in the carriers output in the separation step, the second carriers being different from the first carriers, and (ii) outputting the calculated second channel characteristics; and an adaptive interpolation step of (i) calculating filter coefficients according to the first channel characteristics and the second channel characteristics, (ii) calculating channel characteristics at one or more carriers other than the first carriers, by filtering the first channel characteristics with use of values of the calculated filter coefficients, and (iii) outputting the calculated channel characteristics at the other carriers, wherein in the adaptive interpolation step, the reception program further causes the receiver to execute the following substeps:

an autocorrelation calculation substep of calculating an autocorrelation matrix (R) by performing autocorrelation calculations on the first channel characteristics;

a cross-correlation calculation substep of calculating a cross-correlation matrix (P) by performing cross-correlation calculations on the first channel characteristics and the second channel characteristics;

a filter coefficient calculation substep of calculating the filter coefficients by performing a multiplication $(R^{-1}) \times (P)$, where $(R^{-1})$ denotes an inverse matrix of the autocorrelation matrix (R); and a filter processing substep of filtering the first channel characteristics with use of the values of the calculated filter coefficients.

* * * * *